United States Patent
Nguyen et al.

(10) Patent No.: US 10,683,739 B2
(45) Date of Patent: Jun. 16, 2020

(54) ENHANCING COMPLEX FRACTURE GEOMETRY IN SUBTERRANEAN FORMATIONS, NET PRESSURE PULSING

(71) Applicant: Halliburton Energy Services, Inc., Houston, TX (US)

(72) Inventors: Philip D. Nguyen, Houston, TX (US); Matthew Lewis Lahman, Houston, TX (US); Jesse Clay Hampton, Conroe, TX (US); Vladimir Nikolayevich Martysevich, Spring, TX (US); Stephen Byrne Persac, Shreveport, LA (US)

(73) Assignee: Halliburton Energy Services, Inc., Houston, TX (US)

( * ) Notice: Subject to any disclaimer, the term of this patent is extended or adjusted under 35 U.S.C. 154(b) by 221 days.

(21) Appl. No.: 15/754,576

(22) PCT Filed: Sep. 23, 2015

(86) PCT No.: PCT/US2015/051615
§ 371 (c)(1),
(2) Date: Feb. 22, 2018

(87) PCT Pub. No.: WO2017/052527
PCT Pub. Date: Mar. 30, 2017

(65) Prior Publication Data
US 2019/0024489 A1  Jan. 24, 2019

(51) Int. Cl.
| | |
|---|---|
| *E21B 43/26* | (2006.01) |
| *C09K 8/62* | (2006.01) |
| *C09K 8/80* | (2006.01) |
| *E21B 43/267* | (2006.01) |
| *E21B 47/06* | (2012.01) |

(52) U.S. Cl.
CPC ............. *E21B 43/26* (2013.01); *C09K 8/62* (2013.01); *C09K 8/80* (2013.01); *E21B 43/267* (2013.01); *E21B 47/06* (2013.01)

(58) Field of Classification Search
CPC ........ E21B 43/26; E21B 43/267; E21B 47/06; C09K 8/62; C09K 8/80
See application file for complete search history.

(56) References Cited

U.S. PATENT DOCUMENTS

| | | | |
|---|---|---|---|
| 8,607,870 B2 | 12/2013 | Gu et al. | |
| 8,613,314 B2 | 12/2013 | Garcia-Lopez De Victoria et al. | |

(Continued)

OTHER PUBLICATIONS

Ingram et al., "Methods Improve Stimulation Efficiency of Perforation Clusters in Completions," Journal of Petroleum Technology, Apr. 2014, pp. 32-36.

(Continued)

*Primary Examiner* — Crystal J Miller
(74) *Attorney, Agent, or Firm* — McGuireWoods LLP

(57) ABSTRACT

Methods including introducing a first high-viscosity treatment fluid (HVTF) into a subterranean formation through an opening and applying incrementally increased fracturing rate steps (IIFRSs) to the first HVTF to create or enhance a dominate fracture, wherein between each IIFRS applied to the first HVTF a downhole pressure slope over time will increase, decline, or stabilize at a first HVTF measured pressure slope. Evaluating the first HVTF measured pressure slope prior to applying a subsequent IIFRS to the first HVTF. Introducing a first low-viscosity treatment fluid (LVTF) through the opening to create or enhance a secondary azimuth fracture extending from the dominate fracture, and performing a first net pressure operation after the first LVTF is introduced.

20 Claims, 5 Drawing Sheets

(56) References Cited

U.S. PATENT DOCUMENTS

| | | |
|---|---|---|
| 9,500,076 B2 | 11/2016 | Walters |
| 9,574,443 B2 | 2/2017 | Walters |
| 9,702,247 B2 | 7/2017 | Walters |
| 2013/0146292 A1 | 6/2013 | Litvinets et al. |
| 2013/0284437 A1* | 10/2013 | Nguyen ............... E21B 43/267 166/280.1 |
| 2013/0341030 A1* | 12/2013 | Brannon ................ C09K 8/60 166/308.2 |
| 2014/0014338 A1 | 1/2014 | Crews |
| 2014/0060837 A1 | 3/2014 | Love |
| 2014/0083695 A1 | 3/2014 | Nguyen |
| 2014/0251626 A1* | 9/2014 | Gomaa .................... C09K 8/62 166/308.5 |
| 2014/0262263 A1 | 9/2014 | Yudin et al. |
| 2014/0262291 A1 | 9/2014 | Chen et al. |
| 2014/0299318 A1 | 10/2014 | Crews et al. |
| 2014/0299326 A1 | 10/2014 | Crews |
| 2015/0075782 A1 | 3/2015 | Sharma |

OTHER PUBLICATIONS

Ishida et al., "Influence of Fluid Viscosity on the Hydraulic Fracturing Mechanism," Transactions of the ASME, Sep. 2004, vol. 126, pp. 190-200.

Kraemer et al., "A Novel Completion Method for Sequenced Fracturing in the Eagle Ford Shale," SPE-169010-MS, 2014, 10 pages.

McDaniel et al., "Proper Use of Proppant Slugs and Viscous Gel Slugs Can Improve Proppant Placement During Hydraulic Fracturing Applications," SPE 71661, 2001, 16 pages.

McNeil et al., "New Multistage Fracturing Process Offers Real-Time Control of Rate and Proppant Concentration at th Perforations," SPE 162827, 2012, 9 pages.

Nguyen et al., "Evaluating Treatment Methods for Enhancing Microfracture Conductivity in Tight Formations," SPE 167092, 2013, 14 pages.

Pandya et al., "Rate Step-Down Analysis Improves Placement Efficiency of Stimulation Treatments in Unconventional Resources Play," URTeC 1943637, 2014, 10 pages.

Soliman et al., "Fracturing Design Aimed at Enhancing Fracture Complexity," SPE 130043, 2010, 20 pages.

Stanchits et al., "Monitoring the Early Onset of Hydraulic Fracture Initiation by Acoustic Emission and Volumetric Deformation Measurements," ARMA 13-664, Jun. 2013, 9 pages.

Stegent et al., "Cement Technology Improves Fracture Initiation and Leads to Successful Treatments in the Eagle Ford Shale," SPE-137441-MS, 2010, 17 pages.

International Search Report and Written Opinion from PCT/2015/051615, dated Jun. 23, 2016, 11 pages.

* cited by examiner

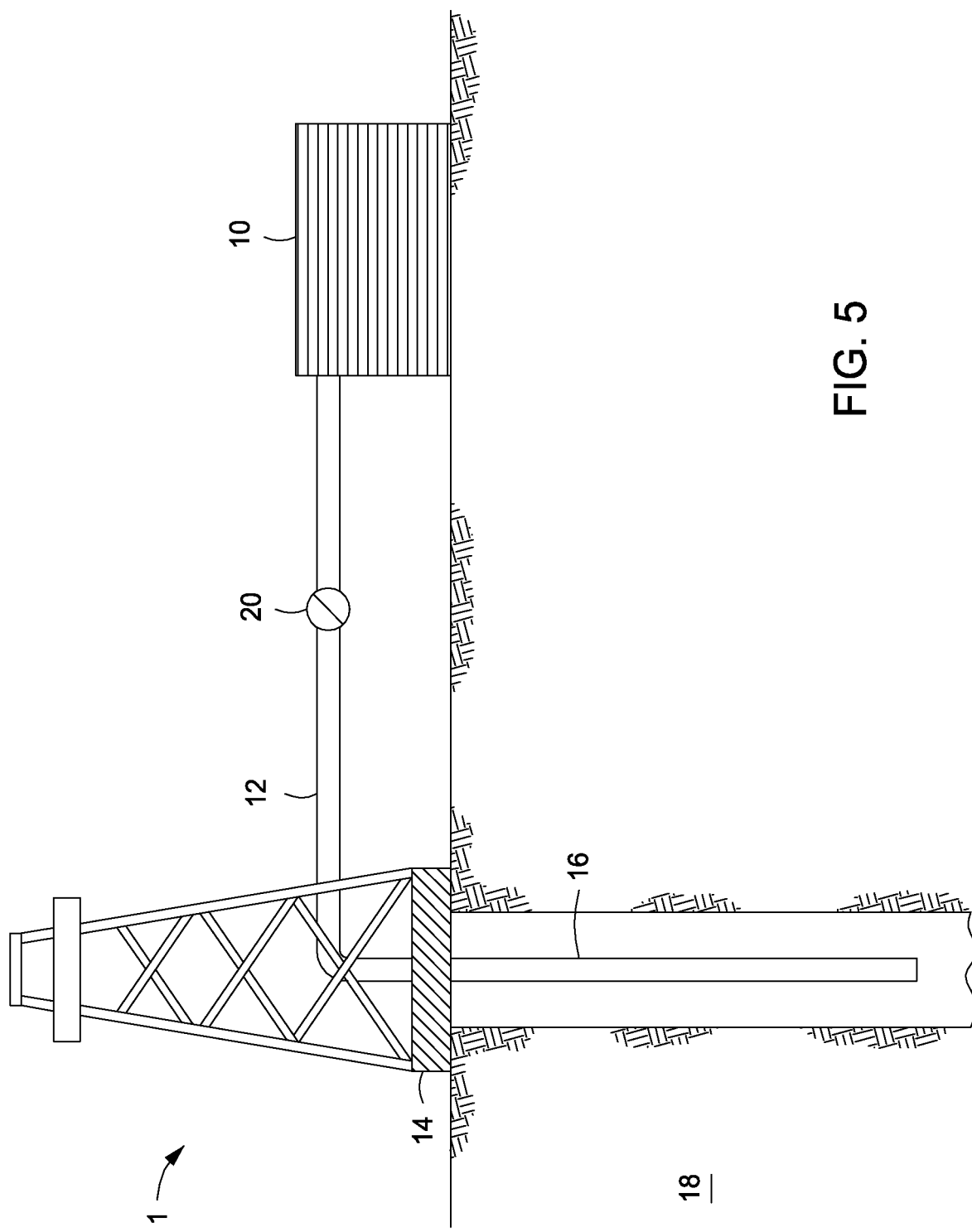

ENHANCING COMPLEX FRACTURE GEOMETRY IN SUBTERRANEAN FORMATIONS, NET PRESSURE PULSING

BACKGROUND

The present disclosure relates to subterranean formation hydraulic fracturing operations and, more particularly, to enhancing interconnected complex fracture geometry in subterranean formations.

Hydrocarbon producing wells (e.g., oil producing wells, gas producing wells, and the like) are often stimulated by hydraulic fracturing treatments. In traditional hydraulic fracturing treatments (or simply "fracturing"), a treatment fluid, sometimes called a carrier fluid in cases where the treatment fluid carries particulates entrained therein, is pumped into a portion of a subterranean formation (which may also be referred to herein simply as a "formation"). The treatment fluid is pumped at a rate and pressure sufficient to break down the formation and create one or more fractures therein. As used herein, the term "formation" encompasses the term "reservoir," referring to a portion of the formation which has sufficient porosity and permeability to store and transmit fluids (e.g., hydrocarbons). As used herein, the term "treatment fluid" refers generally to any fluid that may be used in a subterranean application in conjunction with a desired function and/or for a desired purpose. The term "treatment fluid" does not imply any particular action by the fluid or any component thereof.

In the case of stimulating low permeability formations, such as shale reservoirs or tight-gas sands, increasing fracture complexity during stimulation may further enhance the production of the formation. As used herein, the term "low permeability formation" refers to a formation that has a matrix permeability of less than 1,000 microDarcy (equivalent to 1 milliDarcy), and the term "ultra-low permeability formation" refers to a formation that has a matrix permeability of less than 1 microDarcy (equivalent to 0.001 milliDarcy).

To further enhance production, complex fracture geometry may remain open and permeable due to shear offset of the formation forming the fractures in the formation (i.e., the formation in which the fracture is formed does not close perfectly, thereby leaving channels in the disturbed areas). In other cases, the dilated fractures may be held open by particulates to increase the conductivity of the reservoir.

BRIEF DESCRIPTION OF THE DRAWINGS

The following figures are included to illustrate certain aspects of the embodiments described herein, and should not be viewed as exclusive embodiments. The subject matter disclosed is capable of considerable modifications, alterations, combinations, and equivalents in form and function, as will occur to those skilled in the art and having the benefit of this disclosure.

FIG. 5 depicts an embodiment of a system configured for delivering the treatment fluids of the embodiments described herein to a downhole location according to one or more embodiments of the present disclosure.

DETAILED DESCRIPTION

The present disclosure relates to subterranean formation hydraulic fracturing operations and, more particularly, to enhancing interconnected complex fracture geometry in subterranean formations.

Specifically, the present disclosure provides a novel fracturing process to greatly improve the generation of interconnected fracture complexity in subterranean formations, including in low or ultra-low permeability formations, thereby resulting in fracture attributes for increased conductive flowing fracture area for enhancing hydrocarbon recovery from these formations. Specifically, the process described herein improves dominate fracture initiation, early time propagation, extension, net pressure communication, secondary azimuth fracture intensity, transport of multiple propping agents, distribution of proppant agents, fracture system conductivity, fracture volume distribution, and formation stress field alteration using a sequence-dependent fracture generation process in terms of fluid viscosity, rate modification, and fluid composition to create ideal complex fracture geometry and, in some embodiments, high volume, propped fractures thereof.

As used herein, unless specifically stated otherwise, the term "fracture" encompasses both dominate fracture(s) and secondary azimuth fracture(s), as well as both naturally occurring cracks and induced (i.e., created) fractures. The term "dominate fracture" refers a single fracture initiating, having early time propagation, and extending, from a wellbore at a given opening, with a high degree of hydraulic connection from wellbore to fracture tip. The term "opening" refers to any orifice or gap extending into a subterranean formation from a wellbore and may include, but is not limited to, a natural opening, an opening caused by a perforation charge of any size or shape, an opening caused by a group of perforation charges, an opening caused by a jetting fluid and/or particulate penetration from a hydrajetting tool, an opening caused by a jetting fluid and/or particulate penetration from a ball drop sliding or mechanically shifting sleeve port, an opening caused by a jetting fluid and/or particulate penetration from a restricted ball drop sliding or mechanically shifting sleeve port, and the like, and any combination thereof. As used herein, the term "fracture tip" refers to the boundary between an extending fracture and the formation. The dominate fracture(s) is the path of least resistance, where the largest distribution of fracturing fluid, or other treatment fluid, is following and extending. Generally, the dominate fracture(s) will also be where ideally minimal losses of fluid near the wellbore occur. The hydrocarbons may flow through the subterranean formation into and through the dominate fracture(s) and then into the wellbore for collection at a surface location.

Figures 1A, 1B, 1C:
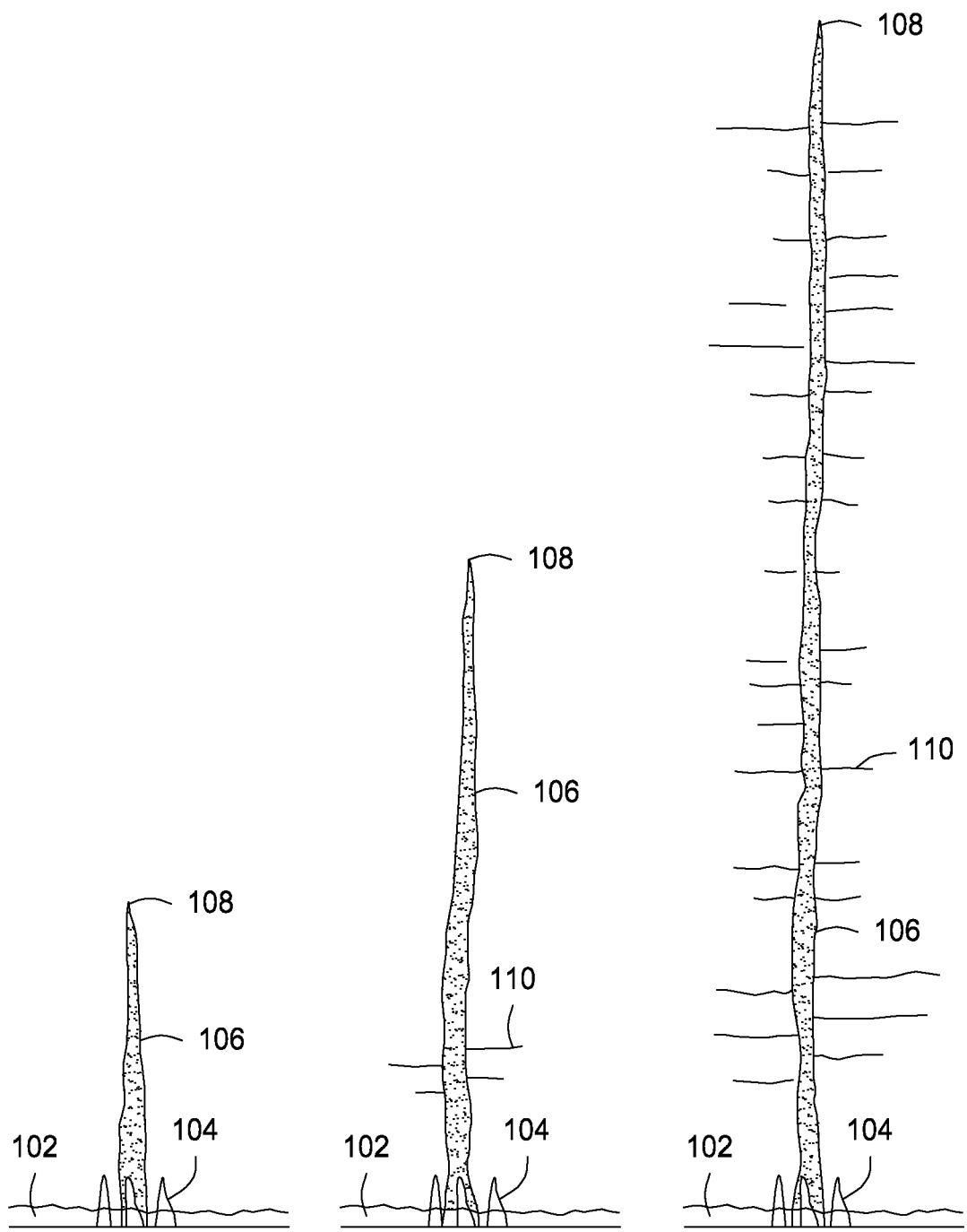
FIGS. 1A-1C depict dominate fracture initiation, early time propagation, and extension according to one or more embodiments of the present disclosure.

Referring now to FIGS. 1A-1C, illustrated is a dominate fracture 106 being formed according to the methods of the present disclosure, and as described in greater detail below. FIG. 1A represents initiation of the dominate fracture 106, FIG. 1B represents early time propagation of the dominate fracture 106, and, as shown, FIG. 1C represents full extension of the dominate fracture 106. As used herein, the term "initiation" refers to the nucleation of a dominate fracture (or other type of fracture), the term "early time propagation" means increasing in length and volume of the dominate fracture occurring prior to reaching a maximum fracturing rate, and the term "extension" or "extended" refers to the continued growth or completed growth of the dominate fracture after early time propagation is completed and at maximum fracturing rate. Subterranean formation 102 comprises openings (e.g., perforations) 104. Although shown with only three openings, it will be appreciated that one, two, or greater than three openings 104 may exist through the subterranean formation 102, without departing from the scope of the present disclosure. During each of early time propagation and extension of the dominate fracture 106, the dominate fracture 106 grows in length at the fracture tip 108. As shown, stress relief secondary azimuth fractures 110 are formed substantially perpendicular to the direction of a compressive force (i.e., from net pressure), as discussed in greater detail herein.

As used herein, the term "fracture complexity," and any variants thereof (e.g., "complex fracture geometry"), refers to a fracture geometry in which one or more secondary azimuth fractures extend from one or more dominate fractures. The fracture complexity may provide access conduits within a subterranean formation that are in fluid communication with a wellbore, such that desired fluids from the formation (e.g., hydrocarbons) flow through the conduits and into the wellbore for collection at a surface location. As used herein, the term "secondary azimuth fracture" refers to branch fractures nucleating along the dominate fracture in a direction different from the dominate fracture, and include but are not limited to, fractures formed from natural or existing cracks or shear failures and/or from created fractures or shear failures, including far-field pressure dependent leak-off mechanisms, based on pressure exposure, stress relief mechanisms, and the like, as described below. The term "nucleating" and grammatical variants thereof refers to initiating or beginning a new crack or fracture due to tensile or shear failure. Tensile failure is formed when a formation is subject to tensile stress, shear failure is formed when a formation experiences shear failure (e.g., when faces of a fracture slip past one another).

The secondary azimuth fracture(s) follows a secondary or lower stress direction than the direction described as the minimum horizontal stress that a dominate fracture follows. Typically, secondary azimuth fractures will initiate and grow orthogonal or diagonal to the dominate fracture for a time, and may also turn turning back parallel to it due to the tendency for the secondary azimuth fracture to follow the path perpendicular to the minimum horizontal stress, without departing from the scope of the present disclosure.

The process described herein takes advantage of field and laboratory observations that have demonstrated that a treatment fluid pumped during a fracturing operation, regardless of fluid type and sequence, strongly affects fracture initiation, near-wellbore geometry, natural fractures, and net pressure. Over time, the net pressure generated and its distribution throughout the network will ultimately affect the complex fracture geometry generated. The present disclosure thus harnesses certain fracturing mechanics, including the treatment fluid (e.g., the high-viscosity treatment fluid and low-viscosity treatment fluid described below) pressure sequence, treatment fluid rate, treatment fluid viscosity, momentum of propagation of the dominate fracture, and the like to reliably generate large hydraulically interconnected complex fractures.

The process described herein reduces or eliminates near-wellbore excessive pressure and injection restrictions caused by exceeding critical near-wellbore fissure opening pressures and the generation of competing fractures early in the treatment. Such near-wellbore opening pressures and competing fractures can add to the surface pressure requirements, increase fluid loss in the near-wellbore region, lower net pressure, and restrict efficient net pressure communication throughout the fracture network, thus inhibiting the size, complexity, and connectivity of the network. As defined herein, the term "competing fracture" refers to near-wellbore cracks or fractures nucleating or opening in a direction beginning parallel to the dominate fracture, and include but are not limited to, fractures formed from natural or existing cracks or shear failures, and/or from created fractures or shear failures, including near-wellbore pressure dependent leak-off mechanisms, based on pressure exposure, as described below. The process described herein further optimizes fracturing fluid viscosity sequencing to generate initially dominate fractures with a high efficiency fluid, followed by a low efficiency fluid to generate secondary azimuth fracture(s). The high efficiency fluid creates a build-up and storage of fluid energy in the dominate fracture (net pressure, as described below), and the low efficiency fluid exploits the initial pressurization and increased incidence of weakened shear offset points along the dominate fracture to generate the secondary azimuth fracture(s) extending from and hydraulically connected to the dominate fracture(s).

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as viscosity, size, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of"

or "consist of" the various components and steps. When "comprising" is used in a claim, it is open-ended.

As used herein, the term "substantially" means largely, but not necessarily wholly. The term "about" means+/−5% of a numerical value. The symbol "+/−" means plus or minus the value provided thereafter.

The process described herein employs a three-phase process (Phase I, Phase II, and/or Phase III intrastage diversion), which may be performed sequentially, or in any combination, or in repeating cycles. The three-phase process may be performed in a single treatment zone in a subterranean formation, in multiple treatment zones, in re-fracturing applications, and may be repeated at new or the same treatment zones. As used herein, the term "treatment zone," refers to a length of a wellbore, which may be any length including the entire length of the wellbore or a portion thereof comprising one or more opening(s). The three Phases maximize fracturing energy efficiency by combining rock mechanics, geophysics, pumping diagnostics, and chemistry to optimize complex fracture geometry in subterranean formations. The process decouples near-wellbore complexity from far-field complexity to increase overall dilated complex fracture volume. As used herein, the term "near-wellbore" generally refers to the portion of a subterranean formation within about 10 meters (m) of the wellbore; the term "far-field" generally refers to the portion of a subterranean formation within greater than about 10 m.

The wellbores used to create the fracture complexity described herein may be in such subterranean formations at any trajectory including, but not limited to, horizontal wellbores, vertical wellbores, deviated wellbores (i.e., neither horizontal nor vertical), combinations thereof at various locations along the wellbore, and the like. In some embodiments, the process described herein may be particularly beneficial in horizontal wellbores and deviated wellbores due to increased stress shadowing effects of near-wellbore pressure dependent leak-off, including competing fractures caused therefrom, as discussed in detail below. As used herein, the term "stress shadow" or "stress shadowing" and grammatical variants thereof refers to compressive stress fields surrounding created dominate and secondary azimuth fractures. As an example, fractures propagated in horizontal wellbores create a region of increased stress around them, the stress shadow, such that as multiple fractures are formed at openings into the formation that are near each other, the fracture system becomes compressed, causing the formation to become more stiff and increasingly transmit stress through the formation. The stress shadow can lead to exponential pressure increases and closure stresses that restrict fluid and particulate entry into the compressed areas of the formation.

In some embodiments, the Phase I and Phase II processes may be performed sequentially, in any order, or repeatedly in a subterranean formation. The subterranean formation may be a standard formation or may be a low or ultra-low permeability formation, as described above. In some instances, the subterranean formation may be shale. Indeed, the process described herein may be used in formations characterized as high closure stress, ductile, having low stress anisotropy, naturally fractured (or naturally highly fractured), having a high degree of lamination between layers, a high clay content, and the like, and any combination thereof. Such characteristics may increase the difficulty of forming dominate fractures with a width sufficient to place particulates (e.g., proppant particulates) therein, and increase the difficulty of controlling near-wellbore fissures, undesired leak-off and competing fractures. Moreover, such characteristics during fracturing operations may result in poor fracture initiation and the absence of an initially dominate fracture early in the treatment, causing excessive near-wellbore pressures, near-wellbore pressure dependent leak-off, possible longitudinal fractures, and perhaps a proceeding abrupt fracture reorientation when proppant particulates are introduced. These factors may cause permanent damage to fracture geometry, fracture width, net pressure, and overall disrupt proper fracture orientation and recovery (e.g., of produced hydrocarbons) capacity.

In some instances, frequent screen-out or pressure-out events, which may result in abandonment or early termination of certain treatment zones may occur due to poor fracture initiation. Additionally, when fracturing rate is increased too rapidly for the rate of dominate fracture initiation, early time propagation, and extension, the bottom hole pressure increases rapidly (a pulse is generated) in the near-wellbore region during this time. This increased bottom hole pressure may cause a longitudinal fracture to form along the wellbore perpendicular to the maximum horizontal stress, which is typically highly tortuous (i.e., having restricted fluid pathways) and can damage fracture geometry. When this highly pressurized longitudinal fracture intersects a lower stress area or natural fracture along the wellbore it will rapidly reorient and turn transverse, instantly switching to the horizontal minimum stress and eliminating much of the entry friction. This reorientation can be very abrupt, further leading to the tortuous geometry and potential decreased conductivity of the formation, among other things. In other instances, a high degree of bedding laminations in a formation can force low-viscosity fluids to leak-off horizontally along a single or multiple bedding planes (i.e., a breakdown of the overburden pressure), which may prevent transverse fracture growth and result in fracture width restriction and proppant placement inefficiencies and cause the bottom hole pressure to remain excessively high. Some embodiments described herein can be used to remediate such fracture initiation consequences.

The Phase I process described herein may overcome one or more of the above mentioned difficulties, resulting in better fracture initiation, forming a desired early time dominate fracture geometry leading to effective fracture width, net pressure, and lower surface and bottom hole pressures during stimulation. As used herein, the term "screen-out" refers to a condition where fracture width is not sufficient to accept the proppant size and concentration being pumped, and proppant grains begin to fill in the near-wellbore region and into the well, preventing fluid from entering the openings (e.g., perforations), and causing a steep pressure increase that results in early termination of the fracturing treatment. As used herein, the term "pressure-out" refers to a condition where near-wellbore excessive pressures or stress shadow compression alone, or in combination with partial blockage of flow paths from proppant, cause the treating pressure at surface to be too high for a designed rate to reasonably continue pumping the treatment fluid.

Referring to Phase I, Phase I represents a novel process for enhancing fracture initiation to generate net pressure in a dominate fracture that may be harnessed to enhance fracture complexity. As used herein, the term "net pressure" refers to the pressure in a fracture minus the closure pressure. As used herein, the term "closure pressure" refers to the pressure at which a fracture effectively closes without proppant particulates in place. Typically, as a fracture grows in length, the net pressure will increase due to friction drop along the fracture. Net pressure is also controlled by effects at the fracture tip, or the fracture's resistance to dilation at the fracture tip. More specifically, Phase I is characterized by a hydraulic fracturing treatment resulting in dominate fracture initiation, early time propagation, and extension of a dominate fracture, increasing width during such time, and simplifying the near-wellbore region by reducing bridging volatility, mitigating treatment screen-out risk, and the like.

During Phase I, the dominate fracture(s) is created near the wellbore, while minimizing the amount of fracture complexity in this area (i.e., the creation of near-wellbore pressure dependent leak-off is minimized), and limiting the amount of competing fractures, as discussed below, termed "efficient dominate fracturing." As used herein, the term "efficient dominate fracturing" and grammatical variants (e.g., "efficient dominate fracture") thereof refers to greater than about 70% of a treatment fluid flowing in a dominate fracture with minimal treatment fluid losses (e.g., no more than 20%) to surrounding formation cracks or fractures, thereby contributing to the formation of the dominate fracture. As used herein, the term "near-wellbore pressure-dependent leak-off" or "near-wellbore PDL" refers to pressurized fluid which leaks-off from a fracture in the near-wellbore region, or is initiated near to and competes with a dominate fracture in the near-wellbore region. The term "open," and grammatical variants thereof, refers to dilating or forming a passage or access-way due to near-wellbore PDL mechanisms (e.g., secondary azimuth fractures, described in greater detail below).

Near-wellbore PDL often flows along or dilates competing fractures. Near-wellbore PDL can be described as a pressure relief mechanism, such that when the pressurization of a fracture is too great due to an inability to adjust to a change in volumetric fluid rate or other pressure factors, the fluid pressure in the near-wellbore region reaches the normal stress of insipient or existing formation cracks or fractures, causing them to form. This formation due to increased pressure is termed "apparent critical fissure opening pressure," "apparent fissure opening pressure, or "AFOP," and is dynamic and changing, dependent on fluid viscosity, the efficiency of the fluid, stress field changes taking place in the formation, and the like, and any combination thereof. Because fracture flow rate is related to the cube of aperture based on cubic law, flow rate or apparent leak-off rate will increase dramatically when pressure exceeds AFOP. As used herein, the term "near-wellbore apparent critical fissure opening pressure," "near-wellbore apparent fissure opening pressure," or "near-wellbore AFOP" refers to the relative pressure at which near-wellbore PDL occurs perpendicular or parallel to the minimum horizontal stress in the near-wellbore region.

If fluid pressure is admitted to a series of fractures substantially parallel to the dominate propagating hydraulic fracture, the stiffness, or apparent modulus of the system may increase, causing a stress shadowing or compression effect, thus increasing the closure pressure on the dominate fracture and limiting its width and net pressure. The AFOP is typically greater than the fracture extension pressure, making the ideal bottom hole pressure maintenance between about the minimum fracture extension pressure and about the AFOP. As used herein, the term "fracture extension pressure" refers to the pressure necessary to extend or propagate a nucleated dominate fracture. Thus, near-wellbore PDL will result when the pressure inside a dominate fracture is high enough to overcome the pressure that is keeping natural fissures closed (AFOP) or when the pressure to initiate another fracture is less than the pressure to extend the dominate fracture (fracture extension pressure). The creation of near-wellbore PDL during dominate fracture initiation may undesirably hinder or reduce the propagation and extension of the dominate fracture width aperture, net pressure distribution, hydraulic connection, and the overall size and secondary azimuth fracture complexity (i.e., far field complexity) of the fracture network.

Figure 2:
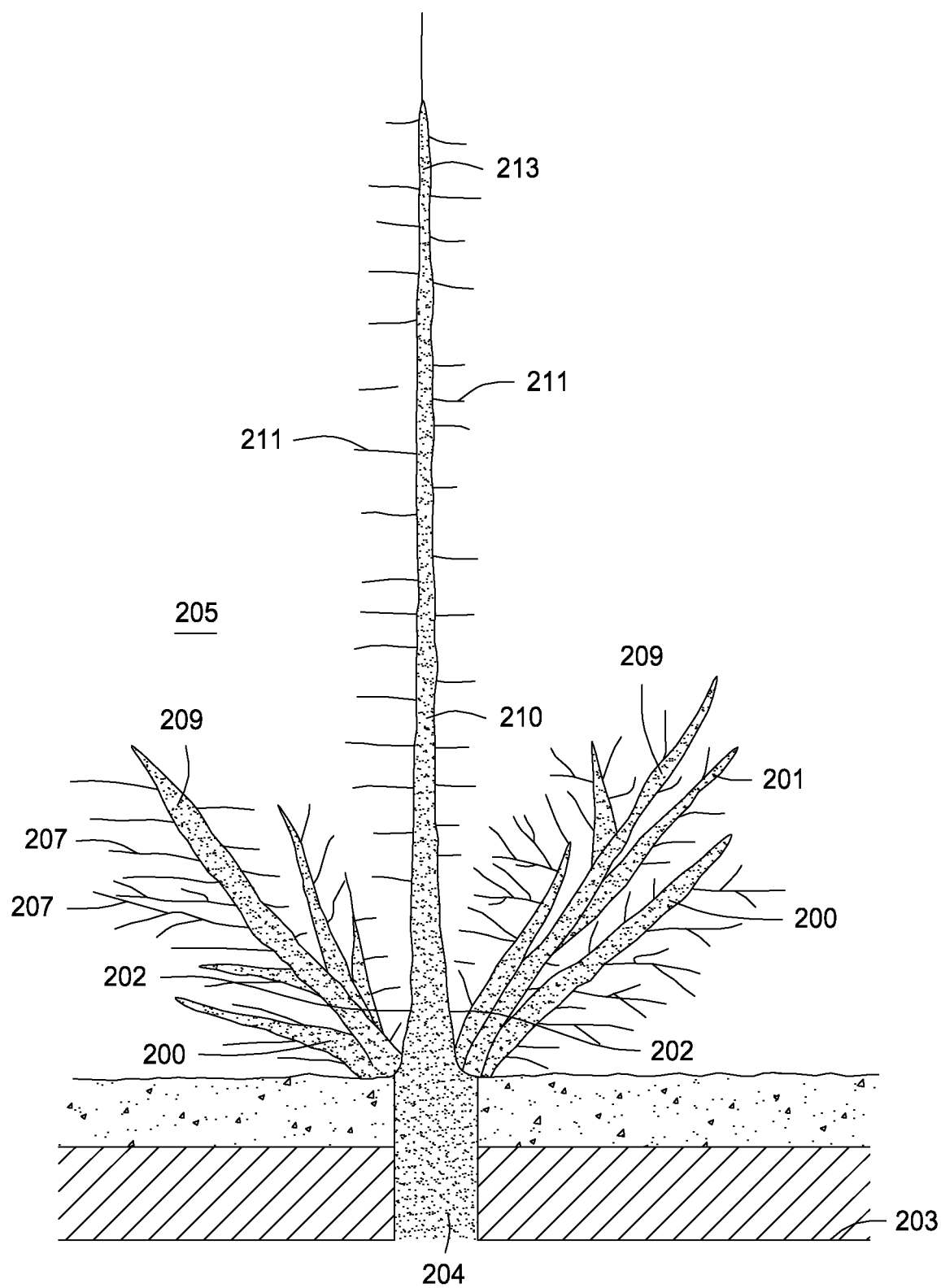
FIG. 2 depicts poor fracture initiation and limited extension of a dominate fracture due to the creation of near-wellbore complexity during initiation and early time propagation according to traditional fracturing methods and traditional low viscosity fracture initiation fluids.

Referring now to FIG. 2, illustrated is an example of poor fracture initiation being formed according to traditional fracturing methods with low viscosity fracture initiation fluids in a formation that is naturally fractured and has a tendency for PDL to occur in the near-wellbore region. The fracture initiation formed according to traditional fracturing methods depicted in FIG. 2 does not employ the incrementally increased fracturing rate step technique described in the present disclosure. FIG. 2 represents the creation of near-wellbore complexity, resulting in limited fracture extension due to poor fracture initiation and early time propagation, common with traditional low viscosity fracturing fluids and uncontrolled fracturing rates (e.g., uncontrolled fracturing rate increases). Low viscosity fluids require a lower pressure to force fluid flow into fractures compared to high viscosity fluids, and further leak-off easily into natural fractures.

As shown in FIG. 2, wellbore 203 is formed in subterranean formation 205. Subterranean formation 205 comprises multiple natural fractures 207 therein, which are present independent of subsequent fracturing operations. An opening 204 (e.g., a perforation) is formed in the wellbore 203 to perform a traditional fracturing operation. Although FIG. 2 depicts only a single opening 204, it will be appreciated that multiple (one, two, three, five, ten, or greater) openings 204 may exist through formation 205, without departing from the scope of the present disclosure. A low-viscosity fracturing fluid (not shown) is pumped into the formation 205 via the wellbore 203 and through the opening 204. A dominate fracture 210 is initiated, but multiple competing fractures 209 are additionally initiated, such as those caused by near-wellbore PDL 200 and 201 directly along the dominate fracture 210 and other competing fractures 209, respectively. Additionally, during traditional fracturing operations, natural fractures 207 are nucleated and dilated. Each of the near-wellbore PDL 200 and 201, the near-wellbore competing fractures 209, and the nucleation and dilation of near-wellbore natural fractures 207 (collectively "near-wellbore complexity") hinders the initiation and early time propagation of the dominate fracture 210, thereby limiting fracture width, length, and net pressure communication to the fracture tip 213. Moreover, the near-wellbore complexity formed during traditional fracturing operations causes a compressive stress shadow 202 formed against the dominate fracture 210, which increases the closure pressure on the dominate fracture 210, further permanently restricting its width, increasing entry friction pressure (described below), and hindering its ability to accept proppant particulates.

As shown, several secondary azimuth fractures 211 are formed using traditional fracturing operations. However, their nucleation, size, and quantity are limited (see comparison to FIG. 4 below), particularly due to the loss of net pressure communication to the fracture tip 213 caused by fluid loss to the formed near-wellbore complexity components (i.e., the near-wellbore PDL 200 and 201, the near-wellbore competing fractures 209, and the nucleation and dilation of near-wellbore natural fractures 207).

In traditional fracturing operations, like that shown in FIG. 2, any rapid increase in the rate of the low-viscosity treatment fluid (LVTF) exceeding the AFOP and thus increasing the bottom hole pressure rapidly would further hinder initiation, propagation, and extension of the dominate fracture 210 by further exacerbating the near-wellbore complexity formed during the fracturing operation.

Optimal dominate fracture initiation and net pressure can be achieved using the Phase I process described herein, through incremental, pressure-dependent fracturing rate step control using a high viscosity treatment fluid (HVTF), resulting in high fluid efficiency in the dominate fracture(s), described herein as an "accumulator" effect. In some embodiments, one, greater than one, greater than two, greater than three, greater than four, greater than five, or even greater dominate fractures may be formed at discrete openings during the Phase I process, without departing from the scope of the present disclosure.

The Phase I process provides uniform breakdown and dominate fracture initiation process controls for efficient capture of fracturing diagnostic variables such as fracture initiation pressure. As used herein, the term "fracture initiation" or "fracture initiation pressure" refers to a pressure that exceeds the minimum horizontal stress of the formation and produces a tinsel rock failure through the introduction of a hydraulic pressure (e.g., using a treatment fluid) to initiate a fracture. This uniformity allows reliable comparison of pressure trends from stage-to-stage and well-to-well, more accurate correlation to seismic attributes and subterranean formation evaluation, and reduction of well production variability.

As used herein, the terms "fracture initiation pressure" and "fracture extension pressure" are collectively referred to as "fracture gradient pressure," meaning that the pressure is sufficient to create or enhance a fracture (e.g., a dominate fracture).

In some instances, when multiple openings are within a treatment zone (e.g., a group of perforations), due to multi-opening stress shadowing, it is likely that outer (also referred to as book-end) openings will be dominate to receive introduced fluids and the inner openings will be pinched and take less fluids, thus being non-dominate. As used herein, the term "outer opening" or "book-end opening" refers to outer most openings in a multi-opening interval. As used herein, the term "inner opening" refers to any openings falling between two or more openings (which may be outer openings) in a multi-opening interval.

When simultaneous fracture initiations occur at multi-opening intervals, they act as competing fractures and cause a portion of the fractures to dilate more by receiving more fracturing treatment fluid. This increased compressive stress radiates outward and perpendicular to the fractures, and can prevent propagation and reduce the width of some fractures at a portion of the openings. This width reduction may cause the openings to accept some fluid early but not later in the treatment operation (e.g., not to accept treatment fluid having proppant entrained therein), or some of the openings to never accept fluid such that the formation is never fractured from those openings. Accordingly, the outer openings in a multi-opening interval may achieve an unaffected width and normal stress because of the mechanical interaction that drives the outer fractures to dilate to the outer side where the stress shadow can be released more easily by the far-field stresses, whereas the inner openings are pinched and receive no or reduced fracturing treatment fluid.

The effects of stress shadowing are the most pronounced in the near-wellbore region. If near-wellbore PDL mechanisms are caused during the dominate fracture initiation process, they will create a stress shadow on the dominate fracture in the near-wellbore region, thus increasing the closure pressure, reducing the dominate fracture width, creating the likelihood of inducing additional near-wellbore PDL by dilating more complexity around the entrance of the fracture, increasing fluid restriction into the dominate fracture, and increasing fluid loss. However, the Phase I process described herein initiates a dominate fracture using a high efficiency fluid to fully dilate and propagate the dominate fracture, thereby placing a strong stress shadow in the formation surrounding it and effectively raising the AFOP near the fracture opening. The result is a reduction in the opening of near-wellbore PDL competing fractures, which may result in an increased dominate fracture width. The dominate fracture stress shadow will remain during the treatment and allow lower viscosity fluids, as discussed with reference to Phase II below, to be placed into the dominate fracture without exceeding the near-wellbore AFOP, resulting in, among other things, improved proppant placement efficiency with lower viscosity fluids.

The Phase I process described herein may enhance multi-opening stress shadowing due to the efficiency of the HVTF tending toward the outer (or more dominate) openings, with minimal entry or leak-off into the inner (or less dominate, or non-dominate) openings. As used herein, the term "dominate opening" refers merely to an opening that receives the highest fractional percentage of fluid and/or proppant. A dominate opening is distinguished from a critical or sub-critical opening, although a critical opening may be dominate, as described in greater detail below. The Phase I process described herein may also enhance the creation of unique dominate fracture location placement within a formation for multiple fracturing cycles over a single zone, as described in the Phase III narrative below. That is, placement of dominate fractures can be performed in a known spatial order relative to one another by reducing near-wellbore PDL at inner, non-dominate openings, and lowering the treating pressure requirements by reducing near-wellbore PDL during the formation of dominate fracture(s) during a first cycle. The reduced preferential flow paths result in dominate fracture initiation at only a limited number of openings across a treatment zone in a formation, thus conserving zonal fracture area, allowing for greater diversion effectiveness and proppant cycle isolation over the zone, and the like.

Further, when stress shadowing occurs and dominate fracture(s) are placed at the outer openings during a first fracturing cycle with minimal flow to the inner openings, a stress alteration phenomenon is likely to occur. Dominate facture extension can cause stress-relief secondary azimuth fractures to form (see FIGS. 1B and 1C). When secondary dominate fractures are placed at openings in between dominate fractures at outer openings, a stress cage effect is created, resulting in a greater chance of hydraulically connecting the stress relief secondary azimuth fractures, thus increasing the interconnected complexity of the fracture network. This type of stress alteration and method for increased fracture complexity is based on the "Texas-Two-Step" concept, which is a method for sequentially placing fractures using mechanical isolation devices between treatment zones and placing a dominate fracture at a first outer opening, then a second dominate fracture at an outer opening away from the first, followed by placing a dominate fracture at an inner opening therebetween.

The process described herein provides a novel method for creating stress cages through sequential placement of Phase I HVTF and Phase II LVTF. The process creates dominate fractures with secondary azimuth fractures at two or more first outer openings, followed by dominate fractures with secondary azimuth fractures extending therefrom placed at one or more inner opening(s) therebetween, thereby connecting the secondary azimuth fractures. In Phase III, a low-viscosity diversion fluid (LVDF) may be introduced to isolate the dominate fractures at the initial outer openings, causing a subsequent (or repeated) Phase I HVTF and Phase II LVTF fracturing cycle, or a Phase II LVTF only fracturing cycle, to be redirected to initiate dominate fractures at the inner openings, thereby creating the secondary azimuth fracture stress cage without any mechanical wellbore intervention methods. The HVTF and Phase I process may generate simple dominate fractures with a mechanism of tensile failure, while lower viscosity treatment fluids and traditional rate establishment methods may cause unpredictable, less dominate, and higher leak-off flow patterns across the openings on each fracturing cycle. As used herein, a "simple fracture," and grammatical variants thereof (e.g., a "simple dominate facture"), refers to a wide, planer fracture with a dominate mechanism of tensile failure (as opposed to multiple shear failure mechanisms).

In some embodiments, Phase I is achieved by first isolating a treatment zone in a wellbore in a subterranean formation, wherein the treatment zone comprises one or more openings through the wellbore and into the subterranean formation. The wellbore for use in the embodiments described herein, including any of Phase I, Phase II, and/or Phase III, may be open hole, wholly or partially cased, or wholly or partially cased with cement, and the like, without departing from the scope of the present disclosure. The treatment zone may be isolated by any means known in the art including, but not limited to, a flow-through or a non-flow through wellbore isolation device (e.g., a frac plug, a bridge plug, a packer, a wiper plug, a cement plug, a sliding sleeve, a chemical isolation agent (e.g., a diverting agent), and the like). As used herein, the term "flow-through wellbore isolation device" refers to a device which allows fluid bypass until a ball is introduced into the well and seated on a bypass orifice and fluid flow is restricted. The term "non-flow-through wellbore isolation device" refers to any plug which does not have a bypass orifice or one where the ball is held in a cage.

After the first treatment zone is isolated, a HVTF is introduced into the subterranean formation at the treatment zone. The HVTF may comprise a base fluid and a gelling agent. In some embodiments, the viscosity of the HVTF may be in the range of about 0.006 pascal seconds (Pa*s) to about 5.0 Pa*s, encompassing any value and subset therebetween, such as about 0.006 Pa*s to about 1 Pa*s, or about 1 Pa*s to about 2 Pa*s, or about 2 Pa*s to about 3 Pa*s, or about 3 Pa*s to about 4 Pa*s, or about 4 Pa*s to about 5 Pa*s, encompassing any value and subset therebetween. In some embodiments, the viscosity of the HVTF may be in the range of from a lower limit of about 0.006 Pa*s, 0.003 Pa*s, 0.001 Pa*s, 0.01 Pa*s, 0.05 Pa*s, 0.1 Pa*s, 0.25 Pa*s, 0.5 Pa*s, 0.75 Pa*s, 1.0 Pa*s, 1.25 Pa*s, 1.5 Pa*s, 1.75 Pa*s, and 2 Pa*s to an upper limit 5.0 Pa*s, 4.75 Pa*s, 4.5 Pa*s, 4.25 Pa*s, 4.0 Pa*s, 3.75 Pa*s, 3.5 Pa*s, 3.25 Pa*s, 3.0 Pa*s, 2.75 Pa*s, 2.5 Pa*s, 2.25 Pa*s, and 2.0 Pa*s (or about 6 centipoise (cP) to about 5000 cP), encompassing any value and subset therebetween. In some embodiments, the viscosity of the HVTF may be in the range about 10 pounds (lb) to about 80 lb by weight of the gelling agent in the HVTF, encompassing any value and subset therebetween, such as about 10 lb to about 14 lb, or about 14 lb to about 28 lb, or about 28 lb to about 42 lb, or about 42 lb to about 56 lb, or about 56 lb to about 70 lb, or about 70 lb to about 80 lb by weight of the gelling agent in the HVTF, encompassing any value and subset therebetween. In some embodiments, the viscosity of the HVTF may be in the range of a lower limit of about 10 lb, 12 lb, 14 lb, 16 lb, 18 lb, 20 lb, 22 lb, 24 lb, 26 lb, 28 lb, 30 lb, 32 lb, 34 lb, 36 lb, 38 lb, 40 lb, 42 lb, 44 lb, 46 lb, and 50 lb to an upper limit of about 80 lb, 78 lb, 76 lb, 74 lb, 72 lb, 70 lb, 68 lb, 66 lb, 64 lb, 62 lb, 60 lb, 58 lb, 56 lb, 54 lb, and 50 lb by weight of the gelling agent in the HVTF, encompassing any value and subset therebetween. Each of these values is critical to the embodiments of the present disclosure and depends on a number of factors including, but not limited to, the type of subterranean formation, the desired location and size of the dominate fracture, the type of aqueous base fluid included, and the like, and any combination thereof.

Next, a plurality of incrementally increased fracturing rate steps (IIFRS) may be applied to the HVTF until a maximum fracturing rate is reached. The "rate" of the IIFRSs refers to the magnitude of the pressure applied, and the "steps" of the IIFRSs refers to the increase in pressure applied. As used herein, the term "maximum fracturing rate" refers to the maximum fracturing rate assigned to a particular fracturing operation, or stage thereof (e.g., a spacer fluid stage, a rate increase stage (e.g., which may be between any of Phase I, Phase II, or Phase III), and the like), typically achieved early in the fracturing treatment. The maximum fracturing rate may be defined or otherwise dependent upon factors including, but not limited to, treatment zone design, surface pressure limitations, pumping schedule sequence, and the like. Unless specified otherwise, the term "rate" generally refers to the fluid flow rate of the specified fluid.

The IIFRSs may be applied to create or enhance a dominate fracture in the treatment zone through the opening or through multiple openings. In some embodiments, the pressure of the IIFRSs is above about fracture gradient pressure, that is, above the fracture initiation pressure and/or the fracture extension pressure. In all instances, the pressure of the IIFRSs is below the near-wellbore AFOP. Additionally, each IIFRS in any given Phase I process need not be identical in rate; indeed, some rate increases (i.e., subsequent IIFRSs) may be the same and some may vary in either an upper or lower direction from any other IIFRS in a particular Phase I process (including multiple stages), without departing from the scope of the present disclosure. In some embodiments, as described below, IIFRSs may also be applied to the Phase II process to create enhanced secondary azimuth complex fracture geometry. In such instances, the maximum fracturing rate may not be achieved until such Phase II IIFRSs are applied, which is explained in greater detail below with reference to net pressure pulsing and sequence transport of particulates.

Figure 3:
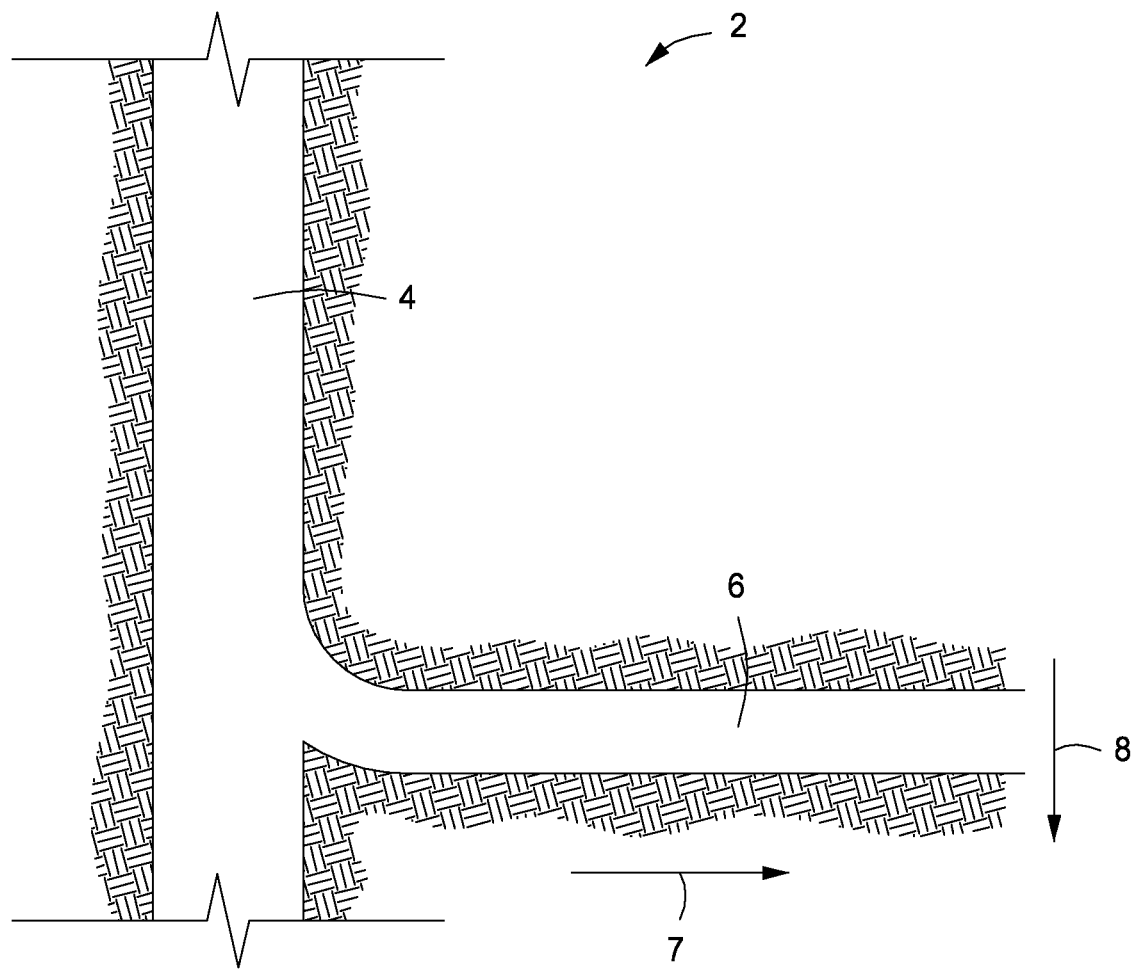
FIG. 3 depicts a wellbore orientation in relation to minimum Hmin and maximum horizontal stresses Hmax according to one or more embodiments of the present disclosure.

FIG. 3 depicts an embodiment of wellbore orientation in relation to minimum and maximum horizontal stresses for the methods described herein. As a non-limiting example, a wellbore 2 may have a substantially vertical portion 4 and a substantially horizontal portion 6. In some embodiments, the wellbore 2 may be in a low permeability or ultra-low permeability subterranean formation, such as a shale formation, as previously described. With reference to the substantially horizontal portion 6, the minimum horizontal stress 7 may proceed along the longitudinal portion thereof and the maximum horizontal stress 8 may be along the width portion thereof. That is, the minimum horizontal stress 7 is parallel to the substantially horizontal portion 6 of the wellbore 2. Although not depicted, the same orientation would apply to the substantially vertical portion 4 of the wellbore 2, as well as deviated wellbore portions (not shown). These horizontal stresses allow transverse fracture orientation and complex fracture generation using the one or more Phases described herein.

The IIFRSs may be both pressure and time dependent, regardless of whether they are applied to a HVTF or a LVTF, as described herein, and characterized by the slope of the downhole pressure over time, which will increase, decrease, or stabilize at a measured slope. Generally, each singular IIFRS is separated by one of a stabilizing pressure slope or a declining pressure slope before applying a subsequent IIFRS. As used herein, the term "stabilizing pressure slope" refers to an unchanging treating pressure or a relatively unchanging fracturing rate, defined as +/−about 50 psi/min or less at a stabilized fracture rate. The term "declining pressure slope" refers to a negative pressure slope (i.e., decreasing) of greater than about 50 psi/min for a stabilized rate after an IIFRS. The term "stabilized fracture rate" or "stabilized rate" refers to about 1 barrel per minute (bbl/min). In practice, the determination of whether a stabilizing pressure slope or a declining pressure slope for a stabilized rate occurs may be determined using computerized output systems displaying the pressure or the first derivative of pressure, or the rate or the first derivative of rate, in real time and/or observation of such pressure and/or rate by an operator or by another computer algorithm. Accordingly, such IIFRSs may be manually controlled or automated, without departing from the scope of the present disclosure.

In some instances, where the subsequent IIFRS is applied after a stabilizing or declining pressure slope is observed, the amount of time elapsed before the subsequent IIFRS may vary. Generally, it is desirable to rapidly make each IIFRS as soon as a stabilizing or declining pressure drop is observed to maintain fluid momentum and kinetic energy at the fracture tip of the dominate fracture for efficient propagation or extension of the dominate fracture (or any secondary azimuth fractures, if applicable). By harnessing the momentum of propagation and extension and communication of net pressure to the fracture tip, the magnitude of each pulse of pressure near the wellbore generated by each IIFRS can be minimized, thus reducing the likelihood of exceeding near-wellbore AFOP and initiating near-wellbore PDL relief mechanisms or other competing fractures. A higher pressure pulse is produced when restarting and accelerating fracture early time propagation than is for continuing an ongoing fracture extension.

In some embodiments, the subsequent IIFRSs may preferably be applied immediately following a declining pressure slope that exceeds about 354 kilopascal per min (kPa/min) (or about 50 pounds per square inch per minute (psi/min)). Application of the subsequent IIFRSs should be immediately applied in such circumstances, with a time elapse of no more than about 10 seconds.

The IIFRSs, in combination with the HVTF, in Phase I create or enhance the dominate fracture (e.g., initiates) and propagates and extends the dominate fracture by maintaining dominate transverse fracture growth in the formation. Dominate transverse fracture growth is maintained by controlling near-wellbore PDL and mitigating fracture height growth as the subsequent IIFRSs are increased, by promoting optimal formation failure and fracture extension mechanisms, by generating efficient net pressure communication throughout the early time dominate fracture geometry propagation and extension, and the like, and any combination thereof. Specifically, the combination of the IIFRSs and the HVTF can be used to enhance net pressure by increasing the volume of the dominate fracture in a length trajectory and a width trajectory, while staying below the near-wellbore AFOP, thus creating the "accumulator" effect characterized by efficient build-up and storage of net pressure. The combination of the IIFRSs and the HVTF also enhances the incidence of disturbed formation rock along the length of the dominate fracture, creating weak points which can be nucleated, opened, or sheared further, as part of the Phase II process described below.

The IIFRSs of Phase I additionally provide another important attribute of controlling height growth of the dominate fracture early in time. Due to the high viscosity of the HVTFs used for fracture initiation, early time propagation, and extension during Phase I, the pressure required to force fluid flow into a dominate fracture may be increased over low viscosity fluids (e.g., as slickwater). This mechanism slows fluid penetration into naturally occurring fissures by reducing the tendency for near-wellbore PDL to occur or open, and effectively raises the fluid's specific or apparent fissure opening pressure. This increased resistance to form secondary azimuth fractures entry may result in temporarily higher net pressure in the dominate fracture, which can cause excessive height growth in areas prone to it, if not modulated. Height growth may be mitigated by controlling the net pressure pulses generated during rate establishment through low IIFRSs in Phase I, and reducing the viscosity of the HVTF within the range discussed herein, if necessary.

In some embodiments, in practice, the pressure slope may neither stabilize nor decline between the two IIFRSs, but instead increase, such that two IFRSs are separated by a period characterized by an increasing pressure slope for a stabilized fracturing rate. As used herein, the term "increasing pressure slope" refers to a positive treating pressure slope (i.e., increasing) of greater than about 50 psi/min for a stabilized rate after an IIFRS. In such instances, the increased pressure slope must be controlled to ensure that the pressure is directed to propagating and extending only the dominate fracture and to continue to minimize near-wellbore PDL. Accordingly, prior to applying the next IIFRS, a stabilized pressure slope must be achieved which may be done by holding the rate until a stabilized pressure slope is observed, thus allowing the near-wellbore PDL to relax and close. In other instances, a decreased fracturing rate step may first be performed until the stabilizing pressure slope or a declining pressure slope is achieved. Once the stabilizing pressure slope or the declining pressure slope is achieved, the subsequent IIFRS may then be applied.

The rate, viscosity, and fluid efficiency driven constant net pressure communication to the fracture tip of the dominate fracture in Phase I results in fluid energy storage or the "accumulator" effect in the dominate fracture, which is harnessed using the subsequent Phase II process described below to create secondary azimuth fracture complexity.

Figure 4:
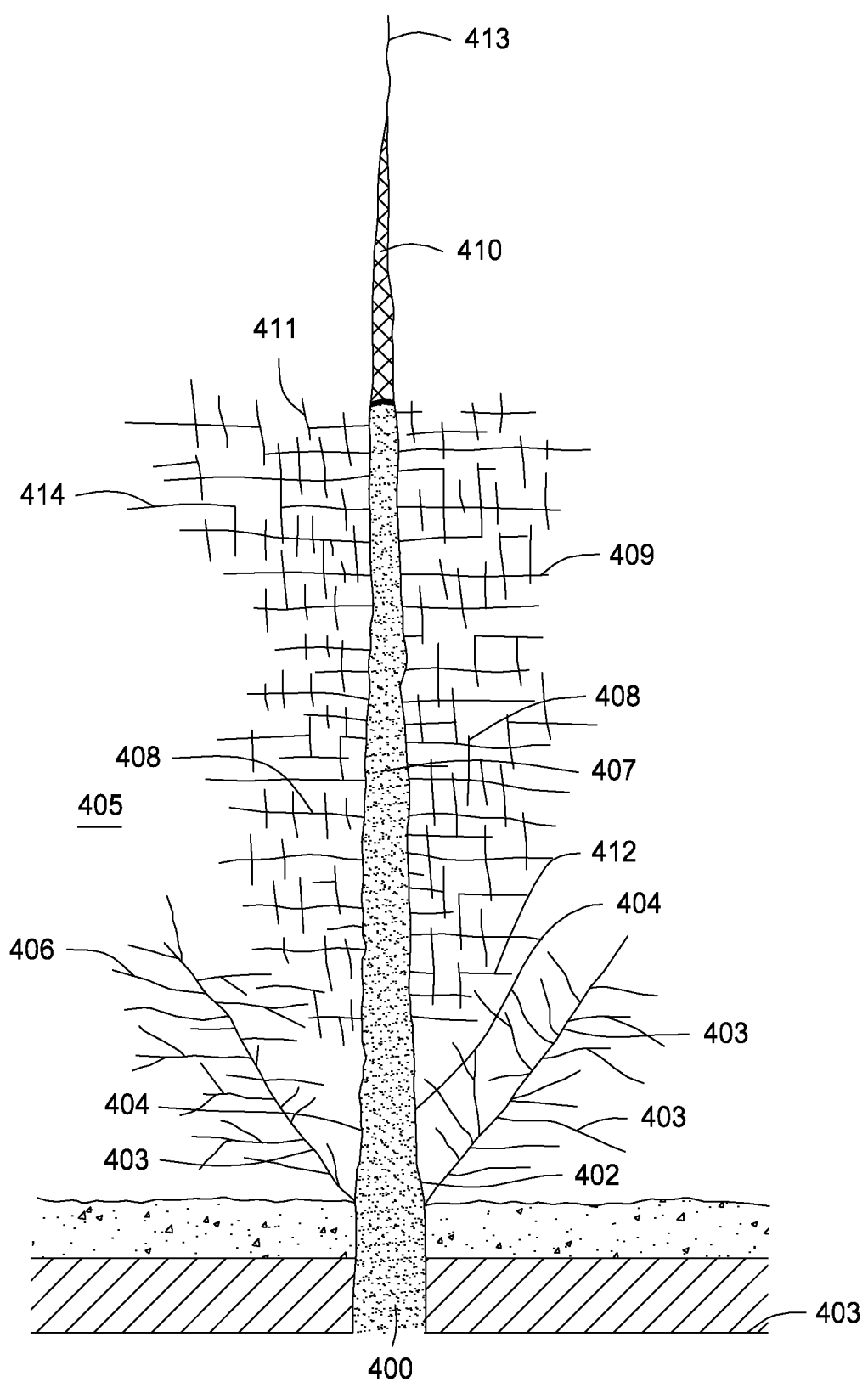
FIG. 4 depicts a complex fracture geometry comprising a dominate fracture and secondary azimuth fractures being formed according to one or more embodiments of the present disclosure.

Referring now to FIG. 4, illustrated is a complex fracture geometry formed according to the Phase I and Phase II described herein. As shown, wellbore 403 is formed in subterranean formation 405. Subterranean formation 405 comprises multiple natural fractures 406 and 414 in the near-wellbore region and the far-field region, respectively, which are present independent of subsequent fracturing operations. An opening 400 (e.g., a perforation) is formed in the wellbore 403 to perform the Phase I and Phase II fracturing operations of the present disclosure. Although FIG. 4 depicts only a single opening 400, it will be appreciated that multiple (one, two, three, five, ten, or greater) openings 404 may exist through formation 405, without departing from the scope of the present disclosure.

As shown, during the Phase I process, an HVTF 410 is first introduced through the opening 400 to form a simple dominate fracture 402. Thereafter, secondary azimuth fractures 408, 409, and 411, described in detail below are formed by introduction of a LVTF 407, characterizing the Phase II process. Accordingly, unlike traditional fracturing operations described herein and with reference to FIG. 2, the Phase I and Phase II processes of the present disclosure decouple far-field complexity from near-wellbore complexity during initiation, early time propagation, and extension of the dominate fracture 402.

During Phase I, the opening 400 is saturated with the HVTF 410, which is described in greater detail below. Thereafter, IIRFS(s) are applied to the HVTF 410 to initiate, propagate, and extend the dominate fracture 402. The simple dominate fracture 402 formed according to the Phase I process is a wide and planar in geometry, having a primary fracturing mechanism of tensile opening. The Phase I process creates efficient communication of net pressure to the fracture tip 413 to extend the dominate fracture 402. The Phase I process results in efficient dominate fracturing of the dominate fracture 402 during initiation, early time propagation, and extension, thus reducing or preventing near-wellbore PDL 403 formation, depicting closed near-wellbore PDL (see FIG. 2 for comparison) and reducing or preventing fluid flow to natural fractures 406 and 414. Additionally, the application of the IIFRS(s) during Phase I aids in keeping the natural fractures 406, 414 and near-wellbore PDL 403 closed such that competing fractures are not formed by maintaining a stable bottom hole pressure below the near-wellbore AFOP. The combination of the HVTF 410 and the IIFRS(s) enhance the net pressure magnitude thereby increasing the volume of the dominate fracture 402 in width and length while staying below the near-wellbore AFOP, thus creating the "accumulator" affect described herein. The combination of the HVTF 410 and the IIFRS(s) also enhances the incidence of shear offset secondary azimuth fractures 409 along the length of the dominate fracture 402, creating weak points which can be nucleated, opened, or sheared further, to create far-field secondary azimuth fractures 408 during the Phase II process below.

As shown, during Phase I, the efficient initiation of the dominate fracture 402 with the near-wellbore PDL remaining closed results the dominate fracture 402 results in a strong stress shadow 404 in the formation 405 surrounding it and effectively raises the near-wellbore AFOP near the opening 400 to prevent opening of near-wellbore PDL 403, which may result in an increased dominate fracture 102 width. The dominate fracture 402 stress shadow 404 remains in place during the Phase II process to allow the LVTF 407 to be placed into the dominate fracture 402 without exceeding the near-wellbore AFOP, resulting in, among other things, improved proppant placement efficiency.

With continued reference to FIG. 4, the LVTF 107 is introduced into the subterranean formation 405 at a pressure above the far-field AFOP (and above the fracture initiation pressure) to create or enhance secondary azimuth fractures 412 in the near-wellbore, and far-field secondary azimuth fractures 408, including those formed by stress relief fractures 411 parallel to the dominate fracture 402, in the far-field region. The LVTF 407 has a lower viscosity relative to the HVTF 410, and thus more easily forms the secondary azimuth fractures 412, 408, and 411. The LVTF 407 nucleates secondary azimuth fractures 412, 408, and 411 as it enters the dominate fracture 402 and encounters weak shear points 409 near the face of the dominate fracture 402, or simply due to the increased net pressure along the dominate fracture 402 generated during the Phase I process. Essentially, the LVTF 407 dissipates the fluid energy stored by the HVTF 410 to create secondary azimuth fractures 412, 408, and 411. In some instances, the LVTF 407 may comprise particulates, and pressurization of the secondary azimuth fractures 412, 408, and 411 by the LVTF 407 combined with the high net pressure communicated along the dominate fracture 402 is used to place the particulates into the secondary azimuth fractures 412, 408, and 411.

In some embodiments, prior to introducing the HVTF, another fluid is pumped in the wellbore and a rapid decrease in the rate of such fluid of greater than about 10% to a maximum of about 100% of the total downhole rate (e.g., about 5 barrels per min or greater) may be applied and maintained until the pressure is reduced below the AFOP, allowing the near-wellbore PDL mechanisms to close. A "barrel" is equivalent to 42 gallons (1 gallon=3.758 liters). The rapid reduction in rate will also close any secondary azimuth fractures formed during Phase II, thus reducing the fracture complexity and re-increasing the fluid efficiency in the dominate fracture. The rapid reduction may additionally be effective in mitigating a screen-out and inducing a fracture reorientation or new secondary azimuth growth in Phase II. Moreover, this rapid reduction may allow mitigation of undesirably formed fracture networks prior to any of the Phase processes described herein by closing non-dominate fractures to facilitate dominate fracture initiation, propagation, and extension of the dominate fracture using the Phase I process. Such rapid reduction may also be performed after any of the Phase processes to correct any fracture network formation that is undesirable (e.g., by incorrect application of IIFRSs).

In some embodiments, an acidizing treatment (e.g., acid bullhead treatment) utilizing an acid base fluid may be performed prior to the step of introducing the HVTF into the subterranean formation using an acid base fluid. In other embodiments, an acid base fluid may itself may be used to form the HVTF, as described below. Such acid base fluids may be used acidize the wellbore to remove near-wellbore formation damage or other damaging substances to further enhance the production desired fluids from the formation. For example, such acid base fluids may effectively increase the radius of the wellbore or the dominate fracture(s).

In some embodiments, the steps of introducing the HVTF, applying the IIFRSs, and increasing the volume of the dominate fracture may be repeated at the treatment zone (i.e., the same treatment zone). For example, the steps may be performed as part of a re-fracturing operation with vertical or horizontal treatment zones and a large number of openings, both new and existing. In other embodiments, the steps of introducing the HVTF, applying the IIFRSs, and increasing the volume of the dominate fracture may be repeated at at least a second treatment zone. That is, multiple treatment zones, without limitation, in a subterranean formation may be treated using the Phase I process described herein.

As previously described, in some embodiments, the treatment zone may be isolated in the wellbore using a flow-through isolation device. Such flow-through isolation devices may include, but are not limited to, a sliding sleeve, a frac plug, a bottom wiper plug (e.g., after rupture), and the like. In instances where the flow-through isolation device is open to flow-through, the HVTF may be introduced into the subterranean formation as part of Phase I at a displacement rate below the fracture initiation pressure of the treatment zone to be isolated, thereby saturating the treatment zone of interest prior to applying the IIFRSs. As used herein, the term "displacement rate" refers to the rate at which a treatment fluid (e.g., a HVTF, a LVTF, and the like) is introduced into a subterranean formation. The terms "saturating" and "saturation" and grammatical variants thereof (also referred to as "spotting") the treatment zone with a treatment fluid (e.g., the HVTF) means a displacing a volume of the treatment fluid to the furthest opening in terms of measured length or depth in a treatment zone in addition to introducing at least 10 barrels of the treatment fluid. Such saturation raises the near-wellbore AFOP to mitigate the near-wellbore PDL mechanisms, and aids (e.g., simplifies) in the fracture initiation and early time propagation of a dominate fracture to create sufficient net pressure communication for enhancing secondary azimuth fracture complexity during Phase II.

Introducing the HVTF below the fracture initiation pressure in such cases may result in no significant early time propagation of the dominate fracture until the HVTF is displaced across the entire treatment zone. The IIFRSs may be applied at a rate of about 1% to about 100% of the displacement rate, encompassing any value and subset therebetween, such as about 1% to about 20%, or about 20% to about 40%, or about 40% to about 60%, or about 60% to about 80%, or about 80% to about 100% of the displacement rate, encompassing any value and subset therebetween. The IIFRSs may then be applied at a rate in the range of a lower limit of about 1%, 5%, 10%, 15%, 20%, 25%, 30%, 35%, 40%, 45%, and 50% to an upper limit of about 100%, 95%, 90%, 85%, 80%, 75%, 70%, 65%, 60%, 55%, and 50% of the displacement rate, encompassing any value and subset therebetween. In some embodiments, this rate may be in the range of about 10% to about 50%.

In some embodiments, the rate of the IIFRSs where an opened flow-through isolation device is used may be in the range of about 2.4 cubic meters per minute ($m^3$/min) to about 0.4 $m^3$/min, encompassing any value and subset therebetween, such as about 0.4 $m^3$/min to about 0.8 $m^3$/min, or about 0.8 $m^3$/min to about 1.2 $m^3$/min, or about 1.2 $m^3$/min to about 1.6 $m^3$/min, or about 1.6 $m^3$/min to about 2.0 $m^3$/min, or about 2.0 $m^3$/min to about 2.4 $m^3$/min, encompassing any value and subset therebetween. In some embodiments, the rate of the IIFRSs where an opened flow-through isolation device is used may be in the range of an upper limit of about 2.4 $m^3$/min, 2.3 $m^3$/min, 2.2 $m^3$/min, 2.1 $m^3$/min, 2.0 $m^3$/min, 1.9 $m^3$/min, 1.8 $m^3$/min, 1.7 $m^3$/min, 1.6 $m^3$/min, 1.5 $m^3$/min, 1.4 $m^3$/min, 1.3 $m^3$/min, and 1.2 $m^3$/min to a lower limit of about 0.4 $m^3$/min, 0.5 $m^3$/min, 0.6 $m^3$/min, 0.7 $m^3$/min, 0.8 $m^3$/min, 0.9 $m^3$/min, 1.0 $m^3$/min, 1.1 $m^3$/min, and 1.2 $m^3$/min (or about 15 bbl/min to about 3 bbl/min), encompassing any value and subset therebetween.

In other embodiments, the treatment zone may be isolated in the wellbore using a non-flow-through isolation device. It will be appreciated that, as described herein, non-flow through isolation devices are those that restrict flow therethrough and, thus, may include flow-through isolation devices that are blocked or otherwise plugged to restrict flow through. Accordingly, examples of suitable non-flow-through devices may include, but are not limited to, a cement plug, a ball and cage frac plug, a bottom wiper plug (e.g., before rupture), a top wiper plug, and the like.

In embodiments where the isolation device is a non-flow through device and is closed to flow, the HVTF may be introduced into the subterranean formation as part of Phase I at a displacement rate below about 2.4 $m^3$/min (or below about 15 bbl/min), thereby saturating the treatment zone of interest prior to applying the IIFRSs. Introducing the HVTF below about 2.4 $m^3$/min in such cases may result in early time propagation of the dominate fracture with a tendency to not exceed the AFOP until the HVTF is displaced across the entire treatment zone. The IIFRSs may then be applied generally at a rate of about 1% to about 100% of the displacement rate, encompassing any value and subset therebetween, such as about 1% to about 20%, or about 20% to about 40%, or about 40% to about 60%, or about 60% to about 80%, or about 80% to about 100% of the displacement rate, encompassing any value and subset therebetween. The IIFRSs may then be applied generally at a rate in the range of a lower limit of about 1%, 5%, 10%, 15%, 20%, 25%, 30%, 35%, 40%, 45%, and 50% to an upper limit of about 100%, 95%, 90%, 85%, 80%, 75%, 70%, 65%, 60%, 55%, and 50% of the displacement rate, encompassing any value and subset therebetween. In some embodiments, this rate may be in the range of about 10 to about 50%.

In some embodiments, the rate of the IIFRSs where a closed non-flow-through isolation device is used may be in the range of about 2.4 cubic meters per minute ($m^3$/min) to about 0.4 $m^3$/min, encompassing any value and subset therebetween, such as about 0.4 $m^3$/min to about 0.8 $m^3$/min, or about 0.8 $m^3$/min to about 1.2 $m^3$/min, or about 1.2 $m^3$/min to about 1.6 $m^3$/min, or about 1.6 $m^3$/min to about 2.0 $m^3$/min, or about 2.0 $m^3$/min to about 2.4 $m^3$/min, encompassing any value and subset therebetween. In some embodiments, the rate of the IIFRSs where a closed non-flow-through isolation device is used may be in the range of an upper limit of about 2.4 $m^3$/min, 2.3 $m^3$/min, 2.2 $m^3$/min, 2.1 $m^3$/min, 2.0 $m^3$/min, 1.9 $m^3$/min, 1.8 $m^3$/min, 1.7 $m^3$/min, 1.6 $m^3$/min, 1.5 $m^3$/min, 1.4 $m^3$/min, 1.3 $m^3$/min, and 1.2 $m^3$/min to a lower limit of about 0.4 $m^3$/min, 0.5 $m^3$/min, 0.6 $m^3$/min, 0.7 $m^3$/min, 0.8 $m^3$/min, 0.9 $m^3$/min, 1.0 $m^3$/min, 1.1 $m^3$/min, and 1.2 $m^3$/min (or about 15 bbl/min to about 3 bbl/min), encompassing any value and subset therebetween.

Each of the above values related to the rate of IIFRSs during Phase I is critical to the embodiments of the present disclosure and depend on a number of factors including, but not limited, the presence and type of isolation devices, the maximum fracturing rate, the desired geometry of the dominate fracture, the type of subterranean formation, and the like, and any combination thereof.

As a non-limiting example of a field procedure applying the Phase I method described herein, it may be performed as part of a "plug-and-perf" operation. As used herein, the term "plug-and-perf" refers to a multi-stage fracturing operation where a treatment zone is isolated with a flow-through or non-flow-through isolation device, multiple openings are created into a subterranean formation, and a single or multiple fracturing operation is performed; following completion of the fracturing operation, a plug is set to isolate new openings from the completed interval and the process is repeated until each desired treatment zone is isolated and fractured. In such operations, a frac plug ball will be dropped when the wellhead is opened, following a pressure test, at which time pumping operations begin. This requires almost a full wellbore volume of treatment fluid to be displaced at rate in the range of the IIFRS ranges discussed above (e.g., from about 0.4 $m^3$/min to about 2.4 $m^3$/min (or from about 3 bbl/min to about 15 bbl/min)). As a non-limiting example, once the initial ball displacement rate is stabilized at about 1.6 $m^3$/min, an HVTF is introduced and the Phase I process is begun: (1) the frac ball lands and the HVTF fluid is introduced into new opening(s) at about 1.6 $m^3$/min and (2) the IIFRSs are applied at about 0.8 $m^3$/min increments based on pressure slope interpretations described herein until the maximum fracturing rate is achieved.

When a stabilizing or declining pressure slope is observed for each IIFRS, another IIFRS is thereafter applied (e.g., immediately). If a stabilizing or declining pressure is not observed after an IIFRS, rate is held constant until pressure flattens to allow any fissures (e.g., fractures, cracks, and the like) in the subterranean formation to relax. The Phase I process is analogous to driving a wedge into the dominate fracture and letting any induced dilation of near-wellbore PDL to relax before applying a subsequent IIFRS, thereby mitigating stress shadowing influences on the dominate fracture. If an IIFRS is applied with the fissures form, they will be dilated resulting in a compression or stress shadow to the dominate fracture, reducing its width and increasing the bottom hole pressure requirements to maintain fluid injection. Opening of near-wellbore PDL fissures is evident by an increasing or exponentially increasing pressure slope for a stabilized fracturing rate following each IIFRS.

By dropping the frac ball when the well is open and introducing the HVTF immediately thereafter, any fluid (e.g., slickwater) in the wellbore from a previous treatment (e.g., a flush stage) will be introduced into the previous treatment zone's openings during HVTF displacement. Once the ball reaches the flow-through frac plug, the trailing HVTF is immediately introduced into the openings in the isolated treatment zone. The HVTF will enter the openings at the low rate where very little near-wellbore complexity or PDL would be opened because the rate is below the near-wellbore AFOP. Additionally, introduction of the HVTF or any spacer fluid (between frac ball and leading edge of HVTF) is likely to enter only one opening or group of openings such that any fracture geometry created with the fluid from the previous treatment zone is minimal. The Phase I process may be performed such that the HVTF reaches a treatment zone immediately after the frac ball lands on the flow-through frac plug, at which point, often indicated by a pressure response indicator (i.e., pressure slope change), the IIFRSs are commenced.

If near-wellbore PDL occurs during Phase I (i.e., if the near-wellbore AFOP is exceeded), the IIFRS rate is held steady or decreased, as described previously, until a stabilizing or declining pressure slope is observed to allow any near-wellbore PDL mechanisms to relax or close before applying the next IIFRS. If rate is increased when near-wellbore PDL is formed (or opened), leak-off occurs and competing fractures may be formed, thus squeezing in on the dominate fracture, further exacerbating near-wellbore restriction. Accordingly, as described herein, Phase I increases the stress shadow effect from the dominate fracture on the formation and effectively raises the near-wellbore AFOP; this allows for a low viscosity second fluid "LVTF", as described with reference to Phase II below, to be pumped into the dominate fracture without exceeding the near-wellbore AFOP. Further, it is expected, due to stress effects, that the near-wellbore AFOP will be greater than the far-field AFOP, including those associated with secondary azimuth fractures in Phase II. Without being bound by theory, stress shadowing effects are higher in the near-wellbore region due to compaction. The incipient placement of the dominate fracture irreversibly increases near-wellbore PDL, allowing lower viscosity fluids to be utilized for exceeding the far-field AFOP, and creating secondary azimuth fracture complexity and intensity.

As discussed in greater detail below, as used herein, the term "far-field apparent fissure opening pressure," "far-field apparent critical fissure opening pressure," or "far-field AFOP" refers to the relative pressure at which secondary azimuth fractures along the dominate fracture are formed through pressurized fluid dilation, shear failure, or nucleation of incipient hydraulic fractures. The near-wellbore and fair-field AFOPs are dependent on a number of factors including, but not limited to, fluid rheology (e.g., the HVTF, as well as the other treatment fluids described below), the type of subterranean formation, the stresses in the subterranean formation, and the like, and any combination thereof.

Initiation, early time propagation, and extension of a simple, dominate fracture throughout the Phase I process using the HVTF creates efficient extension, storage and communication of fluid energy (net pressure) throughout the dominate fracture, which may be referred to as a high back pressure in the dominate fracture. As used herein, the term "back pressure" refers to net pressure distributed in a fracture, which is generated by the resistance to tensile failure at the propagating and extending fracture tip, and is communicated from the fracture tip back to the fracture entrance. This pressure is created through maintaining the momentum of propagation and extension during the IIFRSs using the HVTF in Phase I. If the dominate fracture volume increase in the length and width trajectories outpaces the fluid velocity in that direction, then a loss in fracture tip pressure and fluid momentum will result. The goal of Phase I is to achieve efficient communication of pressure and fluid momentum to the fracture tip during the initiation, early time propagation, and extension of the dominate fracture to aggressively drive net pressure up, while staying below the near-wellbore AFOP so as to not result in near-wellbore PDL.

Thereafter, Phase II utilizes a LVTF to lower the far-field AFOP and harnesses the stored energy or back pressure in the dominate fracture(s) to nucleate or form hydraulically connected secondary azimuth fracture complexity, including far-field PDL. Specifically, after the HVTF increases the volume of the dominate fracture (including more than one dominate fracture at a group of openings, in some instances), Phase II is performed by introducing a LVTF into the subterranean formation and into the dominate fracture to enhance facture complexity by creating secondary azimuth fractures, including far-field PDL and, in some instances, complex fracture branches extending therefrom. By increasing fracture complexity, the overall fracture surface area and drainage capacity of the fracture network is enhanced to maximize flowing conductive area for produced fluids.

The higher and more evenly distributed net pressure generated through the Phase I process, coupled with the proceeding LVTF of the Phase II process, lowers far-field AFOP, promotes the failure of new shear offset and tinsel crack or fracture nucleation off the dominate fracture in the direction of secondary azimuth (i.e., secondary azimuth fractures), and dilation and extension of intersected natural fractures for opening of natural, secondary, tertiary, and micro-fractures therefrom. As used herein, the term "secondary azimuth fracture" also encompasses any additional fracture branches extending from the secondary azimuth fracture (e.g., shear offset, shear dilation, share failure, microfractures, natural fractures, far-field PDL, and the like) unless specifically stated otherwise.

Creation of the complex fracture network using Phase I and Phase II of the present disclosure provides a large interconnected, stimulated volume that may enhance well productivity and hydrocarbon recovery, including in low permeability formations such as shales. The additional conductive surface area in the secondary azimuth direction increases the likelihood of intersection and hydraulic connection to natural fractures and micro-fractures in the fracture network, and/or weak points of shear offset in the fabric of the formation reservoir that can be opened and, in some instances as described below propped, thereby increasing effective complex fracture volume and overall drainage surface area. The secondary azimuth fractures are in some cases opening against the maximum horizontal stress (see FIG. 3), and thus may be enhanced through sequential stress alteration to reduce anisotropy and to create stress relief secondary azimuth fractures (i.e., see FIGS. 1B and 1C) with a high net pressure efficiently distributed in the main fracture. As used herein, the term "stress relief" with reference to secondary azimuth fractures means a secondary azimuth fracture formed beginning perpendicular to the direction of a compressive force (i.e., from net pressure).

The sequential injection of the HVTF in Phase I followed by the LVTF in Phase II enhances fracture complexity by providing a higher net pressure due to momentum of propagation and friction along the dominate fracture as the dominate fracture grows in the length. The combined processes decouple fracture complexity from early in time to later in time in the fracturing treatment process due to the fact that the LVTF requires a lower pressure to force fluid flow into secondary azimuth fractures compared to the HVTF, thus lowering the far-field AFOP and enhancing the generation of far-field PDL. The near-wellbore AFOP remains high due to the stress shadow created by the dominate fracture(s), which compress the near-wellbore PDL and raises near-wellbore AFOP, which, among other things, maintains an effective width for placing proppant using the LVTF. This effect can reduce the overall fluid viscosity requirements.

The HVTF can exert greater pressure compared to the LVTF (e.g., for overcoming AFOP), enabling the creation of a highly efficient simple, dominate fracture during Phase I, followed by the generation of a high level of complexity with secondary azimuth fractures due to far-field PDL and natural fissures formed along the dominate fracture by reducing the far-field AFOP with the LVTF. The far-field AFOP is reduced because the efficiency of the LVTF is lower than the HVTF, thus requiring a lower pressure to nucleate secondary azimuth fractures. The near-wellbore AFOP may be lowered from that during Phase I, but remains relatively high during Phase II due to dominate fracture generating a strong radiating compressive stress shadow, essentially raising the near-wellbore AFOP over in situ conditions, reducing near-wellbore PDL, and allowing for increased dominate fracture width. This stress shadow (and thus the increased dominate fracture width) can remain during the treatment and allow lower viscosity fluids to be placed into the dominate fracture without exceeding the near-wellbore AFOP, resulting in improved proppant placement efficiency with the LVTF, where viscosified fluids have traditionally been required.

By way of further explanation, in some embodiments, the one or more Phases of the process described herein may be performed in a low or ultra-low permeability subterranean formation (e.g., shale) in which the formation, or source rock, has a composite porosity system made up of inorganic rock porosity, organic kerogen porosity, and interconnected arrays of fractures (e.g., microfractures, fissures, etc.). Because the actual permeability, or transmissibility, of hydrocarbons through the formation is low, the natural array of fractures, induced secondary azimuth fractures, such as those induced by far-field PDL, may aid in connecting the porosity systems for production of hydrocarbons (increased reservoir support). Phase II may harness the net pressure of the Phase I process, as described above, and dilate these natural or formed fractures to increase the permeability and production of the formation. In some instances, this permeability enhancement during Phase II may be optimized by transport and distribution of particulates (e.g., proppant) into the various natural or created fractures using the LVTF. In some instances, as discussed below, pressurization of the secondary azimuth fracture by the LVTF and the high net pressure may allow proppant to be placed into these small aperture fractures, which is not typically effective using traditional fracturing techniques and traditional proppant sizes (e.g., 100 mesh).

The LVTF may comprise a base fluid which, as described below, may be the same or different base fluid type than used in the HVTF. The LVTF may be introduced into the subterranean formation at a pressure above the far-field AFOP (and above the fracture initiation pressure) to create or enhance at least one secondary azimuth fracture extending from the dominate fracture.

The LVTF has a lower viscosity relative to the HVTF, thus being a lower efficiency fluid with a lower pressure exertion than the HVTF. The LVTF nucleates secondary azimuth fractures as it enters the dominate fracture and encounters weak shear points, natural fractures, or simply due to the increased net pressure condition along the dominate fracture generated during the Phase I process. Essentially, the LVTF dissipates the fluid energy stored by the HVTF to create a complex fracture network. In some embodiments, the LVTF may have a viscosity in the range of about 1 cP to about 20 cP, encompassing any value and subset therebetween, such as about 1 cP to about 5 cP, or about 5 cP to about 10 cP, or about 10 cP to about 15 cP, or about 15 cP to about 20 cP, encompassing any value and subset therebetween. In some embodiments, the LVTF may have a viscosity in the range of a lower limit of about 1 cP, 2 cP, 3 cP, 4 cP, 5 cP, 6 cP, 7 cP, 8 cP, 9 cP, and 10 cP to an upper limit of about 20 cP, 19 cP, 18 cP, 17 cP, 16 cP, 15 cP, 14 cP, 13 cP, 12 cP, 11 cP, and 10 cP, encompassing any value and subset therebetween. However, in each instance, the LVTF in Phase II must be less than or equal to about 50% of the viscosity of the HVTF in Phase I, as well as within the designated viscosity range of about 1 cP to about 20 cP in order to achieve the net pressure accumulator and enhanced complexity effect. For example, 5000 cP HVTF for Phase I will have no greater than a 20 cP LVTF for Phase II.

In some embodiments, the LVTF may be present in an amount of greater than about 10% by volume of the combined volume of the HVTF and LVTF. In yet other embodiments, as discussed in greater detail below, another (e.g., second) HVTF may be introduced after introducing the LVTF in Phase II. In such embodiments, the LVTF may be present in an amount of greater than about 10% by volume of the combined volume of the HVTF, LVTF, and the second HVTF.

In some embodiments, the order of the steps of introducing the HVTF, applying the IIFRSs, increasing the volume of the dominate fracture, and introducing the LVTF may be repeated at the treatment zone (i.e., the same treatment zone). For example, the order of the steps may be performed as part of a re-fracturing operation over a single treatment zone containing new and previously stimulated openings where each repetitive cycle of Phase I and Phase II is preceded by a Phase III intrastage diversion step, as discussed below. In other embodiments, the steps of isolating and introducing the HVTF, applying the IIFRSs, increasing the volume of the dominate fracture, and introducing the LVTF may be repeated at at least a second treatment zone (e.g., multiple treatment zones, without limitation, in a subterranean formation may be treated using the Phase I and II process described herein).

In some embodiments, during Phase II, the LVTF may comprise particulates that aid in propping open the dominate fracture(s) and the secondary azimuth fractures. These "particulates" may be referred to herein interchangeably with "proppant" or "proppant particulates." The particulates may be of the same size or sized differently (e.g., fine particulates, medium-sized particulates, and/or coarse particulates). In some embodiments, the LVTF may comprise a surface modification agent (SMA), in addition to the particulates, which may aid in providing entrance and spatial distribution (e.g., vertical distribution) of the particulates through the array of fracture aperture widths encountered in the complex fracture geometry, thereby increasing permeability to produced fluids flowing from the formation.

Generally, when particulates are included in the Phase II process, a series of LVTFs are used to introduce particulates of various sizes, termed "sequence transport of particulates." Additionally, as described above, in some embodiments, rather than applying the IIFRSs to reach the maximum fracturing rate using the Phase I HVTF, a first Phase II LVTF comprising a base fluid and fine particulates may be injected prior to reaching such maximum fracturing rate and then the IIFRSs are applied to the first LVTF until the maximum fracturing rate is reached, and thereafter additional particulate-laden LVTFs are introduced at the maximum fracturing rate. Applying the IIFRSs to the first LVTF comprising fine particulates may beneficially penetrate any remaining open near-wellbore PDL, thereby enhancing their conductivity and relieving the leak-off mechanisms, increasing the efficiency of the dominate fracture during the propagation of the dominate fracture, as well as propping such open near-wellbore PDL for enhanced flow capacity.

In some embodiments, in addition to the inclusion of particulates in an LVTF, a SMA, as stated above, may be included. The SMA in combination with the particulates may aid in forming pillars of particulates that optimize permeability and propped volume of the complex secondary azimuth fractures described herein. As used herein, the term "agglomerates" refers to a coherent body of consolidated particulates that generally remain a coherent body and do not disperse into smaller bodies without the application of shear. To accomplish the desired agglomerate shape and size, various concentrations of SMA in combination with various sizes of particulates, as described below, and during various phases or within multiple fluids in a single phase, may be utilized, without departing from the scope of the present disclosure. The SMA may provide a layer (e.g., a micro-layer) of a tacky hydrophobic film that is randomly deposited onto fracture faces. As used herein, the term "fracture face," and grammatical variants thereof, refers to a portion of a subterranean formation that contacts (including being permeated by) treatment fluids introduced therein. The particulates may then adhere to the tackiness on the fracture faces and, in some instances, to one another, to provide propped height, spatial distribution, and optimal monolayer pattern of agglomerates and/or particulates to increase and sustain the permeability of the complex fractures created as part of the methods described herein. In some embodiments, the selected SMA may later cure into a hardened mass to further hold the particulates in place.

As stated above, the LVTF used in the Phase II process described herein may be a single base fluid; however, in some embodiments, particularly where particulates alone or in combination with a SMA are introduced into the subterranean formation in the LVTF, a sequence of LVTFs with different base fluids may be used to perform the Phase II process, without departing from the scope of the present disclosure.

As a non-limiting example, in some embodiments the Phase I process using the HVTF may be performed by applying the IIFRs until the maximum fracturing rate is reached. Upon reaching the maximum fracturing rate, the Phase II process may begin using multiple LVTFs, each comprising particulates. As an example, the multiple LVTFs may be a series of three LVTFs, which may be the same or different in composition (e.g., in base fluid, additives, and the like), without departing from the scope of the present disclosure. The three LVTFs may be characterized as a first LVTF comprising a base fluid and fine particulates, a second LVTF comprising a base fluid and medium particulates, and a third LVTF comprising a base fluid and coarse particulates. In some embodiments one or more HVTFs may be also introduced during the Phase II process, the HVTFs comprising a base fluid and coarse particulates, where the HVTF is introduced either or both of following the second LVTF comprising medium particulates or following the third LVTF comprising coarse particulates, without departing from the scope of the present disclosure. As each of the LVTF fluids (and any HVTF fluids having coarse particulates) is introduced into a subterranean formation having already been treated with the Phase I process, they synergistically and collectively induce secondary azimuth fractures when introduced at the maximum fracturing rate.

The first LVTF may be introduced into a subterranean formation having already been treated with the Phase I process described herein, wherein the fine particulates in the LVTF penetrate open near-wellbore PDL fractures or any secondary azimuth fractures created in the near-wellbore region (collectively simply "near-wellbore secondary azimuth fractures") due to the introduction of the first LVTF, and pack therein to prop open those fractures openings. That is, the fine particulates preferentially flow into natural or created near-wellbore secondary azimuth fractures and pack into narrow or small aperture openings therein, which larger particulates could not enter or penetrate as deeply. These small aperture secondary azimuth fractures may otherwise close, thus blocking conductivity thereof, if the fine particulates did not prop them open.

After the first LVTF is introduced, the second LVTF may be introduced into the subterranean formation, such that the medium particulates therein penetrate, like the first LVTF, the near-wellbore secondary azimuth fractures. In this case, however, the medium particulates pack into the same (as well as different, without departing from the scope described herein) near-wellbore PDL or near-wellbore secondary azimuth fractures as did the fine particulates, but prop open larger aperture openings thereof. Accordingly, the combination of the fine particulates in the first LVTF and the medium particulates in the second LVTF prop the length or substantially the length of these near-wellbore secondary azimuth fractures. Finally, the third LVTF and/or an HVTF comprising coarse particulates in any order is introduced after the second LVTF, may be introduced into the subterranean formation and the coarse particulates therein may pack into the dominate fracture to prop it open to allow produced fluids to flow therethrough, including from the near-wellbore PDL and any secondary azimuth fractures in the near-wellbore region.

In some embodiments, it may be preferred to prop open the far-field secondary azimuth fractures (including those created from far-field PDL) that are formed during the Phase II process described herein. In such cases, after the first and second LVTF comprising fine particulates and medium particulates, respectively are introduced into the subterranean formation to both nucleate and extend secondary azimuth fractures extending from a dominate fracture and to prop open near-wellbore secondary azimuth fracture(s), additional LVTFs comprising fine particulates and medium, respectively, may be introduced into the subterranean formation to perform a similar function in the far-field region as that previously performed with the first and second LVTF in the near-wellbore region. In some embodiments, these additional LVTFs comprising fine particulates and medium particulates, respectively, may be identical or substantially similar to the first LVTF and second LVTF comprising fine particulates and medium particulates previously discussed, without departing from the scope of the present disclosure. That is, the fine particulates in the LVTF preferentially flow into the far-field region and pack into narrow or small aperture fracture openings thereat and prop them open. Thereafter, the subsequent LVTF may be introduced into the subterranean formation, such that the medium particulates therein penetrate also penetrate the far-field region. In this case, however, the medium particulates pack into the same (as well as different, without departing from the scope described herein) far-field secondary azimuth fracture openings as did the fine particulates, but prop open larger aperture openings thereof. Accordingly, the combination of the fine particulates in the subsequent LVTFs for treating the far-field region prop the length or substantially the length of these far-field secondary azimuth fractures. Finally, the third LVTF and/or an HVTF in any order comprising coarse particulates may be introduced into the subterranean formation, where the coarse particulates pack into the dominate fracture to prop it open to allow produced fluids to flow therethrough, as previously described.

As used herein, the term "single sequence cycle," and grammatical variants thereof, refers to one LVTF cycle in which the LVTF comprises fine particulates, medium particulates, or course particulates. As used herein, the term "partial sequence cycle," and grammatical variants thereof, refers to a two-LVTF cycle in which the first LVTF has fine particulates and the second LVTF has medium particulates and each LVTF is sequentially placed within a subterranean formation. As used herein, the term "full sequence cycle," and grammatical variants thereof, refers to one or more partial sequence cycles followed by an LVTF or an HVTF having coarse particulates, wherein the one or more partial sequence cycles are followed sequentially by one LVTF or HVTF having the coarse particulates. Accordingly, one or more partial sequence cycles may be performed before the coarse particulates are introduced in an LVTF or an HVTF, which may serve to enhance the propping of the near-wellbore and far-field secondary azimuth fractures and may depend on the geometry or type of formation being treated. Additionally, more than one single sequence cycle may be performed in any order, without departing from the scope of the present disclosure, which may be particularly true for far-field secondary azimuth fracture generation. Each sequence cycle comprising particulates can vary in concentration of particulates and can be separated by an HVTF or a spacer fluid, described below with reference to net pressure pulsing.

In some embodiments, the Phase I process using the HVTF may be performed by applying the IIFRs until about 50% of the maximum fracturing rate is reached. Thereafter, Phase II begins by pumping a first LVTF comprising fine particulates. The IIFRSs are applied as they would be to the HVTF in Phase I (e.g., wherein if a stabilizing pressure slope or a declining pressure slop exists, a subsequent IIFRS is applied, or wherein if an increasing pressure slope exists, a decreased fracturing rate step is applied before a subsequent IIFRS is applied) until the first LVTF comprising the fine particulates reaches the maximum fracturing rate, upon which secondary azimuth fracturing begins. Accordingly, the measured pressure slope observed for application of the IIFRSs is either a HVTF measured pressure slope or an LVTF measured pressure slope, which is used to apply the IIFRSs, as described above, based on whether they increase, decrease, or stabilize. Upon reaching the maximum fracturing rate, the second LVTF comprising medium particulates is introduced according to the methods described above. One or more additional partial sequence cycles or single sequence cycles may then be performed at the maximum fracturing rate for propping of the far-field secondary azimuth fractures prior to introducing the final LVTF and/or HVTF comprising the coarse particulates for packing and propping open the dominate fracture.

In some embodiments, a substantially solids-free spacer fluid comprising a base fluid as described herein and any additional additives (e.g., a gelling agent, fluid loss control agent, and the like) may be introduced between the Phase I HVTF and the Phase II LVTF, or when multiple LVTFs are used or an HVTF during the Phase II process, between one or more of those fluids. That is, in some instances, a multi-LVTF (and possibly an HVTF having coarse particulates) Phase II process may be employed and a substantially solids-free spacer fluid may be introduced at one or more times after the HVTF of Phase I, or after any of the fluids introduced during Phase II, without departing from the scope of the present disclosure. As used herein, the term "substantially solids-free spacer fluid" or simply "spacer fluid" refers to a fluid having no intentionally placed solid particulates therein, and no more than about 5% of solids prior to placement in a subterranean formation due to processing operations (e.g., pumping equipment, mixing equipment, and the like).

Generally, when multiple LVTFs alone or in combination with an HVTF are used in the Phase II process (whether the first LVTF is introduced at the maximum fracturing rate or IIFRSs are applied to the first LVTF to reach the maximum fracturing rate), the LVTFs are generally introduced such that each of the Phase II LVTFs are collectively greater in volume than the Phase I HVTF and any Phase II LVTFs.

In some embodiments, as discussed above, one or more, including all, of an LVTF, HVTF, or spacer fluid used during a Phase II process may comprise an optional SMA. When used in a spacer fluid or an LVTF having no particulates entrained therein, the SMA may coat the face of the dominate fracture formed during the Phase I process, near-wellbore PDL fractures formed during the Phase I or Phase II process, and/or additional secondary azimuth fractures (e.g., in the near-wellbore or in the far-field region) formed throughout the Phase II process. When the SMA is included in a Phase II LVTF or HVTF comprising particulates, the interaction between the SMA and the particulates (either fine, medium, or coarse—collectively referred to simply as "particulates") may generate clusters or agglomerates of the particulates, which may attach and become vertically distributed throughout the SMA-treated faces in the complex fracture. The SMA may also coat the surface of the particulates to achieve the same effect when included in a Phase II LVTF or HVTF comprising particulates. Suitable SMAs for use in the embodiments of the present disclosure are described in detail below.

In some embodiments, the specific gravity of the particulates (fine, medium, and/or coarse) may be preferably such that the particulates are buoyant in the Phase II LVTF or HVTF into which they are included. That is, the particulates may be lightweight such that they suspend, thereby enhancing the transport of the particulates for propping fractures and vertical distribution in both near-wellbore and far-field secondary azimuth fractures. Accordingly, in some embodiments, the specific gravity of the particulates described herein may be such that they are within about 30% of the density of the LVTF base fluid into which they are included. The specific gravity of the particulates when they are lightweight described herein may be in the range of from about 0.6 grams per milliliter (g/mL) to about 1.25 g/mL, encompassing any value and subset therebetween, such as about 0.6 g/mL to about 0.73 g/mL, or about 0.73 g/mL to about 0.86 g/mL, or about 0.86 g/mL to about 0.99 g/mL, or about 0.99 g/mL to about 1.12 g/mL, or about 1.12 g/mL to about 1.25 g/mL, encompassing any value and subset therebetween. The specific gravity of the particulates when they are lightweight described herein may be in the range of from a lower limit of about 0.6 g/mL, 0.73 g/mL, and 0.86 g/mL to an upper limit of about 1.25 g/mL, 1.12 g/mL, 0.99 g/mL, and 0.86 g/mL, encompassing any value and subset therebetween. Each of these values is critical to the embodiments of the present disclosure and depend on a number of factors including, but not limited to, the type of base fluid selected (e.g., aqueous, oil, and the like), the material of the particulates selected, the geometry of the subterranean formation dominate fracture, and the like.

In some embodiments, a portion of the particulates in the various LVTF fluids may be degradable particulates to enhance the distribution of non-degradable particulates, such that after propping open the fractures, the degradable particulates degrade and increase the permeability of the packed fractures (e.g., dominate fracture, secondary azimuth fracture, and the like). Accordingly, as used herein, the term "particulates" encompasses degradable and non-degradable particulates, as well as the various particulates sizes, unless specified otherwise. As used herein, the term "fine particulates" refers to particulates having an average particle size distribution in the range of from about 0.1 micrometers (µm) to about 100 µm, encompassing any value and subset therebetween, such as about 1 µm to about 20 µm, or about 20 µm to about 40 µm, or about 40 µm to about 60 µm, or about 60 µm to about 80 µm, or about 80 µm to about 100 µm, encompassing any value and subset therebetween. In some embodiments, the fine particulates have an average particle size distribution in the range of from a lower limit of about 0.1 µm, 1 µm, 5 µm, 10 µm, 15 µm, 20 µm, 25 µm, 30 µm, 35 µm, 40 µm, 45 µm, and 50 µm to a higher limit of about 100 µm, 95 µm, 90 µm, 85 µm, 80 µm, 75 µm, 70 µm, 65 µm, 60 µm, 55 µm, and 50 µm, encompassing any value and subset therebetween. Each of these values is critical to the embodiments of the present disclosure and may depend on a number of factors including, but not limited to, the type of fine particulate selected, the type of subterranean formation being treated, the desired complex fracture geometry, and the like. In some embodiments, the fine particulates are sized such that they are small enough to be transported deep into natural or created secondary azimuth fractures, including those formed from both near-wellbore and far-field PDL, that have a small aperture and are interconnected with the dominate fracture in the complex fracture network, as well as the stress alteration or net pressure induced secondary azimuth fracture nucleations created during Phase II, also having small to moderate apertures. Fine particulate deposition and distribution are important attributes for enhancing permeability, propped volume and conductive flowing area of the complex fractures, particularly in the near-wellbore region as described above.

As used herein, the term "medium-sized particulates" (or simply "medium particulates") refers to particulates having an average particle size distribution in the range of from about 100 µm to about 200 µm, encompassing any value and subset therebetween, such as about 100 µm to about 120 µm, or about 120 µm to about 140 µm, or about 140 µm to about 160 µm, or about 160 µm to about 180 µm, or about 180 µm to about 200 µm, encompassing any value and subset therebetween. In some embodiments, the medium-sized particulates have an average particle size distribution in the range of from a lower limit of about 100 µm, 105 µm, 110 µm, 115 µm, 120 µm, 125 µm, 130 µm, 135 µm, 140 µm, 145 µm, and 150 µm to an upper limit of about 200 µm, 195 µm, 190 µm, 185 µm, 180 µm, 175 µm, 170 µm, 165 µm, 160 µm, 155 µm, and 150 µm, encompassing any value and subset therebetween. As used herein, the term "coarse particulates" refers to particulates having an average particle size distribution in the range of from about 200 µm to about 900 µm, encompassing any value and subset therebetween, such as about 200 µm to about 340 µm, or about 340 µm to about 480 µm, or about 480 µm to about 620 µm, or about 620 µm to about 760 µm, or about 760 µm to about 900 µm, encompassing any value and subset therebetween. In some embodiments, the coarse particulates have an average particle size distribution in the range of from a lower limit of about 200 µm, 250 µm, 300 µm, 350 µm, 400 µm, 450 µm, 500 µm, and 550 µm to an upper limit of about 900 µm, 850 µm, 800 µm, 750 µm, 700 µm, 650 µm, 600 µm, and 550 µm, encompassing any value and subset therebetween. Like the fine particulate, the size values of the medium particulates and the coarse particulates are each critical to the embodiments of the present disclosure and may depend on a number of factors including, but not limited to, the type of medium/coarse particulate selected, the type of subterranean formation being treated, the desired complex fracture geometry, and the like. While overlap in these size ranges may be possible, the selection of the sized particulates may be dependent on a number of factors including, but not limited to, the material of the particulates, the shape of the particulates, the type of subterranean formation, the size of the dominate fracture and the secondary azimuth fractures formed or to be formed, and the like.

In some embodiments, the medium-sized particulates in an LVTF may be in the range of about 2 to about 10 times larger than the size of the fine particulates in the LVTF, encompassing any value and subset therebetween, such as between about 2 and about 4, or about 4 and about 6, or about 6 and about 8, or about 8 and about 10 times larger than the size of the fine particulates in the LVTF. In some embodiments, the medium-sized particulates in an LVTF may be in the range of from a lower limit of about 2, 2.5, 3, 3.5, 4, 4.5, 5, 5.5, and 6 to an upper limit of about 10, 9.5, 9, 8.5, 8, 7.5, 7, and 6.5 times larger than the size of the fine particulates in the LVTF. In some embodiments, the coarse particulates in a Phase II LVTF or HVTF may be in the range of from about 5 to about 30 times larger than the mean size of the fine particulates an LVTF used during the same treatment, encompassing any value and subset therebetween, such as about 5 to about 10, or about 10 to about 15, or about 15 to about 20, or about 20 to about 25, or about 25 to about 30 times larger than the mean size of the fine particulates an LVTF used during the same treatment, encompassing any value and subset therebetween. In some embodiments, the coarse particulates in a Phase II LVTF or HVTF may be in the range of from a lower limit of about 5, 6, 7, 8, 9, 10, 11, 12, 16, 17, 18, and 19 to an upper limit of about 30, 29, 28, 27, 26, 25, 24, 23, 22, 21, 20, and 19 times larger than the mean size of the fine particulates in an LVTF used during the same treatment. Each of these values is critical to the embodiments of the present disclosure and may be dependent on a number of factors including, but not limited to, the fine particulates selected, the medium particulates selected, the coarse particulates selected, the type of subterranean formation being treated, the viscosity of the Phase II LVTFs, the viscosity of any Phase II HVTFs, the maximum fracturing rate, and the like.

The viscosity and/or base fluid of the various LVTFs may or may not be identical, without departing from the scope of the present disclosure. Additionally, the material forming the particulates and the type of optional SMA may or may not be identical in each of the LVTFs, without departing from the scope of the present disclosure.

In some embodiments, during the Phase II process, a net pressure pulsing operation utilizing net pressure pulses (NPP) may be performed. The net pressure pulsing operation employs introducing a Phase II NPP HVTF (i.e., an HVTF used during Phase II and during a net pressure pulsing operation) and applying IIFRSs to the NPP HVTF to increase the volume and total number of far-field secondary azimuth fractures. The IIFRSs applied to the NPP HVTF create NPPs which affect the Phase II LVTFs or entrained Phase II HVTFs within the dominate fracture. As used herein, the term "net pressure pulse" or "NPP," and grammatical variants thereof, refers to a temporary increase in the pressure distributed along the dominate fracture cause by modifications to the rate of a fluid, as described in greater detail below (i.e., a decreased fracturing rate step followed by IIFRSs). The HVTF to which the NPPs are applied may be introduced following (and not during) any of the single, partial, or full Phase II sequence cycles, without departing from the scope of the present disclosure.

Multiple net pressure pulsing techniques may be applied by introducing an HVTF during Phase II, executing a decreasing fracturing rate step following any one of a single, partial, and/or full sequence cycle to induce an increase in fluid efficiency in the dominate fracture. The result is a temporary increase in net pressure, which is further enhanced by applying IIFRSs to enhance far-field secondary azimuth fractures and, when applicable, the immediate transport of particulates into them. In one embodiment, an HVTF containing any of the fine, medium, or coarse particulates or a substantially particulate free HVTF (e.g., acting as a spacer fluid) is used to perform the net pressure pulsing operation. As used herein, the term "substantially solids-free HVTF" and grammatical variants thereof (e.g., a "NPP HVTF that is substantially solids-free," and the like) means to an HVTF fluid having no intentionally placed solid particulates therein, and no more than about 5% of solids prior to placement in a subterranean formation due to processing operations (e.g., pumping equipment, mixing equipment, and the like).

The volume of the HVTF in such circumstances is less than or equal to about one wellbore volume, which naturally depends on the size of the wellbore being treated. As described herein, a "wellbore volume" is the volume of the wellbore from the surface to the bottom opening in the treatment zone (e.g., isolated group of openings), which may or may not be the entire length and volume of the wellbore.

A net pressure pulsing operation may, in some embodiments, be performed using the example above (e.g., following or after any one of a single sequence cycle, between any two single sequence cycles, a partial sequence cycle, between a partial sequence cycle, a full sequence cycle, between a full sequence cycle, any in combination with particulates, any in combination with a SMA, and the like, and any combination thereof). That is, NPPs may be applied after any one or more of the Phase II LVTFs or Phase II HVTFs, such as those in the examples described above. Moreover, the efficient net pressure communication within the fracture network that is maintained through near-wellbore PDL and height growth control using the Phase I HVTF and IIFRSs until maximum fracturing rate is reached, or when the first Phase II LVTF comprising particulates is injected prior to reaching the maximum fracturing rate and then additional IIFRSs are applied to the first LVTF until the maximum fracturing rate is reached, the greater the effective magnitude of the net pressure pulse operation within the fracture network to enhance far-field secondary azimuth fracture complexity.

In one embodiment, a NPP is executed during Phase II by first applying a decreased fracturing rate step to the existing Phase II fluid in the wellbore, the decreased fracturing rate step being decreased by about 10% to about 80% of the maximum fracturing rate, encompassing any value and subset therebetween, such as about 10% to about 20%, or about 20% to about 30%, or about 30% to about 40%, or about 40% to about 50%, or about 50% to about 60%, or about 60% to about 70%, or about 70% to about 80% of the maximum fracturing rate, encompassing any value and subset therebetween. For example, when a NPP is executed during Phase II by first applying a decreased fracturing rate step to the existing Phase II fluid in the wellbore, the decreased fracturing rate step being decreased by a lower limit of about 10%, 15%, 20%, 25%, 30%, 35%, 40%, and 45% to an upper limit of about 80%, 75%, 70%, 65%, 60%, 55%, 50%, and 45% of the maximum fracturing rate, encompassing any value and subset therebetween. After the decreased fracturing rate step, a NPP HVTF is introduced into the subterranean formation and into the dominate fracture(s) at the displacement rate of the Phase II fluid (e.g., an LVTF fluid), which is the rate achieved by the decreased fracturing rate step. The NPP HVTF is saturated, as defined above (i.e., volume to the furthest opening in a treatment zone plus 10 barrels), across the relevant treatment zone, as previously defined herein. After saturation, at least one IIFRS is applied to the HVTF to create a NPP. The at least one IIFRS is above about the fracture gradient pressure, below about the near-wellbore AFOP, and above about the far-field AFOP. Additionally, the at least one IIFRS is applied to the HVTF until the maximum fracturing rate is reached, or +/−about 10% of the maximum fracturing rate is reached. That is, a single IIFRS may be applied or multiple IIFRSs may be applied until the maximum fracturing rate or +/−about 10% of the maximum fracturing rate, without departing from the scope of the present disclosure. The duration and magnitude of the IIFRSs depend on a number of factors including the amount of the decrease fracturing rate step, stabilization of efficient secondary azimuth fracture initiation in the far-field region, and the like, and any combination thereof. In another embodiment, the NPP HVTF is introduced prior to performing the decreased fracturing rate step (i.e., the decreased fracturing rate step is applied to any existing Phase II fluid and the NPP HVTF), and subsequently the at least one IIFRS is applied.

The decreased fracturing rate step in combination with the NPP HVTF, whether the decreased fracturing rate step is applied before or after the NPP HVTF is introduced, and further in combination with the application of at least one IIFRS to the NPP HVTF generates a temporary increase in net pressure that is well communicated to the LVTFs along the dominate fracture, to the dominate fracture tip. For example, in some embodiments, when a Phase II HVTF comprising coarse particulates is used to effectuate propping of the dominate fracture during Phase II, a net pressure pulse operation may be performed using that HVTF or a subsequent HVTF, without departing from the scope of the present disclosure.

The decreased fracturing rate step as part of an NPP is performed to increase fluid efficiency and energy storage (i.e., to achieve the accumulator effect) in the dominate fracture by forced closure of open near-wellbore and far-field PDL and packed secondary azimuth branches, and by ceasing or slowing of dominate fracture tip extension. This technique can also force flow from non-dominate openings in the treatment zone (i.e., isolated group of openings) to the dominate openings, thereby increasing the rate at the dominate openings, enhancing their net pressure and width for placing particulates. The NPP HVTF is introduced to saturate across the near-wellbore fracture region to control near-wellbore complexity, near-wellbore PDL, and height growth during the at least one IIFRS, which could impede efficient net pressure communication into the fracture network (e.g., PDL mechanisms near the wellbore that prevent efficient fluid transmission to the fracture tip, or excessive height growth near the wellbore).

The at least one IIFRS applied to the NPP HVTF forces temporarily higher net pressure in the dominate fracture due to the increased efficiency created by the decreased fracturing rate step and the resistance to restarting of extension at the dominate fracture(s) tip. The increased net pressure is communicated to LVTFs in the dominate fracture to create new far-field secondary azimuth fractures, including those due to far-field PDL, extend existing far-field secondary azimuth fractures, and open existing natural far-field secondary azimuth fractures. The effect is better particulate transport into these far-field secondary azimuth fractures, thus enhancing the propped volume of the fracture network as a whole. Additional LVTFs comprising particulates (i.e., partial sequence cycle, full sequence cycle, or single sequence cycle) may be introduced after the IIFRS(s) reach the maximum fracturing rate.

The net pressure pulsing operation can be repeated between any of a single, partial or full cycle, or between repeating single, partial, or full cycles, as described above. In some embodiments, the NPP HVTF is introduced and the decreased fracturing rate step is performed either prior to introducing the NPP HVTF or as the NPP HVTF is introduced. Thereafter, the NPP HVTF is allowed to saturate the treatment zone of interest and at least one IIFRS is applied at that point in time (i.e., after saturation). In other embodiments, multiple IIFRSs are applied until the desired fracturing rate (i.e., +/−10% of the maximum fracturing rate) is reached.

In other embodiments, the net pressure pulsing operation is performed between multiple single sequence cycles of LVTFs comprising any of fine, medium, or coarse particulates. Accordingly, along the length the dominate fracture, multiple NPP HVTFs alternate between multiple LVTFs, such that unless a leading or last fluid, any NPP HVTF is next to ("immediately following") two LVTFs and any LVTF is next to ("immediately following") two NPP HVTFs. The decreased fracturing rate is typically applied when the NPP HVTF reaches the treatment zone, as it may be undesirable to apply such decreased fracturing rates when the LVTF comprising particulates is being introduced through the treatment zone openings. Once the NPP HVTF saturates the treatment zone, one or more IIFRSs are then applied. These IIFRSs transmit net pressure to the LVTFs alternating therewith and create or enhance far-field secondary azimuth fractures.

In some embodiments, the NPP HVTF may comprise particulates of any size (i.e., fine, medium, and/or coarse), the viscosity of which enhances transport of these particulates into far-field secondary azimuth fractures. Fine and medium particulates in some embodiments may be preferred to increase the secondary azimuth fractures extending from the dominate fracture. In some embodiments, the NPP HVTF(s) are substantially solids-free HVTF(s) used to create efficient initiations of far-field secondary azimuth fractures along the dominate fracture(s). Multiple LVTF and NPP HVTF alternating introductions into a formation may be used to enhance the magnitude and communication of the NPPs to the LVTFs, which are sequenced along the dominate fracture, due to the increased efficiency of the NPP HVTF that resists penetration (i.e., higher AFOP than LVTFs). In some embodiments, the substantially solids-free HVTFs used during a net pressure pulsing operation are introduced before the LVTFs containing particulates, and can act as far-field spacer fluids to enhance penetration of the LVTFs into far-field secondary azimuth fractures when a NPP is applied thereto.

Referring to the non-limiting example above and the application of net pressure pulsing operations, after any one or combination of single, partial, or full sequence cycle has been introduced into the subterranean formation and the complex fracture geometry formed, such increased fracture volume may cause the net pressure to return to normal for a given fracturing rate, due to its dissipation into the secondary azimuth fractures. Accordingly, a higher maximum fracturing rate may be needed to maintain sufficient pressure at the fracture tip to produce back pressure (net pressure) to promote the growth of additional secondary azimuth complex fractures in subsequent operations, such as to reach the required pressurization to dilate far-field PDL and natural fissures. In some embodiments, up to about a 10% increase in fracturing rate over the maximum fracturing rate is desired when applying the IIFRs during a net pressure pulsing operation.

Referring again to the examples above, in some embodiments, an NPP HVTF is introduced and one or more NPPs is applied both after introducing one or more first LVTFs with fine particulates and after introducing one or more second LVTFs comprising medium particulates, referred to above as a partial sequence cycle. Additional NPP HVTFs having NPPs applied may be introduced prior to any additional repeating partial sequence cycles or single sequence cycle, and before introduction of one or more third LVTFs and/or Phase II HVTFs comprising coarse particulates. The decreased fracturing rate step of the NPP in each instance may be applied to the NPP HVTF, or the particulate-laden LVTF or HVTF, without departing from the scope of the present disclosure.

In yet another embodiment, immediate (i.e., within 10 seconds, as described above) decreased fracturing rate steps of about 10% to 80% during introduction of Phase II LVTFs may force closed non-dominate near-wellbore fractures to increase fluid efficiency and width of the dominate fracture(s) to prevent a screen-out, even after such screen-out has been initiated (i.e., as indicated by a positive pressure slope for a stabilized rate). Rapid decreased fracturing rate steps may affect fluid efficiency in the dominate fracture or secondary azimuth fractures and the efficiency of flow distribution at the openings in a group of openings by redirecting fluid more preferentially to non-dominate (i.e., lower stress) openings.

In some embodiments, a diversion operation can be performed with the embodiments of the present disclosure. A low-viscosity treatment fluid pill (LVTF pill) comprising degradable particulates only, or combined degradable and non-degradable particulates, each having a wide particle size distribution (PSD) in various fractional percentages can be introduced to enhance the far-field secondary azimuth fractures created by a net pressure pulsing operation. The far-field secondary azimuth fractures are enhanced in this way by limiting the extension of the dominate fracture tip and bridging at packed complex fracture branches. As used herein, a "pill" is a concentrated fluid for a particular purpose (e.g., of the various particulates for diversion) and are no greater than about 2 wellbore volumes.

In one embodiment, after any one or more of a single, partial, or full sequence cycle is performed during Phase II, a LVTF pill comprising a base fluid and either degradable particulates only or a combination degradable particulates and non-degradable particulates, can be introduced into the subterranean formation to act as a far-field fluidic seal. In such cases, degradable and non-degradable particulates are, for example, (1) coarse non-degradable particulates combined with medium and/or fine degradable particulates; (2) medium non-degradable particulates combined with medium degradable particulates, where the medium degradable particulates are smaller in mesh size than the non-degradable particulates; or (3) medium non-degradable particulates in combination with fined degradable particulates; or (4) medium non-degradable particulates in combination with both medium degradable particulates and fine degradable particulates; or (5) medium non-degradable particulates in combination with medium degradable particulates and fine non-degradable particulates. In other embodiments, a LVTF pill comprising only degradable particulates is introduced into the subterranean formation after any one or more of a Phase II single, partial, or full sequence cycle to act as a far-field diverting plug, filling the interstitial spaces between the particulates already existing in the complex fracture that are non-degradable. These LVTF pills comprising only degradable particulates have a combination of medium degradable particulates and fine degradable particulates. As used herein, the term "fluidic seal" refers to a seal formed in a subterranean formation having a permeability of no greater than 10 darcies. Each of the sizes for these particulates is described below and overlaps the sizes of the degradable and non-degradable particulates for use in any of the fluids described herein (later referred to collectively as "treatment fluids").

As described herein, the term "fracture simplification" refers to the tendency for a dominate fracture to preferentially grow and lose fluid to nearby produced (partially depleted) fracture networks, thus decreasing net pressure in the dominate fracture and resulting in a loss of far-field complexity. Fracture simplification also results in fluid loss and dominate fracture growth into areas outside of a desired drainage region(s) or reservoir (e.g., outside effective fracture half-lengths). The term "fracture half-length" refers to the radial distance from a wellbore to the outer fracture tip penetrated by the well or propagated from the well by hydraulic fracturing. The degradable and non-degradable particulates when comingled create a wide (PSD), allowing for a high packed volume within the fracture network and which may create a bridging effect in a preferential dominate fracture flow path. This bridging effect restricts flow, thereby enhancing the ability of a net pressure pulsing operation to redirect flow to new and desirable areas within the dominate fracture.

In some instances, a net pressure pulsing operation is performed when an LVTF pill is at the desired fracture tip half-length based on estimated fracture geometry and slurry volume introduced. In some embodiments, to perform such a net pressure pulsing operation, the LVTF pill reaches the desired location along the dominate fracture (e.g., at a desired fracture tip half-length), a decreased fracturing rate step is then performed to enhance the settling of the particulates in the LVTF pill which activates the reduction in permeability. That is, the settling of the LVTF pill to activate leak-off control and bridging tendency (i.e., dehydration of LVTF pill slurry through spurt loss). Thereafter, a NPP HVTF is introduced into the formation and IIFRSs are applied once the NPP HVTF saturates the treatment zone to the fracturing rate previous discussed. In other embodiments, the decreased fracturing rate step is not applied until the NPP HVTF is initially introduced or until the NPP HVTF reaches the leading edge of the treatment zone. As used herein, the term "leading edge of the treatment zone" refers to an amount of fluid of interest equivalent to less than about the first 25 barrels thereof reaching the first portion of an isolated or otherwise desirable treatment zone, such as a first opening. Typically, the LVTF pill in this case will be followed by at least another LVTF, or a low-viscosity spacer fluid (LVSF), prior to the NPP HVTF. The "low-viscosity spacer fluid" has the same viscosity defined herein for the LVTFs and is also substantially solids-free. In some embodiments, once the LVTF pill reaches the desired fracture tip half-length, a net pressure pulsing operation is thereafter performed including introducing the NPP HVTF and applying the one or more IIFRSs, which may be before or after saturation of the treatment zone with the NPP HVTF.

Additionally, the LVTF pills can reduce permeability to existing secondary azimuth fractures into existing packed secondary azimuth fractures along the dominate fracture to enhance the magnitude and communication of the NPP for creating new far-field secondary azimuth fractures. The ability of the LVTF pill to initiate a bridging effect will be dependent on the fracture aperture, flow velocity, proppant volume fraction and degradable particulate volume fraction. Over time, the degradable particulates may be degraded in the far-field region to at least partially remove the fluidic seal and form channels through which produced fluids may flow. Upon degradation of the degradable particulates, the permeability of the area in which the fluidic seal was formed is restored to at least about 70% to about 100% of the permeability prior to forming the fluidic seal.

In some embodiments, a limiting factor in forming the complex fracture geometry for each net pressure pulse operation may be that fracture growth is dominantly in the height trajectory, diminishing the pulse quickly. To compensate for this limitation, in some embodiments, before performing a net pressure pulsing operations, a LVTF pill is introduced into the formation immediately preceding the NPP HVTF for a net pressure pulsing operation to reduce fracture growth in the height trajectory and assist the NPP effect. Accordingly, in this embodiment, the LVTF pill is not separated from the NPP HVTF by another fluid (e.g., by another LVTF or LVSF).

Phase III is characterized by the multiple (e.g., at least two) fracturing cycles of at least Phase I and Phase II in combination with intrastage diversion, or after Phase I and repeating cycles of Phase II in combination with intrastage diversion described below. That is, Phase III requires at least a Phase I and a Phase II cycle, in combination with at least another Phase I and Phase II cycle or Phase I and repeating Phase II cycles, each in combination with intrastage diversion. A "fracturing cycle," as used herein, is an amount of fluid comprising proppant particulates pumped into a wellbore at a designed rate into a treatment zone comprising a group of openings (also referred to as a cluster of openings).

The Phase III intrastage diversion of the present disclosure effectively utilizes only a portion of a group of openings on each fracturing cycle, and separates each fracturing cycles by a low-viscosity diversion fluid (LVDF) to achieve balanced fluid and proppant distribution to each opening, rather than spreading a single fracturing cycle across all openings in the group. Accordingly, multiple fracturing cycles are used to evenly stimulate each opening in a group and enhance dominate fracture propagation therefrom.

The two most common methods of zonal isolation used in traditional multi-stage fracturing treatments are cemented plug-and-perf (PNP) and open hole operations using sliding sleeve ports and packers for zonal isolation. Both present distinctive challenges in creating the optimal number of fracture initiation points for each opening, and mitigating any opportunity cost of leaving bypassed reserves (unstimulated or reduced stimulated reservoirs) behind during a stimulation treatment.

Limited entry into certain openings during a treatment operation provides a means of distributing fracturing treatments over each stage with a group of openings. Effectiveness of the process depends directly upon entry friction pressure generated across the openings in a group (i.e., a "group" is multiple openings at a treatment zone). As used herein, the term "entry friction pressure" refers to a pressure drop through one or more openings receiving fluid in a group of openings (e.g., multiple groups of perforations), in which increased pressure is experienced at other openings in the group that are not the fluidic path of least resistance.

In traditional operations, to increase entry friction pressure, a decrease in the number of openings (e.g., perforation shot density of a group) in a group given a particular length, and increased fluid flow rate are used. In these traditional fracturing operations, maintaining entry friction pressure is required during the entire treatment to maintain sufficient bottom hole pressure to evenly distribute fluid and proppant across multiple openings for propagating dominate fractures therefrom, where the openings experience different stresses (e.g., fluidic path of least resistance as compared to those experiencing increased resistance). However, at least due to opening erosion and/or longitudinal fracturing (i.e., loss of annular isolation between openings), the required entry friction pressure cannot be successfully maintained. Accordingly, uneven distribution of flow rate (i.e., rate per opening) and proppant distribution patterns across the openings results and suboptimal fracturing occurs, such as because some openings are under-stimulated, some over-stimulated, and some not stimulated at all.

In addition, stress shadowing, as discussed above, between groups of openings results in a compressive stress component transmitted through the formation from the openings experiencing the fluidic path of least resistance to those experiencing greater resistance. Additionally, the heterogeneity of rock properties, can produce a high stress contrast between the openings, leading to further difficulty in balancing the volumetric input to each opening and successfully inducing fracture initiation, early time propagation, and extension at each opening. Additionally, loss of entry friction pressure, as well as such stress shadowing and rock heterogeneity, can result in erratic fluid distribution patterns at openings and sub-optimal proppant placement.

Results collected by permanently deployed fiber optic cables with distributed acoustic sensing (DAS) and distributed temperature sensing (DES) on both cemented plug-and-perf completions as well as packer and sleeve systems demonstrate clear inefficiencies in dominate fracture initiations and fluid distribution across groups of opening over time on a majority of all traditionally stimulated fracture treatments (i.e., single cycle fracturing). These inefficiencies were observed as openings that take no fluid during the stimulation and openings that screen-out early, leaving them under-stimulated. Such stimulation inequality between openings in a group drastically affects fracture placement and effective stimulated area (e.g., for hydrocarbon production).

Additionally, a less apparent effect of uneven fluid distribution in traditional single cycle fracturing across the openings is the appearance of a "skyscraper" pattern. The term "skyscraper pattern," as used herein, refers to a limited number of openings in a group receiving the majority of the volume of a fracturing cycle (i.e., the fracturing fluid) such that long fractures are formed at those openings, whereas no fractures or very short fractures form in the remaining openings of the group. Without volumetric control (i.e., control of how much volume of fluid and proppant is pumped into each opening in a group of openings to propagate a fracture), these skyscraper fractures encounter points in the formation (e.g., in far-field areas), termed "weak points," where the fluid will flow preferentially towards and interfere with nearby wellbores and fracture networks (i.e., "well bashing"). These weak points can be parallel fracture networks or merely simple paths of least resistance. Accordingly, the net pressure required to create far-field secondary azimuth fractures, and effectively propagate fractures from openings that do not create an initial skyscraper fracture, is lost. Thus, optimal use of each and every opening in a group cannot be realized. As such, hydrocarbon recovery may be reduced and/or profits may be decreased (e.g., profits per unit recovery of hydrocarbon). Moreover, the weak point(s) and skyscraper effect may be exacerbated where infill downspaced wellbore are used, as fewer far-field fractures are placed, resulting in localized bypassed reserves between lateral wellbores. As used herein, the term "infill downspaced wellbore" refers to placement of parallel, horizontal wellbores in close proximity to each other. For example, the wellbores may be about 330 feet apart, or 660 feet apart, without being limited.

With further reference to the skyscraper pattern effect and weak points in formations, when an initial (or "parent") wellbore is initially drilled in a formation and thereafter produced, in some cases infill down-spaced wellbores may be desirably created near the parent wellbore. In such cases, with extended time between parallel lateral stimulations, asymmetrical fracture growth from the one or more infill down-spaced wellbores toward the parent wellbore's partially drained fracture networks results. Such asymmetric fracture growth results in a strip of unstimulated or under-stimulated reservoir on the opposite side of the infill down-spaced wellbore. Accordingly, effective reservoir contact is hindered.

The Phase III method of the present disclosure synergistically utilizes a multiple fracturing cycle design of at least Phase I and Phase II, and repeating cycles of Phase I and Phase II or Phase II only, in combination with intrastage diversion (collectively referred to herein as "Phase III"). Phase III, of course, is not performed after the very final Phase II cycle, where coarse particulates are packed into each of the dominate fractures and production is the next step, as diversion is no longer needed. The Phase III process is characterized by the use of low-viscosity diversion fluids (LVDFs), which comprise a base fluid, viscosity in the range of that applicable to the LVTFs described above, and a blend of degradable particulates. The LVDFs, in some instances, are pumped "on-the-fly" into the wellbore and displaced to a group of openings to isolate dominate fractures in the near-wellbore region between the sequential fracturing cycles. As used herein, the term "on-the-fly," refers to performing an operation during a subterranean treatment that does not require stopping normal operations. With reference to the Phase III process, "on-the-fly" may be described as introducing the degradable particulates into a main fracturing stream, where the degradable particulates may themselves be in a concentrated fluid or in dry form, for example.

Each LVDF utilizes the methods described herein, along with precisely designed degradable particulate volumes to temporarily constrain flow to one or more openings in a group that experienced the fluidic path of least resistance in an immediately preceding fracturing cycle (i.e., those that took the most volumetric input of fluid and proppant particulates). This is done for each sequential fracturing cycle, except the final fracturing cycle in a treatment zone as stated above where diversion is no longer needed to complete stimulation. Thus, the LVDF diverts subsequent fluid flow and induces new fracture initiations, early time propagation, and extension of dominate fractures at unstimulated and/or under-stimulated openings in the group, which have higher resistance (i.e., those that did not take the most volumetric input of fluid). In other embodiments, one or more openings within a group may be conserved for the subsequent fracturing cycles by forcing the flow pattern of fluid during each fracturing cycle into a limited number of openings (i.e., less than 100%). The degradable diversion particulates degrade to a substantially or wholly solids-free state with time and temperature and leave no residual formation damage.

The Phase III process described herein provides a conduit for sequentially placing fractures at one or more openings in a group for each fracture cycle using processes and fluid sequences that influence the efficiency of fluid flow paths for each cycle, particularly the initial one, to achieve the most dominate fracture placements at openings in the group. That is, "sequential fracturing," and grammatical variants thereof, refers to a multiple fracturing cycle process in which any one fracture cycle targets a unique opening or more than one unique opening to propagate a dominate fracture(s) therefrom, followed by forming a fluidic seal with degradable diversion particulates in that unique opening or more than one unique opening; the fluidic seal prevents or substantially reduces continued volumetric input, and is thereafter followed by another fracturing cycle targeting wholly different unique openings or wholly different more than one unique openings in the same group as the initial fracture cycle. Such sequential fracturing can then occur at more than one group of openings, without departing from the scope of the present disclosure. The fluidic seal that can be formed using the net pressure pulsing operation described during Phase II and the fluidic seal formed during Phase III are defined herein identically (i.e., having a permeability of no greater than 10 darcies).

A critical rate per opening during each cycle is required to produce intended fracture geometry, net pressure, and proppant particulate transport into the opening. This critical rate may change subject to various entry friction conditions, fluid viscosities introduced, particulate concentrations, and the like. Any openings that receive less than this critical flow rate at any point during a fracturing cycle is termed a "sub-critical opening." Examples of sub-critical openings are openings that are broken down and accept fluid and particulates early but screen-out later in the cycle, openings that experience a loss of flow rate over time, openings that reach a critical flow rate but later experience leak-off, or openings that are never broken down. A "critical opening" is one that receives at or above a critical rate per opening to produce fracture net pressures and widths sufficient to maintain continuous and even input proppant schedule placement over the entire duration of a cycle.

The incidence of sub-critical openings that breakdown and accept some flow rate early in the treatment can affect rate over time at potential critical openings, creating the common situation of initially dominate fractures that take fluid and proppant early but due to lack of net pressure (width) or flow velocity, drop below the dynamically changing critical rate and lose some or all impulse proppant transport and rate, thus becoming sub-critical openings that otherwise would have remained critical openings. Sub-critical openings experiencing high leak-off can cause proppant particulates to fill in the wellbore at their location (due to screen-out), permanently blocking their flow and potentially flow to other openings, during stimulation of group.

Based on observations, non-dominate, sub-critical openings in terms of flow distribution for a cycle (e.g., a sub-critical opening that is receiving the least fractional percentage of fluid and/or proppant) appear to be the most easily diverted from, indicating a substantial need to control the efficiency of the initial flow distribution pattern by reducing the break down of, and flow to these openings. The Phase III method introduces a LVDF that resists transport and interaction with such openings that receive the least amount of stimulation on previous cycle(s) based on rate and pressure parameters. The Phase III process described herein thus prevents or reduces diversion at sub-critical openings. When diversion at sub-critical openings occurs, contrary to the Phase III method and in traditional operations, it is "incidental diversion," which is restricting flow to the unstimulated or under-stimulated openings (i.e., non-dominate sub-critical openings) in a group and preferentially directs flow and thus the degradable diversion particulates into dominate openings. This tradition incidental diversion can make a skyscraper distribution pattern worse by hindering sealing efficiency at the dominate critical openings, or creating a system over-constraint on secondary cycles. Additionally, incidental diversion makes predictability and consistency in diversion responses difficult with uncontrolled flow distribution patterns caused by erratic bottom hole pressures.

The Phase III process as described herein produces more consistent and stable bottom hole pressures during each fracturing cycle to create the optimal number of dominate critical openings, and minimizes breakdown of and flow to non-dominate sub-critical openings in the same group on each cycle, thereby conserving them for sequential cycles. Decrease in entry friction pressure by increasing the number of openings in each group (e.g., perforation shot density) given a particular length of each opening, as well as decreased fluid flow rate may facilitate a lower and stable bottom hole pressure. In some embodiments, a tapered opening design comprises varied opening (e.g., perforation shot) density at some or all group openings given a particular length of each opening group, which may facilitate achieving sequential fracture placement as described above.

Using the Phase III process, which harnesses the fluid and fracture mechanics of one or more portions of the Phase I and Phase II processes described herein, efficient fracture initiation and propagation, more dominate fracturing locations with reduced near-wellbore fluid leak-off characteristics, and improved effective proppant placement can be achieved. With the ability to perform sequential fracturing over a group of openings by incrementally building pressure support with the LVDF to redistribute the fluidic path of least resistance among those openings, enhanced interactions in the stress system of a reservoir in a formation can occur, which can produce greater net pressures and complex fracture volume. Complexity is an important factor in increasing the ultimate reservoir matrix support by interconnecting to multiple portions of a reservoir's porosity system(s), such as enhanced access conduits that are in fluid communication with the dominate fracture and secondary azimuth fractures. Accordingly, greater amounts of hydrocarbons can be realized from these reservoirs with controlled rates of decline.

As described above, the Phase III process involves multiple fracturing cycles of all or some of Phase I and Phase II in combination with intrastage diversion, where sequential fracturing is utilized. The number of cycles, referred to herein as "cycle intensity," is the number of fracturing cycles placed over an isolated treatment zone having a group of openings. The cycle intensity is primarily a function of the geomechanical properties of the particular formation, such as the modulus of elasticity or relative stiffness of the rock, as well as designed interval length, number of openings, distance between openings, and stress contrast (e.g., the fluidic path of least resistance v. greater resistance).

To achieve sequential fracture placement, particularly when high cycle intensity is used or desirable, a high transmittance of stress that constrains the flow to a group of openings is desirable (e.g., a strong stress shadow is caused by close spacing between openings in a group). The group of openings may have outer openings and inner openings between the outer openings. The Phase III process in combination with the Phase I and Phase II processes are able to achieve this condition, even in formations with less stiffness and lower transmittance of stress shadow to constrain the initial flow pattern. Specifically, referring now to the Phase I process, fluid is forced to a reduced number of opening(s) during the initial fracturing cycle, while also reducing leak-off to non-dominate sub-critical openings (i.e., those with greater resistance than those experiencing the fluidic path of least resistance). This allows greater control and certainty of the percentage flow distribution and particulate placement at dominate critical openings on each fracture cycle, starting with the first, thereby producing better separation between dominate flow areas (i.e., critical and sub-critical openings) corresponding with each fracture cycle.

As an example, due to the fact that only a portion of openings in each group at a treatment zone (e.g., a group of perforations) receive the HVTF during Phase I and the LVTF during Phase II, the overall complex fracture volume for each treatment zone can be improved with the sequential placement of multiple fracturing cycles using the Phase III process. The Phase III process utilizes a LVDF comprising degradable particulates to isolate fractures at the initially dominate or critical openings. After an initial proppant cycle is placed, the degradable particulates are introduced into the subterranean formation to act as a diverting agent to temporarily bridge the critical fracture openings that were dominate on the first cycle, to facilitate sequential placement of secondary or additional dominate (i.e., critical) fractures. Thereafter, one or all of Phase I and Phase II processes and fluids may be repeated in the same treatment zone to encourage the fluids to enter into new or different openings and create additional fracture intensity in the reservoir. Over time, the degradable particulates may be degraded to restore channels through which produced fluids may flow.

As a non-limiting example of Phase III, in some embodiments, as described above, after Phase I, Phase II is performed using a LVTF comprising particulates (e.g., fine, medium, or coarse particulates), which is placed through an opening at a treatment zone in a subterranean formation and into at least one of a dominate fracture and/or a secondary azimuth fracture. Intrastage diversion can then performed by introducing a LVDF into the formation through the opening to create a fluidic seal therein. The LVDF is a low-viscosity fluid, as defined herein, and comprises a base fluid and degradable particulates. The LVDF is in the form of a "pill," as previously defined. The fluidic seal formed by the degradable particulates forms in the near-wellbore area of one or both of the dominate fracture and/or the secondary azimuth fracture (including the mouths of such fractures) and acts to divert subsequent fluids to other openings or treatment zones in the formation.

As described above, Phase III with intrastage diversion may enhance the impact of stress shadowing, altering horizontal stress anisotropy, and increasing the intensity of shear offset and stress relief secondary azimuth fractures (e.g., through natural stress-field alteration and stress relief connections through sequential placement of dominate fractures) to improve fracture complexity volume and increase shear failure in a subterranean formation for recovery of desired fluids (e.g., hydrocarbons) therein. For example, the LVDF pill pumped in phase III may shut off flow to outer openings in a group after a first Phase I and Phase II fracturing cycle and direct flow toward inner openings in the group during subsequent Phase I and Phase II or repeating Phase II only cycles. This creates a reduced stress anisotropy environment at the inner openings and increases the formation of stress relief secondary azimuth fractures intersected by the secondary azimuth fractures extending from the dominate fractures. Both the reduced stress anisotropy environment and the increase in stress relief secondary azimuth fractures increase fracture complexity and forced far-field fluid diversion, thus increasing the volume of the fracture network for recovery of produced fluids.

Additionally, a higher overall efficiency of dominate fractures placed at openings in a group at each treatment zone improves "interzone stress shadowing." The term "interzone stress shadowing" is defined herein as a charging or increase of the reservoir pressure and localized stress tensor at a group of openings due to the previous sequential dominate fractures being placed at openings in previous treatment zones (i.e., the earlier stages of a multi-stage stimulation). This interzone stress shadowing further enhances the hydraulically connected secondary azimuth complexity component at each of Phase I and Phase II when the described process is completed at one or more treatment zones once or multiple times. In once embodiment, due to the localized interzone stress shadow being higher at the openings closest to the openings stimulated at the previous treatment zone(s) (referred to as "toe-bank openings"), the initial Phase I and Phase II fluid distribution pattern will be forced to the openings furthest from the previous treatment zone experiencing the least stress shadow (referred to as "heel-bank openings"). Then, in some embodiments, a LVDF pill is introduced to shut-off flow to the heel-bank openings after a Phase II sequence cycle, allowing the secondary fracturing cycle to have a dominate fluid distribution pattern at the toe-bank of openings, thus creating a stress cage effect between, first, the dominate fractures placed at the heel-bank openings at the previous treatment zone, second, the dominate fractures placed at the heel-bank of openings in the current group, and third, the dominate fractures placed at the toe-bank of openings therebetween.

The degradable particulates for use in the Phase III intrastage diverting process may generally have a size in the range of from a lower limit of about 200 mesh to a higher limit of about 4 mesh, encompassing any value and subset therebetween. In some embodiments, the degradable particulates in the LVDF pill in Phase III may be in the range of from about 1 to about 100 times larger than the mean size of the fine particulates in the first LVTF in Phase II, encompassing any value and subset therebetween, such as from about 1 to about 20, or about 20 to about 40, or about 40 to about 60, or about 60 to about 80, or about 80 to about 100 times larger than the mean size of the fine particulates in the first LVTF in Phase II, encompassing any value and subset therebetween. In some embodiments, the degradable particulates in the LVDF pill in Phase III may be in the range of from a lower limit of about 1, 5, 10, 15, 20, 25, 30, 35, 40, 45, and 50 to an upper limit of about 100, 95, 90, 85, 80, 75, 70, 65, 60, 55, and 50 times larger than the mean size of the fine particulates in the first LVTF in Phase II. Each of these values is critical to the embodiments of the present disclosure and depend on a number of factors including, but not limited to, the type of subterranean formation, the size of the openings in which the fluidic seal is to be formed, and the like, and any combination thereof.

As further non-limiting examples, two methods of intrastage diversion and introduction of the LVDF pill to a treatment zone to isolate dominate critical openings in a group are both on-the-fly methods. The first is referred to as the "high-split ratio method" and the second is referred to as the "low-split ratio method." The term "high-split ratio method" means that the LVDF is in the form of a pill and is diluted on-the-fly as it is introduced into the wellbore at a total downhole rate that is greater than or equal to 66% of the maximum fracturing rate. The term "low-split ratio method" means that the LVDF is in the form of a pill and is diluted on-the-fly as it is introduced into the wellbore at a total downhole rate that is less than 66% of the maximum fracturing rate.

The high-split ratio method can be used to increase operational efficiency and to minimize volumetric over-flush of each Phase II LVTF or HVTF comprising particulates. In one embodiment, the LVDF pill is formed by adding dry degradable particulates to a blender-mixing tub comprising a base fluid at a surface location. Thereafter, the LVDF pill is introduced into the formation using isolated LVDF-only fracturing pumps that pump the LVDF pill into a main fracturing stream (fluids being injected into the formation, such as a Phase II LVTF or HVTF) at about the same rate as the main fracturing stream immediately following the Phase II LVTF or HVTF comprising particulates. Due to a high-split ratio dilution, this method can result in a lower concentration of LVDF pill at the treatment zone and thus requires a larger overall volume of LVDF pill to be introduced compared to the low-split ratio method. In one embodiment, immediately following the Phase II LVTF or HVTF comprising particulates, a decreased fracturing rate step is applied, while the isolated LVDF pump rate is increased simultaneously, resulting in a "combined LVDF maximum fracturing rate" that remains greater or equal to about 66% of the previous maximum fracturing rate prior to introducing the LVDF pill (i.e., the Phase II maximum fracturing rate).

In some embodiments, step-rate diagnostic tests can be performed prior to the initial Phase I sequence cycle to provide information about entry friction pressures and facilitate the Phase III process.

The concentration of the LVDF pill and the volume of the LVDF pill are important components in achieving accuracy of diversion at dominate critical openings and reduction in incidental diversion at non-dominate sub-critical openings, as described above. The concentration of the LVDF pill can be increased and LVDF pill volume decreased by decreasing the blender-mixing tub volume, decreasing main slurry rate during high-split ratio injection, and increasing the LVDF injection rate. Additionally, the base fluid for the LVDF pill can be a linear fluid or slickwater to improve transport efficiency during injection through the surface equipment, going down well, and while being introduced at the treatment zone. In some embodiments, after the LVDF pill has been introduced into the wellbore, the combined LVDF maximum fracturing rate is held constant the entire duration of displacement of the LVDF pill prior to seating LVDF pill at the group of openings, to maintain a constant flow pattern (i.e., meaning within about 10 barrels) across openings.

The low-split ratio method adds a low-viscosity flush fluid (LVFF) stage after the one or more Phase II LVTFs or HVTFs comprising particulates, prior to injection of the LVDF pill. The LVFF has the same viscosity range as that defined herein for the LVTF. The LVFF may additionally be introduced after the introduction of the LVDF pill, without departing from the scope of the present disclosure. To perform the low-split ratio method, the volume of the LVDF pill is less than or equal to two wellbore volumes, and preferably less than or equal to one wellbore volume. Following introduction of the Phase II LVTF or HVTF comprising particulates at the treatment zone (which may be separated, precede, or come after a LVFF), a decreased fracturing rate step is applied, while isolated LVDF-pumps are increased simultaneously, and a LVDF pill is introduced into the wellbore at combined LVDF maximum fracturing rate that is less than 66% of the previous Phase II maximum fracturing rate before introduction of the LVDF pill. In some embodiments, additional IIFRs (including taking into account slope, as described above) can be applied to slightly increase the combined LVDF maximum fracturing rate on displacement to about 50% or less of the previous Phase II maximum fracturing rate before introduction of the LVDF pill. In some embodiments, an acid base fluid and/or low-viscosity spacer fluid (LVSF) can be introduced after the LVDF pill and/or prior to the Phase I HVTF or Phase II LVTF of the next fracturing cycle. The low-split ratio method can significantly increase LVDF concentration at the treatment zone and thus sealing performance of dominate critical fractures. It can additionally reduce incidences of incidental diversion due to the smaller LVDF pill volume and result in less interaction with non-dominate sub-critical openings.

In some embodiments, for both methods, once the LVDF pill has been introduced into the wellbore, it is displaced to the treatment zone, and just prior to reaching the top opening (i.e., the first opening encountered by the LVDF pill), a decreased fracturing rate step is applied to terminally land the LVDF pill at the dominate critical openings. As used herein, the term "terminally land" and grammatical variants thereof refers to reaching at least the leading edge of the treatment zone with the LVDF pill, and then decreasing rate to about 8 to about 10 barrels per minute (bpm) (the "terminal landing rate"). This terminal landing rate is optimal for increased transport efficiency across (not into) the non-dominate sub-critical openings during diversion, thus directing the LVDF pill flow to the dominate critical openings (i.e., the fluidic path of least resistance). This shrinks flow of the LVDF pill to the most preferential dominate fracture(s) for high performance sealing first, next, bottom hole pressure in the wellbore is dynamically increased to incrementally direct any remaining LVDF pill to block flow at the next-most preferential fluidic path of least resistance flow paths. The total number of openings constrained during the introduction of the LVDF pill is controlled with a relationship of LVDF degradable diverting particulate mass concentration, as well as the spatial arrangement of the preferential fluidic path of least resistance flow paths. Because this technique reduces unwanted flow to the non-dominate, sub-critical openings during introduction of the LVDF pill, it enables higher transport efficiency to most preferential flow paths with greater transport across non-dominate, sub-critical openings for minimized incidental diversion. This increases diversion performance at desired flow paths, and conserves secondary openings to achieve sequential fracturing, as described above.

Once the LDVF pill is terminally landed at the openings as described herein, a subsequent Phase I HVTF or Phase II LVTF (which can be repeated) is performed. Because the terminal landing rate is less than the Phase I and Phase II maximum fracturing rates, as described herein, IIFRSs must be applied to the Phase I HVTF or Phase II LVTF to again reach the maximum fracturing rate. The IIFRSs are applied as described herein, including taking into account downhole pressure slopes. Phase III as described herein, may be first performed at a treatment zone, and then repeated at the same treatment zone, or repeated at a new treatment zone, without departing from the scope of the present disclosure.

In some embodiments, horizontal refracturing (or "refrac") operations are conducted on previously stimulated wellbores to contact productive reserves which may be held in pre-existing dominate fractures, and that can be reconnected at the near-wellbore region for recovery. The methods described herein on the pre-existing dominate fractures can increase secondary azimuth fractures extending therefrom, stimulate original openings that were not stimulated during initial fracturing, and stimulate new openings into the treatment zone to access the remaining bypassed reserves. Additionally, in this plurality of openings in the group there exist areas of higher pressure depletion, called "pressure sink zones," that exhibit a hindrance to successful refracturing.

Phase III can thus be performed for refracturing treatment zones that have already been fractured and hydrocarbons produced therefrom. One or more openings may preexist in the preexisting fractured treatment zone, where the preexisting openings may be refractured using the embodiments described herein. In other instances during a refracturing Phase III process, new openings may be introduced into the previously fractured treatment zone, without departing from the scope of the present disclosure. In some cases, only preexisting openings, only new openings, or a combination thereof may be used to stimulate the refracturing treatment zone using the Phase III process described herein.

In some embodiments, the treatment zone for a refracturing operation is the entire length of a wellbore having many openings or groups of openings, both new and pre-existing. The Phase III process, as described herein, is used for refracturing to place dominate fractures at pre-existing and new openings, and increase the secondary azimuth fractures at pre-existing dominate fractures without the use of treatment zone plugs or other mechanical isolation devices. Several known challenges exist relating to non-planar dominance of full wellbore stimulation (i.e., high leak-off) including the stress contrast between unstimulated openings and pre-existing fractures at the original openings, and friction drop down the wellbore, making sequential fracturing at openings closest to the end of the wellbore (and thus farthest from the surface in terms of wellbore length) difficult to achieve, causing excessive leak-off or unwanted flow to non-dominate, sub-critical openings resulting in screen-out effects, and resulting in poor LVDF sealing performance at dominate critical openings.

To mitigate losses to pressure sink zones, an initial low rate diagnostic LVDF-squeeze sequence can be performed to divert fracturing fluid away from pre-existing pressure-depleted fractures by creating a filter cake of degradable particulates in the pressure sink zones prior to performing the Phase III treatment. As used herein, the term "LVDF-squeeze" refers to introducing the LVDF pill alone or in combination with the LVTF pill, described above, at a rate below the maximum fracturing rate to create a fluidic seal at one or more pressure sink zones. The injection rate is lower than the maximum fracturing rate, thus minimizing dilation of existing fracture networks. After a sufficient quantity of the LVDF-squeeze has been introduced at the treatment zone to prevent leak-off into the pressure sink zones (e.g., based on monitoring or logging results gathered at the surface), a refracture treatment is executed as sequential Phase I HVTF and either (1) Phase II LVTF or HVTF or (2) Phase I and Phase II followed by repeating Phase II cycles, or (3) any combination of at least an initial Phase I and Phase II, followed by Phase II only or Phase I and Phase II cycles prior to the degradation of the LVDF.

In some embodiments, a lower relative pressure depletion may exist at existing fractures, and upfront LVDF-squeeze cycles may not be required. In such cases, the Phase I HVTF is introduced and displaced one wellbore volume prior to IIFRs being applied to reduce preferential leak-off across the multitude of openings. As bottom hole pressure builds through incremental Phase III fracturing cycles as described herein, and the introduction of Phase II LVDFs or HVTFs following one or more of the intrastage diversion operations of Phase III, the distribution of fluid and particulates on each subsequent fracturing cycle is directed across different openings to stimulate fully the existing and new openings.

By initiating diversion with the LVDF-squeeze, and/or the introduction of the Phase I HVTF prior to applying IIFRs to reach the maximum fracturing rate, and repeating subsequent Phase III cycles, the non-planar dominance of full wellbore or partial wellbore stimulation (i.e., high leak-off) can be mitigated to improve the efficiency of sequential fracturing on each cycle, starting with the initial one. Additionally, it can mitigate proppant particulate fill effects in the wellbore due to leak-off at non-dominate, sub-critical openings.

In some embodiments, a small volume of the Phase I HVTF can be introduced and the Phase I process performed subsequent to introduction of the LVDF pill, where a full or larger volume of the Phase I is not required to initiate new dominate fractures. In such cases, the small volume of the Phase I HVTF may be between about one wellbore volume and about 5000 gallons.

The base fluids for use in the Phase I, Phase II, Phase III, and net pressure pulsing operation fluids (i.e., the HVTFs, LVTFs, LVDFs, LVFFs, LVSFs) may be any base fluid suitable for use in a subterranean formation as part of a fracturing operation. Collectively, each of these fluids is referred to merely as "treatment fluids," unless otherwise specified, and also includes other treatment fluids (e.g., acid treatment fluid, spacer fluid, and the like). Suitable base fluids may include, but are not limited to, oil base fluids, aqueous base fluids, aqueous-miscible base fluids, water-in-oil emulsion base fluids, foamed base fluids, oil-in-water emulsion base fluids, acid base fluids, and the like, and any combination thereof.

Suitable oil base fluids may include, but are not limited to, alkanes, olefins, aromatic organic compounds, cyclic alkanes, paraffins, diesel fluids, mineral oils, desulfurized hydrogenated kerosenes, and the like, and any combination thereof. Suitable aqueous base fluids may include, but are not limited to, fresh water, saltwater (e.g., water containing one or more salts dissolved therein), brine (e.g., saturated salt water), seawater, and the like, and any combination thereof. Suitable aqueous-miscible base fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, and any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous base fluid, and the like, and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Suitable water-in-oil emulsion base fluids, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, encompassing any value and subset therebetween. It should be noted that for water-in-oil and oil-in-water emulsions, any mixture of the above may be used including the water being and/or comprising an aqueous-miscible fluid. Suitable acid base fluids may include fluids having a pH between about 0 and about 6, encompassing any value and subset therebetween. Examples of suitable acid base fluids may include, but are not limited to, hydrochloric acid, hydrofluoric acid, acetic acid, formic acid, citric acid, lactic acid, glycolic acid, sulfamic acid, tartaric acid, methanesulfonic acid, trichloroacetic acid, dichloroacetic acid, chloroacetic acid, fluoroboricacid, fluorophosphoric acid, hexafluorotitanic acid, fluorophosphoric acid, phosphoric acid, any in combination with an aqueous base fluid, and the like, and any combination thereof.

In some embodiments, the base fluid may be in the form of a linear fluid, a slickwater fluid, an energized fluid, and the like. As used herein, the term "linear fluid" refers to the addition of a polymer such as guar to the base fluid but no crosslinker. As used herein, the term "slickwater fluid" refers to the addition of a friction reducing agent to the base fluid such as polyacrylamide. As used herein, the term "energized fluid" refers to the addition of a gaseous agent or a liquid agent that converts to a gaseous agent under certain conditions to the base fluid, such as $CO_2$ or $N_2$.

In some embodiments, the HVTF may comprise a gelling agent. Moreover, any LVTF for use in Phase II may also comprise a gelling agent provided that the viscosity difference between the HVTF and the LVTF is achieved, as described herein. Moreover, any LVDF, LVFF, or spacer fluid for use in Phase III and/or net pressure pulsing operations may comprise a gelling agent provided that the viscosity of fluids remains as defined herein. The gelling agents for use in gelling the treatment fluids may be any substance capable of gelling the treatment fluid, that does not adversely affect the other components of the fluids described herein or the function of the treatment fluid in the processes described herein, and that may be used in a subterranean formation. Examples of suitable gelling agents may include, but are not limited to, natural polymers, synthetic polymers, and the like, and any combination thereof.

Suitable gelling agents may include, but are not limited to, polysaccharides, biopolymers, and/or derivatives thereof that contain one or more of these monosaccharide units: galactose, mannose, glucoside, glucose, xylose, arabinose, fructose, glucuronic acid, or pyranosyl sulfate. Examples of suitable polysaccharides may include, but are not limited to, guar gums (e.g., hydroxyethyl guar, hydroxypropyl guar, carboxymethyl guar, carboxymethylhydroxyethyl guar, and carboxymethylhydroxypropyl guar ("CMHPG")), cellulose derivatives (e.g., hydroxyethyl cellulose, carboxyethylcellulose, carboxymethylcellulose, and carboxymethylhydroxyethylcellulose), xanthan, scleroglucan, succinoglycan, diutan, and the like, and any combination thereof.

Suitable synthetic polymers may include, but are not limited to, 2,2'-azobis(2,4-dimethyl valeronitrile), 2,2'-azobis(2,4-dimethyl-4-methoxy valeronitrile), polymers and copolymers of acrylamide ethyltrimethyl ammonium chloride, acrylamide, acrylamido- and methacrylamido-alkyl trialkyl ammonium salts, acrylamidomethylpropane sulfonic acid, acrylamidopropyl trimethyl ammonium chloride, acrylic acid, dimethylaminoethyl methacrylamide, dimethylaminoethyl methacrylate, dimethylaminopropyl methacrylamide, dimethylaminopropylmethacrylamide, dimethyldiallylammonium chloride, dimethylethyl acrylate, fumaramide, methacrylamide, methacrylamidopropyl trimethyl ammonium chloride, methacrylamidopropyldimethyl-n-dodecylammonium chloride, methacrylamidopropyldimethyl-n-octylammonium chloride, methacrylamidopropyltrimethylammonium chloride, methacryloylalkyl trialkyl ammonium salts, methacryloylethyl trimethyl ammonium chloride, methacrylylamidopropyldimethylcetylammonium chloride, N-(3-sulfopropyl)-N-methacrylamidopropyl-N,N-dimethyl ammonium betaine, N,N-dimethylacrylamide, N-methylacrylamide, nonylphenoxypoly(ethyleneoxy)ethylmethacrylate, partially hydrolyzed polyacrylamide, poly 2-amino-2-methyl propane sulfonic acid, polyvinyl alcohol, sodium 2-acrylamido-2-methylpropane sulfonate, quaternized dimethylaminoethylacrylate, quaternized dimethylaminoethylmethacrylate, and the like, any derivatives thereof, and any combination thereof. In certain embodiments, the gelling agent comprises an acrylamide/2-(methacryloyloxy)ethyltrimethylammonium methyl sulfate copolymer. In certain embodiments, the gelling agent may comprise an acrylamide/2-(methacryloyloxy)ethyltrimethylammonium chloride copolymer. In certain embodiments, the gelling agent may comprise a derivatized cellulose that comprises cellulose grafted with an allyl or a vinyl monomer.

Additionally, polymers and copolymers that comprise one or more functional groups (e.g., hydroxyl, cis-hydroxyl, carboxylic acids, derivatives of carboxylic acids, sulfate, sulfonate, phosphate, phosphonate, amino, or amide groups) may be used as gelling agents.

The gelling agent may be present in the treatment fluids useful described herein in an amount in the range of from a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by weight of the liquid component of the treatment fluid, encompassing any value and subset therebetween. In certain embodiments, the gelling agents may be present in an amount in the range of from about 0.15% to about 2.5% by weight of the liquid component of the treatment fluid.

As described above, the viscosity of the LVTF is less than that of the HVTF by a particular range, and suitable gelling agents and the amount of gelling agents included in the various treatment fluids may be selected to achieve this difference.

In some embodiments, it may be desirable to crosslink the gelling agent and the treatment fluids may further comprise one or more crosslinking agents. The crosslinking agents may comprise a borate ion, a metal ion, or similar component that is capable of crosslinking at least two molecules of the gelling agent. Examples of suitable crosslinking agents may include, but are not limited to, borate ions, magnesium ions, zirconium IV ions, titanium IV ions, aluminum ions, antimony ions, chromium ions, iron ions, copper ions, magnesium ions, zinc ions, and the like, and any combination thereof. These ions may be provided by providing any compound that is capable of producing one or more of these ions. Examples of such compounds may include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and the like, and any combination thereof.

When included, suitable crosslinking agents may be present in the treatment fluids in an amount sufficient to provide the desired degree of crosslinking between molecules of the gelling agent. In certain embodiments, the crosslinking agent may be present in the treatment fluids in an amount in the range of from a lower limit of about 0.005%, 0.05%, 0.1%, 0.15%, 0.2%, 0.25%, 0.3%, 0.35%, 0.4%, 0.45%, and 0.5% to an upper limit of about 1%, 0.95%, 0.9%, 0.85%, 0.8%, 0.75%, 0.7%, 0.65%, 0.6%, 0.55%, and 0.5% by weight of the liquid component of the treatment fluid, encompassing any value and subset therebetween.

In some embodiments, the treatment fluids may include a SMA. Without limitation, in some embodiments, the HVTF(s) in Phase I and/or the LVTF(s) or HVTFs in Phase II may comprise a surface modification agent, without departing from the scope of the present disclosure. Suitable SMAs may include, but are not limited to, a non-aqueous tackifying agent, an aqueous tackifying agent, a silyl-modified polyamide compound, a resin, a crosslinkable aqueous polymer composition, a polymerizable organic monomer composition, a zeta potential-modifying aggregating composition, a silicon-based resin, a binder, a surface modification agent emulsion, and any combination thereof.

Non-aqueous tackifying agents suitable for use in the embodiments disclosed herein may be used such that they cure to form a non-hardened coating, or may be combined with a multifunctional material capable of reacting with the non-aqueous tackifying compound to cure to form a hardened coating. As used herein, the term "cure" and grammatical variants thereof (e.g., "curing") refers to substantially non-flowable reaction product, such as through the process of cross-linking chemical reactions of the surface modification agent. A "hardened coating" as used herein means that the reaction of the non-aqueous tackifying agent with the multifunctional material will result in a substantially non-flowable reaction product that exhibits a higher compressive strength than the non-aqueous tackifying agent alone. In this instance, the non-aqueous tackifying agent may function similarly to a curable resin.

For use in the embodiments described herein, the non-aqueous tackifying agents may comprise polyamides that are liquids or in solution at the temperature of the subterranean formation such that they are, by themselves, non-hardening when introduced into the subterranean formation. A particularly preferred product is a condensation reaction product comprised of a polyacid and a polyamine. The non-aqueous tackifying agents may further comprise amounts of dibasic acids containing some trimer and higher oligomers and also small amounts of monomer acids that are reacted with polyamines, without departing from the scope of the present disclosure. Other polyacids for use as the non-aqueous tackifying agents may include, but are not limited to, trimer acids, synthetic acids produced from fatty acids, maleic anhydride, acrylic acid, and the like, and combinations thereof. Additional compounds which may be used as non-aqueous tackifying agents include liquids and solutions of, for example, polyesters, polycarbonates, silyl-modified polyamide compounds, polycarbamates, urethanes, natural resins such as shellac, and the like. Combinations of these may be suitable as well.

Multifunctional materials suitable for use in the present disclosure may include, but are not limited to, an aldehyde (e.g., formaldehyde); a dialdehyde (e.g., glutaraldehyde, hemiacetals or aldehyde releasing compounds); a diacid halide; a dihalide (e.g., dichlorides and dibromides); a polyacid anhydride (e.g., citric acid, epoxides, furfuraldehyde, glutaraldehyde or aldehyde condensates); and any combination thereof. In some embodiments, the multifunctional material may be mixed with the non-aqueous tackifying agent in an amount of from a lower limit of about 0.01%, 0.5%, 0.1%, 0.5%, 1%, 5%, 10%, and 15% to an upper limit of about 50%, 45%, 40%, 35%, 30%, 25%, 20%, and 15% by weight of the non-aqueous tackifying agent. In other embodiments, the multifunctional material may be mixed with the non-aqueous tackifying agent in an amount of from about 0.5% to about 1% by weight of the non-aqueous tackifying agent.

Aqueous tackifying agents suitable for use in the embodiments of the present disclosure are usually not generally significantly tacky, but are capable of being "activated" (e.g., destabilized, coalesced and/or reacted) to transform the compound into a sticky, tacky compound at a desirable time. This may permit an operator to design time-based treatment fluids that exhibit certain qualities (e.g., tackiness) only after activation. As used herein, the term "tacky," and all grammatical variants thereof, refers to a substance having a nature such that it is somewhat sticky to the touch and capable of being applied to a solid substrate (e.g., a fracture face). Suitable aqueous tackifying agents may be charged polymers that comprise compounds that, when in a treatment fluid, will form a non-hardening coating (by itself or with an activator).

Suitable aqueous tackifying agents may include any polymer that can bind to a surface (e.g., a fracture face). Also, polymers that function as pressure-sensitive adhesives may be suitable. Examples of aqueous tackifying agents suitable for use in the embodiments herein may include, but are not limited to, an acrylic acid polymer, an acrylic acid ester polymer, an acrylic acid derivative polymer, an acrylic acid homopolymer, an acrylic acid ester homopolymer (e.g., poly(methyl acrylate), poly(butyl acrylate), poly(2-ethylhexyl acrylate), and the like), an acrylic acid ester copolymer, a methacrylic acid derivative polymer, a methacrylic acid homopolymer, a methacrylic acid ester homopolymer (e.g., poly(methyl methacrylate), poly(butyl methacrylate), poly(2-ethylhexyl methacrylate), and the like), an acrylamido-methyl-propane sulfonate polymer, an acrylamido-methyl-propane sulfonate derivative polymer, an acrylamido-methyl-propane sulfonate co-polymer, an acrylic acid/acrylamido-methyl-propane sulfonate co-polymer, and any combination thereof. As used herein, the term "derivative" refers to any compound that is made from one of the listed compounds, for example, by replacing one atom in one of the listed compounds with another atom or group of atoms, ionizing one of the listed compounds, or creating a salt of one of the listed compounds.

Aqueous tackifying agents may comprise at least one member selected from the group consisting of benzyl coco di-(hydroxyethyl) quaternary amine, p-T-amyl-phenol condensed with formaldehyde, and a copolymer comprising from about 80% to about 100% C1-C30 alkylmethacrylate monomers and from about 0% to about 20% hydrophilic monomers. In some embodiments, the aqueous tackifying agent may comprise a copolymer that comprises from about 90% to about 99.5% 2-ethylhexylacrylate and from about 0.5% to about 10% acrylic acid. The term "copolymer," as used herein, is not limited to polymers comprising two types of monomeric units, but includes any combination of monomeric units, e.g., terpolymers, tetrapolymers, and the like.

Suitable hydrophillic monomers may be any monomer that will provide polar oxygen-containing or nitrogen-containing groups. Suitable hydrophillic monomers may include, but are not limited to, dialkyl amino alkyl (meth) acrylates and their quaternary addition and acid salts, acrylamide, N-(dialkyl amino alkyl) acrylamide, methacrylamides and their quaternary addition and acid salts, hydroxy alkyl (meth)acrylates, unsaturated carboxylic acids such as methacrylic acid or acrylic acid, hydroxyethyl acrylate, acrylamide, and the like. Combinations of these may be suitable as well. These copolymers can be made by any suitable emulsion polymerization technique.

Resins suitable for use as a surface modification agent of the embodiments of the present disclosure may include any resin capable of forming a hardened, consolidated mass upon curing. Many such resins are commonly used in subterranean operations, and some suitable resins may include, but are not limited to, two component epoxy based resins, novolak resins, polyepoxide resins, phenol-aldehyde resins, urea-aldehyde resins, urethane resins, phenolic resins, furan resins, furan/furfuryl alcohol resins, phenolic/latex resins, phenol formaldehyde resins, silicon-based resins, polyester resins and hybrids and copolymers thereof, polyurethane resins and hybrids and copolymers thereof, acrylate resins, silicon-based resins, and any combination thereof.

Some suitable resins, such as epoxy resins, may be cured with an internal catalyst or activator so that when pumped downhole, they may be cured using only time and temperature. Other suitable resins, such as furan resins generally require a time-delayed catalyst or an external catalyst to help activate the polymerization of the resins if the cure temperature is low (i.e., less than about 121° C. (about 250° F.), but will cure under the effect of time and temperature, as well as a subterranean formation having a formation temperature above about 121° C. (about 250° F.), preferably above about 149° C. (about 300° F.). It is within the ability of one skilled in the art, with the benefit of this disclosure, to select a suitable resin for use in embodiments of the present disclosure and to determine whether a catalyst is required to trigger curing. By way of example, a silicon-based resin system as may be used as a more eco-friendly choice in cases where epoxy or furan-based resins pose environmental concerns.

Any solvent that is compatible with the resin and achieves the desired viscosity effect is suitable for use in the embodiments of the present disclosure. Suitable solvents may include, but are not limited to, butyl lactate, dipropylene glycol methyl ether, dipropylene glycol dimethyl ether, dimethyl formamide, diethyleneglycol methyl ether, ethyleneglycol butyl ether, diethyleneglycol butyl ether, propylene carbonate, methanol, butyl alcohol, d'limonene, fatty acid methyl esters, and butylglycidyl ether, and any combination thereof. Other solvents may include, but are not limited to, aqueous dissolvable solvents such as, methanol, isopropanol, butanol, and glycol ether solvents, and combinations thereof. Suitable glycol ether solvents may include, but are not limited to, diethylene glycol methyl ether, dipropylene glycol methyl ether, 2-butoxy ethanol, ethers of a C2 to C6 dihydric alkanol containing at least one C1 to C6 alkyl group, mono ethers of dihydric alkanols, methoxypropanol, butoxyethanol, and hexoxyethanol, and isomers thereof. Selection of an appropriate solvent is dependent on the resin composition chosen and is within the ability of one skilled in the art, with the benefit of this disclosure. It is within the ability of one skilled in the art, with the benefit of this disclosure, to determine whether and how much solvent is needed to achieve a suitable viscosity.

Suitable silyl-modified polyamide compounds that may be used as a surface modification agent in the embodiments of the present disclosure are those that are substantially self-hardening compositions capable of at least partially adhering to a surface in an unhardened state, and that are further capable of self-hardening into a substantially non-tacky state. Such silyl-modified polyamides may be based, for example, on the reaction product of a silating compound with a polyamide or a combination of polyamides. The polyamide or combination of polyamides may be one or more polyamide intermediate compounds obtained, for example, from the reaction of a polyacid (e.g., diacid or higher) with a polyamine (e.g., diamine or higher) to form a polyamide polymer with the elimination of water.

In other embodiments, the surface modification agent comprises crosslinkable aqueous polymer compositions. Generally, suitable crosslinkable aqueous polymer compositions comprise an aqueous solvent, a crosslinkable polymer, and a crosslinking agent. The aqueous solvent may be any aqueous solvent in which the crosslinkable composition and the crosslinking agent may be dissolved, mixed, suspended, or dispersed to facilitate gel formation. For example, the aqueous solvent used may be freshwater, salt water, brine, seawater, or any other aqueous liquid that does not adversely react with the other components used in accordance with this disclosure or with a subterranean formation.

Examples of crosslinkable aqueous polymer compositions for use as the SMA described herein may include, but are not limited to, carboxylate-containing polymers and acrylamide-containing polymers. The most suitable polymers are thought to be those that would absorb or adhere to a fracture face or particulate. Examples of suitable acrylamide-containing polymers may include, but are not limited to, polyacrylamide, partially hydrolyzed polyacrylamide, copolymers of acrylamide and acrylate, carboxylate-containing terpolymers, tetrapolymers of acrylate, and any combination thereof. Additional examples of suitable crosslinkable aqueous polymers may include, but are not limited to, hydratable polymers comprising polysaccharides and derivatives thereof, and that contain one or more of the monosaccharide units: galactose, mannose, glucoside, glucose, xylose, arabinose, fructose, glucuronic acid, or pyranosyl sulfate. Suitable natural hydratable polymers may include, but are not limited to, guar gum, locust bean gum, tara gum, konjak, tamarind, starch, cellulose, karaya, xanthan, tragacanth, and carrageenan, any derivative thereof, and any combination thereof.

Suitable hydratable synthetic polymers and copolymers that may be used as the crosslinkable aqueous polymer compositions may include, but are not limited to, polycarboxylates (e.g., polyacrylates and polymethacrylates), polyacrylamides, methylvinyl ether polymers, polyvinyl alcohols, polyvinylpyrrolidone, any derivative thereof, and any combination thereof. The crosslinkable polymer used should be included in the crosslinkable aqueous polymer composition in an amount sufficient to form the desired gelled substance for coating onto a surface. In some embodiments, the crosslinkable polymer may be included in the crosslinkable aqueous polymer composition in an amount in the range of from a lower limit of about 1%, 2%, 3%, 4%, 5%, 6%, 7%, 8%, 9%, 10%, 11%, 12%, 13%, 14%, and 15% to an upper limit of about 30%, 29%, 28%, 27%, 26%, 25%, 24%, 23%, 22%, 21%, 20%, 19%, 18%, 17%, 16%, and 15% by weight of the aqueous solvent, encompassing any value and subset therebetween. In another embodiment, the crosslinkable polymer may be included in the crosslinkable aqueous polymer composition in an amount in the range of from about 1% to about 20% by weight of the aqueous solvent.

The crosslinkable aqueous polymer compositions of the embodiments described herein further comprise a crosslinking agent for crosslinking the crosslinkable polymers to form the desired gelled substance for coating onto a surface. In some embodiments, the crosslinking agent is a molecule or complex containing a reactive transition metal cation. In some embodiments, the crosslinking agent may comprise trivalent chromium cations complexed or bonded to anions, atomic oxygen, or water. Examples of suitable crosslinking agents may include, but are not limited to, compounds or complexes containing chromic acetate and/or chromic chloride. Other suitable transition metal cations may include, but are not limited to, chromium VI within a redox system, aluminum III, iron II, iron III, and zirconium IV. Combinations of these crosslinking agents may also be suitable.

The crosslinking agent may be present in the crosslinkable aqueous polymer compositions of the embodiments of the present disclosure in an amount sufficient to provide, among other things, the desired degree of crosslinking. In some embodiments, the crosslinking agent may be present in the crosslinkable aqueous polymer compositions in an amount in the range of from a lower limit of about 0.01%, 0.025%, 0.05%, 0.075%, 0.1%, 0.25%, 0.5%, 0.75%, 1%, 1.25%, 1.5%, 1.75%, 2%, and 2.25% to an upper limit of about 5%, 4.75%, 4.5%, 4.25%, 4%, 3.75%, 3.5%, 3.25%, 3%, 2.75%, 2.5%, and 2.25% by weight of the crosslinkable aqueous polymer composition, encompassing any value and subset therebetween. The exact type and amount of crosslinking agent or agents used depends upon the specific crosslinkable polymer to be crosslinked, formation conditions, if crosslinked downhole, and the like.

Optionally, the crosslinkable aqueous polymer compositions may further comprise a crosslinking delaying agent, such as a polysaccharide crosslinking delaying agent derived from guar, guar derivatives, cellulose derivatives, or combinations thereof. The crosslinking delaying agent may be included in the crosslinkable aqueous polymer compositions, among other things, to delay crosslinking of the crosslinkable aqueous polymer compositions until desired.

In other embodiments, the surface modification agent may comprise polymerizable organic monomer compositions. Generally, suitable polymerizable organic monomer compositions comprise an aqueous fluid, a water-soluble polymerizable organic monomer, an oxygen scavenger, and a primary initiator. The aqueous fluid component of the polymerizable organic monomer composition generally may be freshwater, salt water, brine, seawater, or any other aqueous liquid that does not adversely react with the other components used in accordance with this disclosure, including those provided as aqueous base fluids described above.

A variety of monomers may be suitable for use as the water-soluble polymerizable organic monomers in the embodiments of the present disclosure. Examples of suitable monomers may include, but are not limited to, acrylic acid, methacrylic acid, acrylamide, methacrylamide, 2-methacrylamido-2-methylpropane sulfonic acid, dimethylacrylamide, vinyl sulfonic acid, N,N-dimethylaminoethylmethacrylate, 2-triethylammoniumethylmethacrylate chloride, N,N-dimethyl-aminopropylmethacryl-amide, methacrylamidepropyltriethylammonium chloride, N-vinyl pyrrolidone, vinylphosphonic acid, and methacryloyloxyethyl trimethylammonium sulfate, and any combination thereof. In some embodiments, the water-soluble polymerizable organic monomer should be self-crosslinking. Examples of suitable monomers which are thought to be self-crosslinking may include, but are not limited to, hydroxyethylacrylate, hydroxymethylacrylate, hydroxyethylmethacrylate, N-hydroxymethylacrylamide, N-hydroxymethyl-methacrylamide, polyethylene amine, polyethylene glycol acrylate, polyethylene glycol methacrylate, polypropylene glycol acrylate, and polypropylene glycol methacrylate, and any combination thereof. Of these, hydroxyethylacrylate may be preferred in some instances. An example of a particularly suitable monomer is hydroxyethylcellulose-vinyl phosphoric acid.

The water-soluble polymerizable organic monomer (or monomers where a combination thereof is used) should be included in the polymerizable organic monomer composition in an amount sufficient to form the desired gelled substance after placement on the particulates described herein. In some embodiments, the water-soluble polymerizable organic monomer may be included in the polymerizable organic monomer composition in an amount in the range of from a lower limit of about 1%, 2%, 4%, 6%, 8%, 10%, 12%, 14%, and 16% to an upper limit of about 30%, 28%, 26%, 24%, 22%, 20%, 18%, and 16% by weight of the aqueous fluid, encompassing any value and any subset therebetween. In another embodiment, the water-soluble polymerizable organic monomer may be included in the polymerizable organic monomer composition in an amount in the range of from about 1% to about 20% by weight of the aqueous fluid.

The presence of oxygen in the polymerizable organic monomer composition may inhibit the polymerization process of the water-soluble polymerizable organic monomer or monomers, which may allow control over (e.g., delay) the curing of the polymerizable organic monomer composition. In some embodiments, an oxygen scavenger, such as stannous chloride, may be included in the polymerizable monomer composition. In order to improve the solubility of stannous chloride so that it may be readily combined with the polymerizable organic monomer composition, the stannous chloride may be pre-dissolved in a hydrochloric acid solution. For example, the stannous chloride may be dissolved in about a 0.1% by weight aqueous hydrochloric acid solution in an amount of about 10% by weight of the resulting solution. The resulting stannous chloride-hydrochloric acid solution may be included in the polymerizable organic monomer composition in an amount in the range of from a lower limit of about 0.005%, 0.01%, 0.1%, 0.5%, 1%, 1.5%, 2%, 2.5%, 3%, 3.5%, 4%, and 4.5% to an upper limit about 10%, 9.5%, 9%, 8.5%, 8%, 7.5%, 7%, 6.5%, 6%, 5.5%, 5%, and 4.5% by weight of the polymerizable organic monomer composition, encompassing any value and any subset therebetween. Generally, the stannous chloride may be included in the polymerizable organic monomer composition of the embodiments of the present disclosure in an amount in the range of from about 0.005% to about 0.1% by weight of the polymerizable organic monomer composition.

A primary initiator may be used, among other things, to initiate curing (i.e., polymerization) of the water-soluble polymerizable organic monomer(s). Any compound or compounds that form free radicals in aqueous solution may be used as the primary initiator. The free radicals may act, among other things, to initiate polymerization of the water-soluble polymerizable organic monomer present in the polymerizable organic monomer composition. Compounds suitable for use as the primary initiator may include, but are not limited to, alkali metal persulfates, peroxides, oxidation-reduction systems employing reducing agents (e.g., sulfites in combination with oxidizers), azo polymerization initiators, and any combination thereof. Suitable azo polymerization initiators may include, but are not limited to, 2,2'-azobis (2-imidazole-2-hydroxyethyl) propane, 2,2'-azobis(2-aminopropane), 4,4'-azobis(4-cyanovaleric acid), 2,2'-azobis(2-methyl-N-(2-hydroxyethyl) propionamide, and any combination thereof. Generally, the primary initiator should be present in the polymerizable organic monomer composition in an amount sufficient to initiate polymerization of the water-soluble polymerizable organic monomer(s). In certain embodiments, the primary initiator may be present in the polymerizable organic monomer composition in an amount in the range of from a lower limit of about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween. One skilled in the art, with the benefit of this disclosure, will recognize that as the polymerization temperature increases, the required level of activator decreases.

Optionally, the polymerizable organic monomer compositions further may comprise a secondary initiator. A secondary initiator may be used, for example, where the polymerizable organic monomer composition is placed into a subterranean formation that is relatively cool as compared to the surface, such as when placed below the mud line in offshore operations. The secondary initiator may be any suitable water-soluble compound or compounds that may react with the primary initiator to provide free radicals at a lower temperature. An example of a suitable secondary initiator is triethanolamine. In some embodiments, the secondary initiator is present in the polymerizable organic monomer composition in an amount in the range of from a lower limit of about 0.1%, 0.2%, 0.4%, 0.6%, 0.8%, 1%, 1.2%, 1.4%, 1.6%, 1.8%, 2%, 2.2%, 2.4%, and 2.6% to an upper limit of about 5%, 4.8%, 4.6%, 4.4%, 4.2%, 4%, 3.8%, 3.6%, 3.4%, 3.2%, 3%, 2.8%, and 2.6% by weight of the water-soluble polymerizable organic monomer(s), encompassing any value and any subset therebetween.

Also optionally, the polymerizable organic monomer compositions of the embodiments of the present disclosure may further comprise a crosslinker for crosslinking the polymerizable organic monomer compositions (e.g., into a gelled substance). In some embodiments, the crosslinker may be any crosslinker capable of crosslinking the polymerizable organic monomer composition that does not adversely interfere with the treatment fluids described herein. Examples of suitable crosslinking agents include those discussed previously with reference to crosslinkable aqueous polymer compositions. Generally, the crosslinker may be present in polymerizable organic monomer compositions in an amount in the range of from a lower limit of about 0.01%, 0.02%, 0.04%, 0.06%, 0.08%, 0.1%, 0.2%, 0.4%, 0.6%, 0.8%, 1%, 1.2%, 1.4%, 1.6%, 1.8%, and 2% to an upper limit of about 5%, 4.8%, 4.6%, 4.4%, 4.2%, 4%, 3.8%, 3.6%, 3.4%, 3.2%, 3%, 2.8%, 2.6%, 2.4%, 2.2%, and 2% by weight of the polymerizable organic monomer composition, encompassing any value and any subset therebetween.

In some embodiments, the surface modification agent may comprise a binder. Suitable binders may generally comprise 1) a hydrolysate or heterocondensate of at least one hydrolysable silicon compound and at least one metal, phosphorus or boron compound, the metal being selected from Al, Ge, Sn, Pb, Ti, Mg, Li, V, Nb, Ta, Zr and Hf; 2) an organic polymerizable or polycondensable monomer or oligomer; and, 3) a buffer, so that the pH of the buffered binder is in the range from 2 to 7, and optionally a complexing agent, if appropriate, the at least one hydrolysable silicon compound comprising one or more hydrolysable silicon compounds having at least one nonhydrolysable group or oligomers thereof. Such binders are suitable for consolidating bulk or loose substrates.

Other binders suitable for using the embodiments of the present disclosure may generally comprise:

(I) a consolidant comprising a hydrolyzate or precondensate of:

(a) at least one organosilane of the general Formula IV:

$$R_nSiX_{4-n} \qquad \text{Formula IV}$$

in which the R radicals are the same or different and are each hydrolytically non-removable groups, the X radicals are the same or different and are each hydrolytically removable groups or hydroxyl groups and n is 1, 2 or 3, (b) optionally at least one hydrolyzable silane of the general Formula V:

$$SiX_4 \qquad \text{Formula V}$$

in which the X radicals are each as defined above, and (c) at least one metal compound of the general Formula VI:

$$MX_a \quad \text{Formula VI}$$

in which M is a metal of main groups I to VIII or of transition groups II to VIII of the Periodic Table of the Elements including boron, X is as defined in Formula IV, where two X groups may be replaced by one oxo group, and a corresponds to the valence of the element, where the molar ratio of silicon compounds used to metal compounds used is in the range from 8000:1 to 8:1, is infiltrated or injected into the geological formation and, (II) the surface modification agent is cured under elevated pressure and elevated temperature, where the surface modification agent, in the case that it is used to change the wetting behavior of the formation, also comprises an oleophobic and hydrophobic component. Comprehensive investigations have shown that these surface modification agents are not decomposed even in autoclaves at high pressure and high temperature even over a prolonged period, and also still form a stable bond under these conditions. In the case of use of a wetting-regulating surface modification agent variant, it was shown that the wetting behavior established is retained after a hydrothermal treatment in corrosive medium. The consolidation also reduces the porosity only to a slight degree.

Suitable silicon-based resins for use as the surface modification agents described herein may include polysiloxanes, which are liquid substances having low viscosity, excellent curing workability, and excellent heat resistance once cured. Suitable polysiloxanes may be obtained by hydrolysis and polycondensation of a silicon compound having three hydrolyzable groups, a silicon compound having two hydrolyzable groups and a silicon compound having one hydrolyzable group. Suitable polysiloxanes have a hydrosilylatable carbon-carbon unsaturated group, a hydrosilyl group (a group containing Si—H bond) and an alkoxysilyl group, and have a number-average molecular weight of 500 to 20,000, and that is obtained by conducting a hydrolysis and polycondensation reaction of a silicon compound (T) having three hydrolyzable groups, a silicon compound (D) having two hydrolyzable groups, and a silicon compound (M) having one hydrolyzable group. The polysiloxane of the embodiments of the present disclosure may be a compound that has a silsesquioxane unit (hereinafter referred to as a "structural unit T") deriving from the silicon compounds (T), (D) and (M), a silicone unit (hereinafter referred to as a "structural unit D"), and a monofunctional siloxane unit (hereinafter referred to as a "structural unit M").

At least one compound of the silicon compound (T), the silicon compound (D), and the silicon compound (M) has a hydrosilyl group among the silicon compounds (T), (D) and (M), and at least one compound of the silicon compound (T), the silicon compound (D), and the silicon compound (M) has a hydrosilylatable carbon-carbon unsaturated group. This unsaturated group usually binds to a silicon atom and is an organic group having carbon atoms of 2 to 10 containing a double bond or a triple bond. Specific examples of the unsaturated group may include, but are not limited to, a vinyl group, an ortho styryl group, a meta styryl group, a para styryl group, an acryloyl group, a methacryloyl group, an acryloxy group, a methacryloxy group, a 1-propenyl group, a 1-butenyl group, a 1-pentenyl group, a 3-methyl-1-butenyl group, a phenylethenyl group, an ethynyl group, a 1-propynyl group, a 1-butynyl group, a 1-pentinyl group, a 3-methyl-1-butynyl group, a phenylbutynyl group, and the like, and any combination thereof.

The silicon compound having the unsaturated group may have only one unsaturated group or two or more unsaturated groups. In the case where the compound has two or more unsaturated groups, the unsaturated groups may be the same or different from each other. Additionally, the two or more unsaturated groups may be bound to the same silicon atom or to a plurality of silicon atoms. It is noted that when a polysiloxane obtained using a silicon compound in which the unsaturated group is bound to the same silicon atom is subjected to curing, an unreacted vinyl group may easily remain due to steric hindrance, and heat resistance might become insufficient. Therefore, the silicon compound having the unsaturated group is preferably a compound in which one unsaturated group is bound to one silicon atom.

Other suitable silicon-based resins include (a) a compound comprising a reactive group of Formula I:

$$-X-SiR''_x(OR')_{3-z} \quad \text{Formula I}$$

wherein X comprises a hydrocarbon chain; wherein x=0 to 2 and z=0 to 2; wherein R' and R'' comprises hydrogen, a halogen, an amide, an amine, a hydrocarbon chain, carboxy (e.g., acetoxy), alkoxy (e.g., ethoxy, methoxy), a hydrocarbon chain comprising a heteroatom, and/or a hydrocarbon chain comprising a carbonyl group; and wherein when x is 2, then each R'' may be the same (identical) or different; and wherein when z is 0 or 1, then each R' may be the same or different; and (b) a polysiloxane comprising a reactive functional group that comprises at least one of the following structural units of Formula II:

$$R1_nR2_mSiO_{(4-n-m)/2} \quad \text{Formula II}$$

wherein R1 comprises hydrogen, hydroxyl, a hydrocarbon chain, or a siloxane chain; wherein R2 comprises a functional group; and wherein m and n fulfill the requirements of 0<n<4, 0<m<4 and 2<(m+n)<4; and wherein when n>1, then each R1 may be the same or different; and wherein when m>1, then each R2 may be the same or different. In certain embodiments, the functional group of R2 comprises hydroxyl, carboxyl, isocyanate, blocked (poly)isocyanate, primary amine, secondary amine, amide, carbamate, urea, urethane, vinyl, unsaturated ester, maleimide, fumarate, anhydride, hydroxyl alkylamide, epoxy, or combinations thereof.

Other suitable silicon-based resins may include a compound comprising an organofunctional polysiloxane polymer as a binding resin obtaining the polymeric structure as part of a curing mechanism or a combination thereof. The curing mechanism of such siloxane coatings is a two-step mechanism. First, a hydrolysable group attached to the silicon atom is split off in a reaction with water, to form a silanol. The silanol then reacts with another silanol in a condensation reaction to form a silicon-oxygen-silicon chemical bonding which is characteristic for siloxane coatings. The hydrolysable group can be a halogen, ketoxime or acetoxy groups, but the most common is alkoxy group. Suitable such silicon-based resins comprise:

a) a polysiloxane having the following Formula III:

$$R3-[Si(R1)(R2)-O]_n-R4 \quad \text{Formula III}$$

wherein, for each repeating polymer unit, R1, R2 and R3 are independently selected from the group consisting of alkyl, aryl, reactive glycidoxy groups having up to 20 carbon atoms, and $OSi(OR_5)_3$ groups, wherein each R5 independently has the same meaning as R1, R2 or R3, and R4 is either alkyl, aryl or hydrogen, and wherein n is selected such that the molecular weight of the polysiloxane is in the range of 500 to 2000; and, b) an organo functional silane with two hydrolysable groups having the formula wherein R1 is selected from the group consisting of alkyl, aryl, reactive glycidoxy, amino, mercapto, vinyl, isocyanate or methacrylate groups having up to 20 carbon atoms; R2 is selected from the group consisting of reactive glycidoxy, amino, mercapto, vinyl, isocyanate or methacrylate groups having up to 20 carbon atoms; and R3 and R4 are halogen or alkoxy, ketoxime or acetoxy groups having up to six carbon atoms; wherein the coating composition has a solids content of at least 60% by weight.

Still other suitable silicon-based resins may comprise a silane coupling agent and a polymer having a reactive silicon end group. In some embodiments, these suitable silicon-based resins may also include a catalyst operable to facilitate the curing of the polymer, a diluent, a dehydrating agent, and/or a filler material. Generally, any suitable polymer that can be prepared with reactive silicon end groups may be used. Examples of suitable polymers may include, but are not limited to, a polyalkyl (e.g., polyethers, polyalkanes, polyalkenes, polyalkynes, and the like), a substituted alkyl monomer (e.g., styrene), an acrylic, and any combination thereof. Examples of suitable reactive silicon end groups may include, but are not limited to, triethoxysilanes, methyldiethoxysilanes, trisilanols, alkoxysilanes, substituted silanes, multi-silanols, and any combination thereof. One suitable polymer having a reactive silicon end group that may be used in particular embodiments of the present disclosure is a silane-modified poly(propylene oxide) oligomer.

Generally, any suitable silane coupling agent may be used in accordance with particular embodiments of the present disclosure. Examples of suitable silane coupling agents may include, but are not limited to, N-2-(aminoethyl)-3-aminopropyltrimethoxysilane, 3-glycidoxypropyltrimethoxysilane, gamma-aminopropyltriethoxysilane, N-beta-(aminoethyl)-gamma-aminopropyltrimethoxysilanes, aminoethyl-N-beta-(aminoethyl)-gamma-aminopropyl-trimethoxysilanes, gamma-ureidopropyl-triethoxysilanes, beta-(3-4 epoxy-cyclohexyl)-ethyl-trimethoxysilane, gamma-glycidoxypropyltrimethoxysilane, vinyltrichlorosilane, vinyltris(beta-methoxyethoxy) silane, vinyltriethoxysilane, vinyltrimethoxysilane, 3-metacryloxypropyltrimethoxysilane, beta-(3,4 epoxycyclohexyl)-ethyltrimethoxysilane, r-glycidoxypropyltrimethoxysilane, r-glycidoxypropylmethylidiethoxysilane, N-beta-(aminoethyl)-r-aminopropyl-trimethoxysilane, N-beta-(aminoethyl)-r-aminopropylmethyldimethoxysilane, 3-aminopropyl-triethoxysilane, N-phenyl-r-aminopropyltri- methoxysilane, r-mercaptopropyltrimethoxysilane, r-chloropropyltrimethoxysilane, vinyltris (beta-methoxyethoxy) silane, r-metacryloxypropyltrimethoxysilane, r-glycidoxypropyltrimethoxysilane, r-glycidoxypropylmethylidiethoxysilane, N-beta-(aminoethyl)-r-aminopropyltrimethoxysilane, N-beta-(aminoethyl)-r-aminopropylmethyldimethoxysilane, r-aminopropyltriethoxysilane, N-[3-(trimethoxysilyl)propyl]-ethylenediamine, substituted silanes where one or more of the substitutions contains a different functional group, and any combination thereof.

In some embodiments, the silane coupling agent may be present in the silicon-based resin composition in an amount of from a lower limit of about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the composition, and preferably in an amount from about 0.5% to about 3% by weight of the composition, encompassing any value and any subset therebetween.

In some embodiments, the surface modification agent may comprise a zeta potential-modifying aggregating composition, which can modify the zeta potential or aggregation potential of a surface. Such modifications can permit any two surfaces (e.g., of a fracture face and a particulate) to have a greater attraction for one another.

Zeta potential-modifying aggregating compositions suitable for use in the embodiments of the present disclosure may include, but are not limited to, a reaction product of an amine and a phosphate ester, where the zeta potential-modifying aggregating composition is designed to coat a surface to change the zeta potential or aggregation potential of the surface.

Suitable amines may include, but are not limited to, any amine that is capable of reacting with a suitable phosphate ester to form a composition that forms a deformable coating on a surface. Exemplary examples of such amines may include, but are not limited to, any amine of the general formula R1,R2NH or mixtures or combinations thereof, where R1 and R2 are independently a hydrogen atom or a carbyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof and where one or more of the hydrogen atoms can be replaced by one or more single valence atoms selected from the group consisting of fluorine, chlorine, bromine, iodine, and any combination thereof. Exemplary examples of amines suitable for use in the embodiments herein may include, but are not limited to, aniline and alkyl anilines or mixtures of alkyl anilines, pyridines and alkyl pyridines or mixtures of alkyl pyridines, pyrrole and alkyl pyrroles or mixtures of alkyl pyrroles, piperidine and alkyl piperidines or mixtures of alkyl piperidines, pyrrolidine and alkyl pyrrolidines or mixtures of alkyl pyrrolidines, indole and alkyl indoles or mixtures of alkyl indoles, imidazole and alkyl imidazole or mixtures of alkyl imidazole, quinoline and alkyl quinoline or mixtures of alkyl quinoline, isoquinoline and alkyl isoquinoline or mixtures of alkyl isoquinoline, pyrazine and alkyl pyrazine or mixtures of alkyl pyrazine, quinoxaline and alkyl quinoxaline or mixtures of alkyl quinoxaline, acridine and alkyl acridine or mixtures of alkyl acridine, pyrimidine and alkyl pyrimidine or mixtures of alkyl pyrimidine, quinazoline and alkyl quinazoline or mixtures of alkyl quinazoline, and any combination thereof.

Suitable phosphate esters may include, but are not limited to, any phosphate ester that is capable of reacting with a suitable amine to form a composition that forms a deformable coating on a surface. Exemplary examples of such phosphate esters may include, but are not limited to, any phosphate esters of the general formula P(O)(OR3)(OR4)(OR5) or mixtures or combinations thereof, where R3, R4, and OR5 are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine, and any combination thereof. Exemplary examples of phosphate esters may include, but are not limited to, phosphate ester of alkanols having the general formula $P(O)(OH)_x(OR_6)_y$, where x+y=3 and are independently a hydrogen atom or a carbyl group having between about 1 and 40 carbon atoms, and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof such as ethoxy phosphate, propoxyl phosphate or higher alkoxy phosphates, and any combination thereof.

Other exemplary examples of phosphate esters may include, but are not limited to, phosphate esters of alkanol amines having the general formula $N[R_7OP(O)(OH)_2]_3$ where R7 is a carbenyl group having between about between about 1 and 40 carbon atoms and the required hydrogen atoms to satisfy the valence and where one or more of the carbon atoms can be replaced by one or more hetero atoms selected from the group consisting of boron, nitrogen, oxygen, phosphorus, sulfur, and any combination thereof; and where one or more of the hydrogen atoms can be replaced by one or more single valence atoms selected from the group consisting of fluorine, chlorine, bromine, iodine or mixtures or combinations thereof group including the tri-phosphate ester of tri-ethanol amine, and any combination thereof. Other exemplary examples of phosphate esters may include, but are not limited to, phosphate esters of hydroxylated aromatics, such as phosphate esters of alkylated phenols such as nonylphenyl phosphate ester or phenolic phosphate esters. Other exemplary examples of phosphate esters may include, but are not limited to, phosphate esters of diols and polyols such as phosphate esters of ethylene glycol, propylene glycol, or higher glycolic structures. Other exemplary phosphate esters may include, but are not limited to, any phosphate ester that can react with an amine and be coated on to a surface that forms a deformable coating enhancing the aggregating potential of the surface.

In some embodiments, the surface modification agent may comprise a surface modification agent emulsion that comprises an aqueous fluid, an emulsifying agent, and a surface modification agent. The surface modification agent in suitable emulsions may be either a non-aqueous tackifying agent or a resin, such as those described above. These surface modification agent emulsions have an aqueous external phase and organic-based internal phase. The term "emulsion" and all grammatical variants thereof, as used herein, refers to a combination of two or more immiscible phases and includes, but is not limited to, dispersions and suspensions.

Suitable surface modification agent emulsions comprise an aqueous external phase comprising an aqueous fluid. Suitable aqueous fluids that may be used in the surface modification agent emulsions of the embodiments of the present disclosure include freshwater, salt water, brine, seawater, or any other aqueous fluid that, preferably, does not adversely react with the other components used in accordance with this disclosure or with the subterranean formation, including those listed above with reference to the aqueous base fluids included in the treatment fluids described herein. One should note, however, that if long-term stability of the emulsion is desired, a more suitable aqueous fluid may be one that is substantially free of salts. It is within the ability of one skilled in the art, with the benefit of this disclosure, to determine if and how much salt may be tolerated in the surface modification agent emulsions of the embodiments of the present disclosure before it becomes problematic for the stability of the emulsion.

The aqueous fluid may be present in the surface modification agent emulsions in an amount in the range of from a lower limit of about 20%, 22%, 24%, 26%, 28%, 30%, 32%, 34%, 36%, 38%, 40%, 42%, 44%, 46%, 48%, 50%, 52%, 54%, 56%, 58%, and 60% to an upper limit of about 99.9%, 98%, 96%, 94%, 92%, 90%, 88%, 86%, 84%, 82%, 80%, 78%, 76%, 74%, 72%, 70%, 68%, 66%, 64%, 62%, and 60% by weight of the surface modification agent emulsion composition, encompassing any value and any subset therebetween. In some embodiments, the aqueous fluid may be present in the surface modification agent emulsions in an amount in the range of about 60% to 99.9% by weight of the surface modification agent emulsion composition. In other embodiments, the aqueous fluid may be present in the surface modification agent emulsions in an amount in the range of about 95% to 99.9% by weight of the surface modification agent emulsion composition.

The surface modification agent in the emulsion may be either a non-aqueous tackifying agent or a resin, such as those described above. The surface modification agents may be present in a surface modification agent emulsion in an amount in the range of from a lower limit of about 0.1%, 1%, 5%, 10%, 15%, 20%, 25%, 30%, 35%, and 40% to an upper limit about 80%, 75%, 70%, 65%, 60%, 55%, 50%, 45%, and 40% by weight of the surface modification agent emulsion composition, encompassing any value and any subset therebetween. In some embodiments, the surface modification agent may be present in a surface modification agent emulsion in an amount in the range of about 0.1% to about 40% by weight of the composition. In some embodiments, the surface modification agent may be present in a surface modification agent emulsion in an amount in the range of about 0.1% to about 5% by weight of the composition.

In certain embodiments, the surface modification agent emulsions may further comprise an emulsifying agent. Examples of suitable emulsifying agents may include, but are not limited to, surfactants, proteins, hydrolyzed proteins, lipids, glycolipids, and nano-sized particulates, including, but not limited to, fumed silica. Combinations of these may be suitable as well.

In some embodiments, the surface modification agent may also comprise an optional catalyst to facilitate curing. Generally, any suitable catalyst may be used with the surface modification agent described herein. Examples of suitable catalysts may include, but are not limited to, tertiary amine catalysts, titanium chelate catalysts, tin catalysts, lead catalysts, bismuth catalysts, and any combination thereof. One suitable catalyst that may be used in particular embodiments of the present disclosure is dibutylbis(2,4-pentanedionate-O,O')—, (OC-6-11). In some embodiments, the catalyst may be present in an amount from about 0.1%, 0.2%, 0.3%, 0.4, 0.5%, 0.6%, 0.7%, 0.8%, 0.9%, 1%, 1.1%, 1.2%, 1.3%, 1.4%, 1.5%, 1.6%, 1.7%, 1.8%, 1.9%, 2%, 2.1%, 2.2%, 2.3%, 2.4%, and 2.5% to an upper limit of about 5%, 4.9%, 4.8%, 4.7%, 4.6%, 4.5%, 4.4%, 4.3%, 4.2%, 4.1%, 4%, 3.9%, 3.8%, 3.7%, 3.6%, 3.5%, 3.4%, 3.3%, 3.2% 3.1%, 3%, 2.9%, 2.8%, 2.7%, 2.6%, and 2.5% by weight of the surface modification agent, and preferably in an amount from about 1% to about 3% by weight of the composition, encompassing any value and any subset therebetween.

For use in the embodiments described herein, the SMA may be present in the treatment fluids of the present disclosure in an amount of from a lower limit of about 0.01%, 0.5%, 1%, 1.5%, 2%, and 2.5% to an upper limit of about 5%, 4.5%, 4%, 3.5%, 3%, and 2.5% by weight of the base fluid of the treatment fluid, encompassing any value and subset therebetween. Each of these values is critical to the embodiments of the present disclosure and may depend on a number of factors including, but not limited to, the applicable treatment fluid, the additives and/or particulates in the applicable treatment fluid, the desired SMA coating (either on fracture face(s) or particulates), and the like.

During Phase II and Phase III particulates (encompassing both non-degradable and degradable particulates) may be included in various treatment fluids, such as to prop open fractures or to act as diverting agents. In some treatment fluids, the particulates may be degradable, non-degradable, or a combination thereof, without departing from the scope of the present disclosure.

The particulates described herein may be any particulate suitable for use in a subterranean formation operation (e.g., a fracturing operation). Suitable materials for these particulates may include, but are not limited to, sand, bauxite, gravel, ceramic material, glass material, polymeric material (e.g., ethylene-vinyl acetate or composite materials), polytetrafluoroethylene material, nut shell pieces, a cured resinous particulate comprising nut shell pieces, seed shell pieces, a cured resinous particulate comprising seed shell pieces, fruit pit pieces, a cured resinous particulate comprising fruit pit pieces, wood, composite particulates, and any combination thereof. Suitable composite particulates may comprise a binder and a filler material, wherein suitable filler materials may include, but are not limited to, silica, alumina, fumed carbon, carbon black, graphite, mica, titanium dioxide, barite, meta-silicate, calcium silicate, kaolin, talc, zirconia, boron, fly ash, hollow glass microspheres, solid glass, and the like, and any combination thereof.

In some embodiments, degradable particulates may be used alone (e.g., Phase III) or may comprise a portion of the particulates such that non-degradable and degradable particulates are intermixed together. Upon a triggering event, the degradable particulates may be degraded (e.g., to enhance the conductivity of a propped fracture). Suitable degradable particulates may include, but are not limited to, oil-degradable polymers, degradable polymers, degradable salts, blends thereof, and any combination thereof.

Oil-degradable polymers that may be used in accordance with the embodiments of the present disclosure may be either natural or synthetic polymers. Some particular examples include, but are not limited to, polyacrylics, polyamides, and polyolefins such as polyethylene, polypropylene, polyisobutylene, and polystyrene, and any combination thereof. Other suitable oil-degradable polymers include those that have a melting point which is such that the polymer will dissolve at the temperature of the subterranean formation in which it is placed such as a wax material.

In addition to oil-degradable polymers, other degradable materials that may be used in conjunction with the embodiments of the present disclosure include, but are not limited to, degradable polymers, dehydrated salts, and/or mixtures of the two. As for degradable polymers, a polymer is considered to be "degradable" herein if the degradation is due to, in situ, a chemical and/or radical process such as hydrolysis, oxidation, or UV radiation. The degradability of a polymer depends at least in part on its backbone structure. For instance, the presence of hydrolyzable and/or oxidizable linkages in the backbone often yields a material that will degrade as described herein. The rates at which such polymers degrade are dependent on the type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades (e.g., temperature, presence of moisture, oxygen, microorganisms, enzymes, pH, and the like).

Suitable examples of degradable polymers that may be used in accordance with the embodiments of the present disclosure include polysaccharides such as dextran or cellulose, chitins, chitosans, proteins, aliphatic polyesters, poly (lactides), poly(glycolides), poly(ε-caprolactones), poly(hydroxybutyrates), poly(anhydrides), aliphatic or aromatic polycarbonates, poly(orthoesters), poly(amino acids), poly (ethylene oxides), polyphosphazenes, and any combination thereof.

Polyanhydrides are another type of particularly suitable degradable polymer useful in the embodiments of the present disclosure. Polyanhydride hydrolysis proceeds, in situ, via free carboxylic acid chain-ends to yield carboxylic acids as final degradation products. The erosion time can be varied over a broad range of changes in the polymer backbone. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride). Combinations of these are also suitable.

Dehydrated salts may be used in accordance with the embodiments of the present disclosure as a degradable material. A dehydrated salt is suitable for use in the embodiments of the present disclosure if it will degrade over time as it hydrates. For example, a particulate solid anhydrous borate material that degrades over time may be suitable. Specific examples of particulate solid anhydrous borate materials that may be used include, but are not limited to, anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are highly soluble in water as compared to anhydrous borate materials and as a result degrade in the aqueous fluid. In some instances, the total time required for the anhydrous borate materials to degrade in an aqueous fluid is in the range of from about 8 hours to about 72 hours depending upon the temperature of the subterranean zone in which they are placed. Other examples include organic or inorganic salts like acetate trihydrate.

Blends of certain degradable materials may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. Other materials that undergo an irreversible degradation may also be suitable, if the products of the degradation do not undesirably interfere with either the conductivity of the proppant matrix or with the production of any of the fluids from the subterranean formation.

The particulates (including the degradable particulates) may be of any shape known in the art as suitable for use in a subterranean operation (e.g., a fracturing operation). In some embodiments of the present disclosure, it may be desirable to use substantially spherical particulates. In other embodiments, it may be desired to use substantially non-spherical particulates. Combinations of substantially spherical and substantially non-spherical particulates may also be suitable, without departing from the scope of the present disclosure. Suitable substantially non-spherical proppant particulates may be cubic, polygonal, fibrous, or any other non-spherical shape. Such substantially non-spherical proppant particulates may be, for example, cubic-shaped, rectangular-shaped, rod-shaped, ellipse-shaped, cone-shaped, pyramid-shaped, cylinder-shaped, and any combination thereof. That is, in embodiments wherein the proppant particulates are substantially non-spherical, the aspect ratio of the material may range such that the material is fibrous to such that it is cubic, octagonal, or any other configuration.

In one embodiment, the substantially non-spherical proppant particulates may be cylindrical and have an aspect ratio of about 1.5 to about 1. The use of substantially non-spherical proppant particulates may be desirable in some embodiments described herein because, among other things, they may provide a lower rate of settling when slurried into a base fluid, or may be better suited for placement in the preexisting or new fractures described in some embodiments herein.

In certain embodiments, the particulates may be present in the treatment fluids described herein in an amount in the range of from a lower limit of about 0.5 pounds per gallon ("ppg"), 1 ppg, 2.5 ppg, 5 ppg, 7.5 ppg, 10 ppg, 12.5 ppg, and 15 ppg to an upper limit of about 30 ppg, 27.5 ppg, 25 ppg, 22.5 ppg, 20 ppg, 17.5 ppg, and 15 ppg by volume of the liquid component of the treatment fluid, encompassing any value and subset therebetween. That is, any of the fine particulates, medium particulates, and coarse particulates may be present in this amount, in the same amounts or in different amounts, without departing from the scope of the present disclosure. In some embodiments, where both degradable particulates and non-degradable particulates are used together, the degradable particulates may be included in the range of a lower limit of about 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, and 10% to an upper limit of about 20%, 19.5%, 19%, 18.5%, 18%, 17.5%, 17%, 16.5%, 16%, 15.5%, 15%, 14.5%, 14%, 13.5%, 13%, 12.5%, 12%, 11.5%, 11%, 10.5%, and 10% by weight of the particulates as a whole, encompassing any value and subset therebetween.

In some embodiments, one or more of the treatment fluids described herein may further comprise an additive to enhance or aid in performing a desired subterranean formation operation. Such additives may be selected dependent on the type of subterranean formation, the conditions of the subterranean formation, and the like. Suitable additives may include, but are not limited to, a salt, a weighting agent, an inert solid, a fluid loss control agent, an emulsifier, a dispersion aid, a corrosion inhibitor, an emulsion thinner, an emulsion thickener, a surfactant, a lost circulation material, a foaming agent, a gas, a pH control additive, a breaker, a biocide, a stabilizer, a chelating agent, a scale inhibitor, a gas hydrate inhibitor, a mutual solvent, an oxidizer, a reducer, a friction reducer, a clay stabilizing agent, and the like, and any combination thereof.

In various embodiments, systems configured for delivering the treatment fluids described herein to a downhole location are described. In various embodiments, the systems can comprise a pump fluidly coupled to a tubular, the tubular containing the treatment fluids described herein. It will be appreciated that while the system described below may be used for delivering one or more treatment fluid, each treatment fluid is delivered separately into the subterranean formation.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce the treatment fluids to a subterranean formation at or above a fracture initiation pressure of the subterranean formation, but it may also be used in cases where fracturing is not desired. In some embodiments, the high pressure pump may be capable of fluidly conveying particulate matter, such as the micro-proppant particulates and/or the micro-proppant particulates described in some embodiments herein, into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the treatment fluids to the high pressure pump. In such embodiments, the low pressure pump may "step up" the pressure of the treatment fluids before reaching the high pressure pump.

In some embodiments, the systems described herein can further comprise a mixing tank that is upstream of the pump and in which the treatment fluids are formulated. In various embodiments, the pump (e.g., a low pressure pump, a high pressure pump, or a combination thereof) may convey the treatment fluids from the mixing tank or other source of the treatment fluids to the tubular. In other embodiments, however, the treatment fluids may be formulated offsite and transported to a worksite, in which case the treatment fluid may be introduced to the tubular via the pump directly from its shipping container (e.g., a truck, a railcar, a barge, or the like) or from a transport pipeline. In either case, the treatment fluids may be drawn into the pump, elevated to an appropriate pressure, and then introduced into the tubular for delivery downhole.

FIG. 5 shows an illustrative schematic of a system that can deliver the treatment fluids of the present disclosure to a downhole location, according to one or more embodiments. It should be noted that while FIG. 5 generally depicts a land-based system, it is to be recognized that like systems may be operated in subsea locations as well. As depicted in FIG. 5, system 1 may include mixing tank 10, in which the treatment fluids of the embodiments herein may be formulated. The treatment fluids may be conveyed via line 12 to wellhead 14, where the treatment fluids enter tubular 16, tubular 16 extending from wellhead 14 into subterranean formation 18. Upon being ejected from tubular 16, the treatment fluids may subsequently penetrate into subterranean formation 18. Pump 20 may be configured to raise the pressure of the treatment fluids to a desired degree before introduction into tubular 16. It is to be recognized that system 1 is merely exemplary in nature and various additional components may be present that have not necessarily been depicted in FIG. 5 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

Although not depicted in FIG. 5, the treatment fluid may, in some embodiments, flow back to wellhead 14 and exit subterranean formation 18. In some embodiments, the treatment fluid that has flowed back to wellhead 14 may subsequently be recovered and recirculated to subterranean formation 18.

It is also to be recognized that the disclosed treatment fluids may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 5.

Embodiments disclosed herein include:

Embodiment A

A method comprising: (a) isolating a first treatment zone comprising an opening through a wellbore and into a subterranean formation; (b) introducing a first high-viscosity treatment fluid (HVTF) into the subterranean formation through the opening, the first HVTF comprising a first base fluid and a first gelling agent; (c) applying incrementally increased fracturing rate steps (IIFRSs) to the first HVTF to create or enhance a dominate fracture, the IIFRSs applied to the first HVTF each above about a fracture gradient pressure, below about a near-wellbore apparent fissure opening pressure, and below about a far-field apparent fissure opening pressure, and wherein between each IIFRS applied to the first HVTF a downhole pressure slope over time will increase, decline, or stabilize at a first HVTF measured pressure slope; (d) evaluating the first HVTF measured pressure slope to determine whether an increasing first HVTF pressure slope, a stabilizing first HVTF pressure slope, or a declining first HVTF pressure slope exists, wherein if the stabilizing first HVTF pressure slope or the declining first HVTF pressure slope exists, a subsequent IIFRS is applied to the first HVTF, or wherein if the increasing first HVTF pressure slope exists, a first HVTF decreased fracturing rate step (d1) is applied to the first HVTF or a constant rate is maintained until the stabilizing first HVTF pressure slope exists, followed by applying the subsequent IIFRS to the first HVTF; (e) repeating one or more of steps (c) and (d) at the first treatment zone, thereby increasing a volume of the dominate fracture due to efficient dominate fracturing with generated back pressure until a maximum fracturing rate is reached; (f) introducing a first low-viscosity treatment fluid (LVTF) into the subterranean formation through the opening at the first treatment zone at the maximum fracturing rate and at a pressure above the far-field apparent fissure opening pressure to create or enhance a secondary azimuth fracture extending from the dominate fracture, the first LVTF comprising a second base fluid and fine particulates, medium particulates, or coarse particulates; and (g) performing a first net pressure pulsing operation after the first LVTF is introduced comprising: (g1) introducing a first net pressure pulsing high-viscosity treatment fluid (first NPP HVTF) into the subterranean formation immediately following the first LVTF at the maximum fracturing rate; (g2) applying a first NPP HVTF decreased fracturing rate step to the first NPP HVTF; and (g3) applying at least one IIFRS to the first NPP HVTF to create a net pressure pulse (NPP) on the first LVTF in the dominate fracture, wherein the at least one IIFRS applied to the first NPP HVTF is applied until +/−10% of the maximum fracturing rate is reached.

Embodiment A may have one or more of the following additional elements in any combination:

Element A1: Wherein the first NPP HVTF decreased fracturing rate step is in the range of about 10% to about 80% less than the maximum fracturing rate.

Element A2: Wherein the first NPP HVTF decreased fracturing rate step is applied when the first NPP HVTF is introduced into the subterranean formation or when the first NPP HVTF reaches a leading edge of the first treatment zone.

Element A3: Wherein a substantially solids-free low-viscosity spacer fluid (LVSP) is introduced into the subterranean formation between steps (f) and (g).

Element A4: Wherein a plurality of IIFRSs is applied to the first NPP HVTF until +/−10% of the maximum fracturing rate is reached, and between each IIFRS applied to the first NPP HVTF a downhole pressure slope over time will increase, decline, or stabilize at a first NPP HVTF measured pressure slope, and further comprising: evaluating the first NPP HVTF measured pressure slope to determine whether an increasing first NPP HVTF pressure slope, a stabilizing first NPP HVTF pressure slope, or a declining first NPP HVTF pressure slope exists, wherein if the stabilizing first NPP HVTF pressure slope or the declining first NPP HVTF pressure slope exists, a subsequent IIFRS is applied to the first NPP HVTF, or wherein if the increasing first NPP HVTF pressure slope exists, a first NPP HVTF decreased fracturing rate step (d1) is applied to the first NPP HVTF or a constant rate is maintained until the stabilizing first NPP HVTF pressure slope exists, followed by applying the subsequent IIFRS to the first NPP HVTF.

Element A5: Wherein the first LVTF comprises fine particulates, and further comprising after step (f) and before step (g): (f1) introducing a second LVTF comprising a fourth base fluid and medium particulates.

Element A6: Wherein the first LVTF comprises fine particulates, and further comprising after step (f) and before step (g): (f1) introducing a second LVTF comprising a fourth base fluid and medium particulates; and (f2) introducing a third LVTF comprising a fifth base fluid and coarse particulates.

Element A7: Further comprising after step (g): (h) introducing a second LVTF into the subterranean formation immediately following the first NPP HVTF through the opening at the first treatment zone at the maximum fracturing rate and at a pressure above the far-field apparent fissure opening pressure, the second LVTF comprising a fourth base fluid and fine particulates, medium particulates, or coarse particulates; and (i) performing a second net pressure pulsing operation after the second LVTF is introduced comprising: (i1) introducing a second NPP HVTF into the subterranean formation immediately following the second LVTF at the maximum fracturing rate; (i2) applying a second NPP HVTF decreased fracturing rate step to the second NPP HVTF; and (i3) applying at least one IIFRS to the second NPP HVTF to create a NPP on the second LVTF in the dominate fracture, wherein the at least one IIFRS applied to the second NPP HVTF is applied until +/−10% of the maximum fracturing rate is reached.

Element A8: Further comprising a tubular extending into the wellbore in the subterranean formation; and a pump fluidly coupled to the tubular, the tubular comprising separately one or both of the first HVTF and/or the first LVTF.

By way of non-limiting example, exemplary combinations applicable to Embodiment A include: A1-A8; A1, A2, and A7; A3 and A6; A4, A5, and A8; A2 and A6; A5, A7, and A8; and the like.

Embodiment B

A method comprising: (a) isolating a first treatment zone comprising an opening through a wellbore and into a subterranean formation; (b) introducing a first high-viscosity treatment fluid (HVTF) into the subterranean formation through the opening, the first HVTF comprising a first base fluid and a first gelling agent; (c) applying incrementally increased fracturing rate steps (IIFRSs) to the first HVTF to create or enhance a dominate fracture, the IIFRSs applied to the first HVTF each above about a fracture gradient pressure, below about a near-wellbore apparent fissure opening pressure, and below about a far-field apparent fissure opening pressure, and wherein between each IIFRS applied to the first HVTF a downhole pressure slope over time will increase, decline, or stabilize at a first HVTF measured pressure slope; (d) evaluating the first HVTF measured pressure slope to determine whether an increasing first HVTF pressure slope, a stabilizing first HVTF pressure slope, or a declining first HVTF pressure slope exists, wherein if the stabilizing first HVTF pressure slope or the declining first HVTF pressure slope exists, a subsequent IIFRS is applied to the first HVTF, or wherein if the increasing first HVTF pressure slope exists, a first HVTF decreased fracturing rate step (d1) is applied to the first HVTF or a constant rate is maintained until the stabilizing first HVTF pressure slope exists, followed by applying the subsequent IIFRS to the first HVTF; (e) repeating one or more of steps (c) and (d) at the first treatment zone, thereby increasing a volume of the dominate fracture due to efficient dominate fracturing with generated back pressure until a maximum fracturing rate is reached; (f) introducing a first low-viscosity treatment fluid (LVTF) into the subterranean formation through the opening at the first treatment zone at the maximum fracturing rate and at a pressure above the far-field apparent fissure opening pressure to create or enhance a secondary azimuth fracture extending from the dominate fracture, the first LVTF comprising a second base fluid and fine particulates, medium particulates, or coarse particulates; (g) applying a first LVTF decreased fracturing rate step to the first LVTF; and (h) performing a first net pressure pulsing operation after the first LVTF is introduced comprising: (h1) introducing a first net pressure pulsing high-viscosity treatment fluid (first NPP HVTF) into the subterranean formation immediately following the first LVTF at a displacement rate equivalent to a rate achieved by the first LVTF decreased fracturing rate step; and (h2) applying at least one IIFRS to the first NPP HVTF to create a net pressure pulse (NPP) on the first LVTF in the dominate fracture, wherein the at least one IIFRS applied to the first NPP HVTF is applied until +/−10% of the maximum fracturing rate is reached.

Embodiment B may have one or more of the following additional elements in any combination:

Element B1: Wherein the first LVTF decreased fracturing rate step is in the range of about 10% to about 80% less than the maximum fracturing rate.

Element B2: Wherein a substantially solids-free low-viscosity spacer fluid (LVSP) is introduced into the subterranean formation between steps (g) and (h).

Element B3: Wherein a plurality of IIFRSs is applied to the first NPP HVTF until +/−10% of the maximum fracturing rate is reached, and between each IIFRS applied to the first NPP HVTF a downhole pressure slope over time will increase, decline, or stabilize at a first NPP HVTF measured pressure slope, and further comprising: evaluating the first NPP HVTF measured pressure slope to determine whether an increasing first NPP HVTF pressure slope, a stabilizing first NPP HVTF pressure slope, or a declining first NPP HVTF pressure slope exists, wherein if the stabilizing first NPP HVTF pressure slope or the declining first NPP HVTF pressure slope exists, a subsequent IIFRS is applied to the first NPP HVTF, or wherein if the increasing first NPP HVTF pressure slope exists, a first NPP HVTF decreased fracturing rate step (d1) is applied to the first NPP HVTF or a constant rate is maintained until the stabilizing first NPP HVTF pressure slope exists, followed by applying the subsequent IIFRS to the first NPP HVTF.

Element B4: Wherein the at least one IIFRS applied to the first HVTF is applied when the first LVTF reaches a desired fracture tip half-length.

Element B5: Further comprising after step (h): (i) introducing a second LVTF into the subterranean formation immediately following the first NPP HVTF through the opening at the first treatment zone at the maximum fracturing rate and at a pressure above the far-field apparent fissure opening pressure, the second LVTF comprising a fourth base fluid and fine particulates, medium particulates, or coarse particulates; (j) applying a second LVTF decreased fracturing rate step to the second LVTF; and (k) performing a second net pressure pulsing operation after the second LVTF is introduced comprising: (k1) introducing a second NPP HVTF into the subterranean formation immediately following the second LVTF at the maximum fracturing rate; and (k3) applying at least one IIFRS to the second NPP HVTF to create a NPP on the second LVTF in the dominate fracture, wherein the at least one IIFRS applied to the second NPP HVTF is applied until +/−10% of the maximum fracturing rate is reached.

Element B6: Further comprising a tubular extending into the wellbore in the subterranean formation; and a pump fluidly coupled to the tubular, the tubular comprising separately one or both of the first HVTF and/or the first LVTF.

By way of non-limiting example, exemplary combinations applicable to Embodiment B include: B1-B6, B1, B2, B4, and B6; B2, B5, and B6; B1 and B4, B3, B5, and B6; B1 and B2; and the like.

Embodiment C

A method comprising: (a) isolating a first treatment zone comprising an opening through a wellbore and into a subterranean formation; (b) introducing a first high-viscosity treatment fluid (HVTF) into the subterranean formation through the opening, the first HVTF comprising a first base fluid and a first gelling agent; (c) applying incrementally increased fracturing rate steps (IIFRSs) to the first HVTF to create or enhance a dominate fracture, the IIFRSs applied to the first HVTF each above about a fracture gradient pressure, below about a near-wellbore apparent fissure opening pressure, and below about a far-field apparent fissure opening pressure, and wherein between each IIFRS applied to the first HVTF a downhole pressure slope over time will increase, decline, or stabilize at a first HVTF measured pressure slope; (d) evaluating the first HVTF measured pressure slope to determine whether an increasing first HVTF pressure slope, a stabilizing first HVTF pressure slope, or a declining first HVTF pressure slope exists, wherein if the stabilizing first HVTF pressure slope or the declining first HVTF pressure slope exists, a subsequent IIFRS is applied to the first HVTF, or wherein if the increasing first HVTF pressure slope exists, a first HVTF decreased fracturing rate step (d1) is applied to the first HVTF or a constant rate is maintained until the stabilizing first HVTF pressure slope exists, followed by applying the subsequent IIFRS to the first HVTF; (e) repeating one or more of steps (c) and (d) at the first treatment zone, thereby increasing a volume of the dominate fracture due to efficient dominate fracturing with generated back pressure until a maximum fracturing rate is reached; (f) introducing a first low-viscosity treatment fluid (LVTF) into the subterranean formation through the opening at the first treatment zone at the maximum fracturing rate and at a pressure above the far-field apparent fissure opening pressure to create or enhance a secondary azimuth fracture extending from the dominate fracture, the first LVTF comprising a second base fluid and fine particulates, medium particulates, or coarse particulates; (g) introducing a first low-viscosity treatment fluid diversion pill (LVTF pill) comprising a third base fluid and degradable particulates, or a combination of degradable and non-degradable particulates, and forming a fluidic seal with the LVTF pill in a portion of the subterranean formation selected from the group consisting of the dominate fracture, the secondary azimuth fracture, and any combination thereof; and (h) performing a first net pressure pulsing operation after the first LVTF is introduced comprising: (h1) introducing a first net pressure pulsing high-viscosity treatment fluid (first NPP HVTF) into the subterranean formation at the maximum fracturing rate; (h2) applying a first NPP HVTF decreased fracturing rate step to the first NPP HVTF; and (h3) applying at least one IIFRS to the first NPP HVTF to create a net pressure pulse (NPP) on the first LVTF in the dominate fracture, wherein the at least one IIFRS applied to the first NPP HVTF is applied until +/−10% of the maximum fracturing rate is reached.

Embodiment C may have one or more of the following additional elements in any combination:

Element C1: Wherein a substantially solids-free low-viscosity spacer fluid (LVSP) is introduced into the subterranean formation between steps (g) and (h).

Element C2: Wherein the first LVTF pill has a volume of no greater than about two (2) wellbore volumes.

Element C3: Wherein step (h) is performed when the LVTF pill reaches a desired fracture tip half-length.

Element C4: Wherein the first LVTF pill comprises degradable particulates are a combination of fine degradable particulates and medium degradable particulates.

Element C5: Wherein the first LVTF pill comprising the combination of degradable and non-degradable particulates and are either: (1) coarse non-degradable particulates and medium degradable particulates; (2) coarse non-degradable particulates and fine degradable particulates; (3) coarse non-degradable particulates, medium degradable particulates, and fine degradable particulates; (4) medium non-degradable particulates and medium degradable particulates, wherein the medium degradable particulates have a smaller mesh size than the medium non-degradable particulates; (5) medium non-degradable particulates and fine degradable particulates; (6) medium non-degradable particulates, medium degradable particulates, and fine degradable particulates; or (7) medium non-degradable particulates, fine non-degradable particulates, and medium degradable particulates.

Element C6: further comprising a tubular extending into the wellbore in the subterranean formation; and a pump fluidly coupled to the tubular, the tubular comprising separately one or both of the first HVTF, the first LVTF, and/or the first LVTF pill.

By way of non-limiting example, exemplary combinations applicable to Embodiment C include: C1-C6; C1, C3, C5, and C6; C2 and C4; C3 and C4; C2, C4, and C5; C5 and C6; and the like.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
   (a) isolating a first treatment zone comprising an opening through a wellbore and into a subterranean formation;
   (b) introducing a first high-viscosity treatment fluid (HVTF) into the subterranean formation through the opening, the first HVTF comprising a first base fluid and a first gelling agent, wherein the first HVTF comprises a viscosity of about 20 cP to about 5,000 cP;
   (c) applying incrementally increased fracturing rate steps (IIFRSs) to the first HVTF to create or enhance a dominate fracture, the IIFRSs applied to the first HVTF each above a fracture gradient pressure, below a near-wellbore apparent fissure opening pressure, and below a far-field apparent fissure opening pressure, and wherein between each IIFRS applied to the first HVTF a downhole pressure slope over time will increase, decline, or stabilize at a first HVTF measured pressure slope;
   (d) evaluating the first HVTF measured pressure slope to determine whether an increasing first HVTF pressure slope, a stabilizing first HVTF pressure slope, or a declining first HVTF pressure slope exists,
      wherein if the stabilizing first HVTF pressure slope or the declining first HVTF pressure slope exists, a subsequent IIFRS is applied to the first HVTF, wherein the stabilizing first HVTF pressure slope exists when the first HVTF measured pressure slope increases or decreases by about 50 psi/min or less at a stabilized rate, wherein the declining first HVTF pressure slope exists when the first HVTF measured pressure slope decreases by about greater than 50 psi/min at the stabilized rate, or
      wherein if the increasing first HVTF pressure slope exists, a first HVTF decreased fracturing rate step (d1) is applied to the first HVTF or a constant rate is maintained until the stabilizing first HVTF pressure slope exists, followed by applying the subsequent IIFRS to the first HVTF, wherein the increasing first HVTF pressure slope exists when the first HVTF measured pressure slope increases by about greater than 50 psi/min at the stabilized rate;
   (e) repeating one or more of steps (c) and (d) at the first treatment zone, thereby increasing a volume of the dominate fracture due to efficient dominate fracturing with generated back pressure until a maximum fracturing rate is reached;
   (f) introducing a first low-viscosity treatment fluid (LVTF) into the subterranean formation through the opening at the first treatment zone at the maximum fracturing rate and at a pressure above the far-field apparent fissure opening pressure to create or enhance a secondary azimuth fracture extending from the dominate fracture, the first LVTF comprising a second base fluid and fine particulates, medium particulates, or coarse particulates, wherein the first LVTF comprises a viscosity of about 1 cP to about 20 cP; and
   (g) performing a first net pressure pulsing operation after the first LVTF is introduced comprising:
      (g1) introducing a first net pressure pulsing high-viscosity treatment fluid (first NPP HVTF) into the subterranean formation immediately following the first LVTF at the maximum fracturing rate, wherein the first NPP HVTF comprises a viscosity of about 20 cP to about 5,000 cP;
      (g2) applying a first NPP HVTF decreased fracturing rate step to the first NPP HVTF; and
      (g3) applying at least one IIFRS to the first NPP HVTF to create a net pressure pulse (NPP) on the first LVTF in the dominate fracture, wherein the at least one IIFRS applied to the first NPP HVTF is applied until+/−10% of the maximum fracturing rate is reached.

2. The method of claim 1, wherein the first NPP HVTF decreased fracturing rate step is in the range of about 10% to about 80% less than the maximum fracturing rate.

3. The method of claim 1, wherein the first NPP HVTF decreased fracturing rate step is applied when the first NPP HVTF is introduced into the subterranean formation or when the first NPP HVTF reaches a leading edge of the first treatment zone.

4. The method of claim 1, wherein a solids-free low-viscosity spacer fluid (LVSP) is introduced into the subterranean formation between steps (f) and (g), wherein the solids-free LVSP comprises a viscosity of about 1 cP to about 20 cP, wherein the solids-free LVSP comprises solid particulates in an amount of about 5% or less prior to introduction.

5. The method of claim 1, wherein a plurality of IIFRSs is applied to the first NPP HVTF until+/−10% of the maximum fracturing rate is reached, and between each IIFRS applied to the first NPP HVTF a downhole pressure slope over time will increase, decline, or stabilize at a first NPP HVTF measured pressure slope, and further comprising:
   evaluating the first NPP HVTF measured pressure slope to determine whether an increasing first NPP HVTF pressure slope, a stabilizing first NPP HVTF pressure slope, or a declining first NPP HVTF pressure slope exists,
      wherein if the stabilizing first NPP HVTF pressure slope or the declining first NPP HVTF pressure slope exists, a subsequent IIFRS is applied to the first NPP HVTF, or
      wherein if the increasing first NPP HVTF pressure slope exists, a first NPP HVTF decreased fracturing rate step (d1) is applied to the first NPP HVTF or a constant rate is maintained until the stabilizing first NPP HVTF pressure slope exists, followed by applying the subsequent IIFRS to the first NPP HVTF.

6. The method of claim 1, wherein the first LVTF comprises fine particulates, and further comprising after step (f) and before step (g):
   (f1) introducing a second LVTF comprising a fourth base fluid and medium particulates, wherein the second LVTF comprises a viscosity of about 1 cP to about 20 cP.

7. The method of claim 1, wherein the first LVTF comprises fine particulates, and further comprising after step (f) and before step (g):
   (f1) introducing a second LVTF comprising a fourth base fluid and medium particulate, wherein the second LVTF comprises a viscosity of about 1 cP to about 20 cP; and
   (f2) introducing a third LVTF comprising a fifth base fluid and coarse particulates, wherein the third LVTF comprises a viscosity of about 1 cP to about 20 cP.

8. The method of claim 1, further comprising after step (g):
   (h) introducing a second LVTF into the subterranean formation immediately following the first NPP HVTF through the opening at the first treatment zone at the maximum fracturing rate and at a pressure above the far-field apparent fissure opening pressure, the second LVTF comprising a fourth base fluid and fine particulates, medium particulates, or coarse particulates, wherein the second LVTF comprises a viscosity of about 1 cP to about 20 cP; and (i) performing a second net pressure pulsing operation after the second LVTF is introduced comprising:
(i1) introducing a second NPP HVTF into the subterranean formation immediately following the second LVTF at the maximum fracturing rate, wherein the second NPP HVTF comprises a viscosity of about 20 cP to about 5,000 cP;
(i2) applying a second NPP HVTF decreased fracturing rate step to the second NPP HVTF; and
(i3) applying at least one IIFRS to the second NPP HVTF to create a NPP on the second LVTF in the dominate fracture, wherein the at least one IIFRS applied to the second NPP HVTF is applied until+/−10% of the maximum fracturing rate is reached.

9. The method of claim 1, further comprising a tubular extending into the wellbore in the subterranean formation; and
a pump fluidly coupled to the tubular, the tubular comprising separately one or both of the first HVTF and/or the first LVTF.

10. A method comprising:
(a) isolating a first treatment zone comprising an opening through a wellbore and into a subterranean formation;
(b) introducing a first high-viscosity treatment fluid (HVTF) into the subterranean formation through the opening, the first HVTF comprising a first base fluid and a first gelling agent, wherein the first HVTF comprises a viscosity of about 20 cP to about 5,000 cP;
(c) applying incrementally increased fracturing rate steps (IIFRSs) to the first HVTF to create or enhance a dominate fracture, the IIFRSs applied to the first HVTF each above a fracture gradient pressure, below a near-wellbore apparent fissure opening pressure, and below a far-field apparent fissure opening pressure, and wherein between each IIFRS applied to the first HVTF a downhole pressure slope over time will increase, decline, or stabilize at a first HVTF measured pressure slope;
(d) evaluating the first HVTF measured pressure slope to determine whether an increasing first HVTF pressure slope, a stabilizing first HVTF pressure slope, or a declining first HVTF pressure slope exists,
wherein if the stabilizing first HVTF pressure slope or the declining first HVTF pressure slope exists, a subsequent IIFRS is applied to the first HVTF, wherein the stabilizing first HVTF pressure slope exists when the first HVTF measures pressure slope increases or decrease by about 50 psi/min or less at a stabilized rate, wherein the declining first HVTF pressure slope exists when the first HVTF measured pressure slope decreases by about greater than 50 psi/min at the stabilized rate, or
wherein if the increasing first HVTF pressure slope exists, a first HVTF decreased fracturing rate step (d1) is applied to the first HVTF or a constant rate is maintained until the stabilizing first HVTF pressure slope exists, followed by applying the subsequent IIFRS to the first HVTF, wherein the increasing first HVTF pressure slope exists when the first HVTF measured pressure slope increases by about greater than 50 psi/min at the stabilized rate;
(e) repeating one or more of steps (c) and (d) at the first treatment zone, thereby increasing a volume of the dominate fracture due to efficient dominate fracturing with generated back pressure until a maximum fracturing rate is reached;
(f) introducing a first low-viscosity treatment fluid (LVTF) into the subterranean formation through the opening at the first treatment zone at the maximum fracturing rate and at a pressure above the far-field apparent fissure opening pressure to create or enhance a secondary azimuth fracture extending from the dominate fracture, the first LVTF comprising a second base fluid and fine particulates, medium particulates, or coarse particulates, wherein the first LVTF comprises a viscosity of about 1 cP to about 20 cP;
(g) applying a first LVTF decreased fracturing rate step to the first LVTF; and
(h) performing a first net pressure pulsing operation after the first LVTF is introduced comprising:
(h1) introducing a first net pressure pulsing high-viscosity treatment fluid (first NPP HVTF) into the subterranean formation immediately following the first LVTF at a displacement rate equivalent to a rate achieved by the first LVTF decreased fracturing rate step, wherein the first NPP HVTF comprises a viscosity of about 20 cP to about 5,000 cP; and
(h2) applying at least one IIFRS to the first NPP HVTF to create a net pressure pulse (NPP) on the first LVTF in the dominate fracture, wherein the at least one IIFRS applied to the first NPP HVTF is applied until+/−10% of the maximum fracturing rate is reached.

11. The method of claim 10, wherein the first LVTF decreased fracturing rate step is in the range of about 10% to about 80% less than the maximum fracturing rate.

12. The method of claim 10, wherein a solids-free low-viscosity spacer fluid (LVSP) is introduced into the subterranean formation between steps (g) and (h), wherein the solids-free LVSP comprises a viscosity of about 1 cP to about 20 cP, wherein the solids-free LVSP comprises solid particulates in an amount of 5% or less prior to introduction.

13. The method of claim 10, wherein a plurality of IIFRSs is applied to the first NPP HVTF until+/−10% of the maximum fracturing rate is reached, and between each IIFRS applied to the first NPP HVTF a downhole pressure slope over time will increase, decline, or stabilize at a first NPP HVTF measured pressure slope, and further comprising:
evaluating the first NPP HVTF measured pressure slope to determine whether an increasing first NPP HVTF pressure slope, a stabilizing first NPP HVTF pressure slope, or a declining first NPP HVTF pressure slope exists,
wherein if the stabilizing first NPP HVTF pressure slope or the declining first NPP HVTF pressure slope exists, a subsequent IIFRS is applied to the first NPP HVTF, or
wherein if the increasing first NPP HVTF pressure slope exists, a first NPP HVTF decreased fracturing rate step (d1) is applied to the first NPP HVTF or a constant rate is maintained until the stabilizing first NPP HVTF pressure slope exists, followed by applying the subsequent IIFRS to the first NPP HVTF.

14. The method of claim 10, wherein the at least one IIFRS applied to the first HVTF is applied when the first LVTF reaches a desired fracture tip half-length.

15. The method of claim 10, further comprising after step (h):
(i) introducing a second LVTF into the subterranean formation immediately following the first NPP HVTF through the opening at the first treatment zone at the maximum fracturing rate and at a pressure above the far-field apparent fissure opening pressure, the second LVTF comprising a fourth base fluid and fine particulates, medium particulates, or coarse particulates, wherein the second LVTF comprises a viscosity of about 1 cP to about 20 cP;

(j) applying a second LVTF decreased fracturing rate step to the second LVTF; and (k) performing a second net pressure pulsing operation after the second LVTF is introduced comprising:
  (k1) introducing a second NPP HVTF into the subterranean formation immediately following the second LVTF at the maximum fracturing rate, wherein the second NPP HVTF comprises a viscosity of about 20 cP to about 5,000 cP; and
  (k3) applying at least one IIFRS to the second NPP HVTF to create a NPP on the second LVTF in the dominate fracture, wherein the at least one IIFRS applied to the second NPP HVTF is applied until+/−10% of the maximum fracturing rate is reached.

16. A method comprising:

(a) isolating a first treatment zone comprising an opening through a wellbore and into a subterranean formation;

(b) introducing a first high-viscosity treatment fluid (HVTF) into the subterranean formation through the opening, the first HVTF comprising a first base fluid and a first gelling agent, wherein the first HVTF comprises a viscosity of about 20 cP to about 5,000 cP;

(c) applying incrementally increased fracturing rate steps (IIFRSs) to the first HVTF to create or enhance a dominate fracture, the IIFRSs applied to the first HVTF each above a fracture gradient pressure, below a near-wellbore apparent fissure opening pressure, and below a far-field apparent fissure opening pressure, and wherein between each IIFRS applied to the first HVTF a downhole pressure slope over time will increase, decline, or stabilize at a first HVTF measured pressure slope;

(d) evaluating the first HVTF measured pressure slope to determine whether an increasing first HVTF pressure slope, a stabilizing first HVTF pressure slope, or a declining first HVTF pressure slope exists,
  wherein if the stabilizing first HVTF pressure slope or the declining first HVTF pressure slope exists, a subsequent IIFRS is applied to the first HVTF, wherein the stabilizing first HVTF pressure slope exists when the first HVTF measures pressure slope increases or decrease by about 50 psi/min or less at a stabilized rate, wherein the declining first HVTF pressure slope exists when the first HVTF measured pressure slope decreases by about greater than 50 psi/min at the stabilized rate,
  wherein if the increasing first HVTF pressure slope exists, a first HVTF decreased fracturing rate step (d1) is applied to the first HVTF or a constant rate is maintained until the stabilizing first HVTF pressure slope exists, followed by applying the subsequent IIFRS to the first HVTF, wherein the increasing first HVTF pressure slope exists when the first HVTF measured pressure slope increases by about greater than 50 psi/min at the stabilized rate;

(e) repeating one or more of steps (c) and (d) at the first treatment zone, thereby increasing a volume of the dominate fracture due to efficient dominate fracturing with generated back pressure until a maximum fracturing rate is reached;

(f) introducing a first low-viscosity treatment fluid (LVTF) into the subterranean formation through the opening at the first treatment zone at the maximum fracturing rate and at a pressure above the far-field apparent fissure opening pressure to create or enhance a secondary azimuth fracture extending from the dominate fracture, the first LVTF comprising a second base fluid and fine particulates, medium particulates, or coarse particulate, wherein the first LVTF comprises a viscosity of about 1 cP to about 20 cP;

(g) introducing a first low-viscosity treatment fluid diversion pill (LVTF pill) comprising a third base fluid and degradable particulates, or a combination of degradable and non-degradable particulates, and forming a fluidic seal with the LVTF pill in a portion of the subterranean formation selected from the group consisting of the dominate fracture, the secondary azimuth fracture, and any combination thereof, wherein the first LVTF pill comprises a viscosity of about 1 cP to about 20 cP; and (h) performing a first net pressure pulsing operation after the first LVTF is introduced comprising:
  (h1) introducing a first net pressure pulsing high-viscosity treatment fluid (first NPP HVTF) into the subterranean formation at the maximum fracturing rate, wherein the first NPP HVTF comprises a viscosity of about 20 cP to about 5,000 cP;
  (h2) applying a first NPP HVTF decreased fracturing rate step to the first NPP HVTF; and
  (h3) applying at least one IIFRS to the first NPP HVTF to create a net pressure pulse (NPP) on the first LVTF in the dominate fracture, wherein the at least one IIFRS applied to the first NPP HVTF is applied until+/−10% of the maximum fracturing rate is reached.

17. The method of claim 16, wherein a solids-free low-viscosity spacer fluid (LVSP) is introduced into the subterranean formation between steps (g) and (h), wherein the solids-free LVSP comprises a viscosity of about 1 cP to about 20 cP, wherein the solids-free LVSP comprises solid particulates in an amount of about 5% or less prior to introduction.

18. The method of claim 16, wherein the first LVTF pill has a volume of no greater than about two (2) wellbore volumes and/or the first LVTF pill comprises degradable particulates, wherein the degradable particulates are a combination of fine degradable particulates and medium degradable particulates.

19. The method of claim 16, wherein step (h) is performed when the LVTF pill reaches a desired fracture tip half-length.

20. The method of claim 16, wherein the first LVTF pill comprising the combination of degradable and non-degradable particulates and are either: (1) coarse non-degradable particulates and medium degradable particulates; (2) coarse non-degradable particulates and fine degradable particulates; (3) coarse non-degradable particulates, medium degradable particulates, and fine degradable particulates; (4) medium non-degradable particulates and medium degradable particulates, wherein the medium degradable particulates have a smaller mesh size than the medium non-degradable particulates; (5) medium non-degradable particulates and fine degradable particulates; (6) medium non-degradable particulates, medium degradable particulates, and fine degradable particulates; or (7) medium non-degradable particulates, fine non-degradable particulates, and medium degradable particulates.

\* \* \* \* \*